US012628161B2

(12) United States Patent (10) Patent No.: US 12,628,161 B2
Khoshnevisan et al. (45) Date of Patent: May 12, 2026

(54) LINKED PHYSICAL DOWNLINK CONTROL CHANNEL CANDIDATE RULES

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1060 days.

(21) Appl. No.: 17/482,318

(22) Filed: Sep. 22, 2021

(65) Prior Publication Data

US 2022/0095343 A1 Mar. 24, 2022

Related U.S. Application Data

(60) Provisional application No. 63/082,823, filed on Sep. 24, 2020.

(51) Int. Cl.
*H04W 4/00* (2018.01)
*H04W 24/08* (2009.01)
(Continued)

(52) U.S. Cl.
CPC ....... *H04W 72/1273* (2013.01); *H04W 24/08* (2013.01); *H04W 72/0446* (2013.01); *H04W 72/23* (2023.01)

(58) Field of Classification Search
None
See application file for complete search history.

(56) References Cited

U.S. PATENT DOCUMENTS 11,050,525 B2 6/2021 Vilaipornsawai et al.
2013/0250880 A1* 9/2013 Liao ...................... H04L 5/0092
370/329
(Continued)

FOREIGN PATENT DOCUMENTS

WO WO-2017029066 A1 2/2017
WO WO-2020018268 1/2020
(Continued)

OTHER PUBLICATIONS

CATT: "Discussion on Enhancements on Multi-TRP/panel for PDCCH, PUCCH and PUSCH", 3GPP Draft, 3GPP TSG RAN WG1 Meeting #102e, R1-2005684, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), XP051917659, 8 Pages, Retrieved from the Internet: URL: https://ftp.3gpp.org/tsg_ran/WG1_RL1/TSGR1_102-e/Docs/R1-2005684.zip R1-2005684.docx [Retrieved on Aug. 8, 2020] p. 3, last paragraph; Figures 1,2.
(Continued)

*Primary Examiner* — Zewdu A Beyen
(74) *Attorney, Agent, or Firm* — Holland & Hart LLP/Qualcomm Incorporated

(57) ABSTRACT

Methods, systems, and devices for wireless communications are described. A user equipment (UE) may monitor for downlink control information (DCI) among a plurality of physical downlink control channel (PDCCH) candidates that are associated with each other, the plurality of PDCCH candidates including at least a first PDCCH candidate in a first transmission time period and a last PDCCH candidate in a second transmission time period. The UE may identify a reference timing rule based at least in part on the association between the plurality of PDCCH candidates, the reference timing rule indicating that a reference time is to be (Continued)

determined based at least in part on either the first transmission time period or the second transmission time period. The UE may determine the reference time based at least in part on the reference timing rule and communicate based at least in part on the reference time.

22 Claims, 23 Drawing Sheets

(51) Int. Cl.
H04W 72/0446 (2023.01)
H04W 72/1273 (2023.01)
H04W 72/23 (2023.01)

(56) References Cited

U.S. PATENT DOCUMENTS

| | | | |
|---|---|---|---|
| 2018/0376492 A1 | 12/2018 | Wong et al. | |
| 2020/0196346 A1 | 6/2020 | Khoshneisan et al. | |
| 2020/0213069 A1 | 7/2020 | Jiang et al. | |
| 2020/0221428 A1 | 7/2020 | Moon et al. | |
| 2020/0221449 A1 | 7/2020 | Bang et al. | |

FOREIGN PATENT DOCUMENTS

| | | | |
|---|---|---|---|
| WO | WO-2020167014 A1 | 8/2020 | |
| WO | WO2021022736 A1 | 2/2021 | |
| WO | WO-2022025165 A1 * | 2/2022 | ........... H04L 5/0051 |

OTHER PUBLICATIONS

International Search Report and Written Opinion—PCT/US2021/051778—ISA/EPO—Jan. 10, 2022.
CATT: "Discussion on Enhancements on Multi-TRP/panel for PDCCH, PUCCH and PUSCH", 3GPP TSG RAN WG1 Meeting #102e, R1-2005684, e-Meeting, Aug. 17, 2020-Aug. 28, 2020, Aug. 8, 2020, 8 Pages.
Moderator (OPPO): "FL summary #2 for Multi-TRP/Panel Transmission", 3GPP TSG RAN WG1 #101, R1-2004719, May 25-Jun. 5, 2020, Chapters 2.1, 2.3, 2.4, 2.6, 2.10, 2.15, 2.16, 2.17, 3.6 and 3.9, 35 Pages.
Taiwan Search Report—TW110135313—TIPO—Aug. 8, 2025.
Huawei, et al., "Enhancements on Multi-TRP/panel Transmission", 3GPP TSG RAB WG1 Meeting #98bis, R1-1910073, Chongqing, China, Oct, 14, 2019-Oct. 20, 2019, Oct. 5, 2019, 31 Pages, page 11.

* cited by examiner

*PDCCH candidates,*
*potential DCI(s)*
*indicating SFI index*

*If SFI index indicates slot format for 3 slots,*
*the 3 slots may include slots 305-b, 305-c,*
*and 305-d*

300

Symbols to which the
interrupted
transmission is
applied

PDCCH candidates,
potential DCI(s)
indicating interrupted
transmission

500

| Slot | Slot | Slot | Slot |
|------|------|------|------|
| 605-a | 605-b | 605-c | 605-d |

PDCCH1  610

PDCCH2  615

$T'_{proc,2}$ $(T_{CI})$ *Symbol(s) in which UL transmission is canceled*

*PDCCH candidates, potential DCI(s) indicating cancelation indication*

*Processing time based on PUSCH processing Capability*

600

*800-a*

*800-b*

900

1010

1015

1020

1005

1000

1410

1415

1420

1405

1400

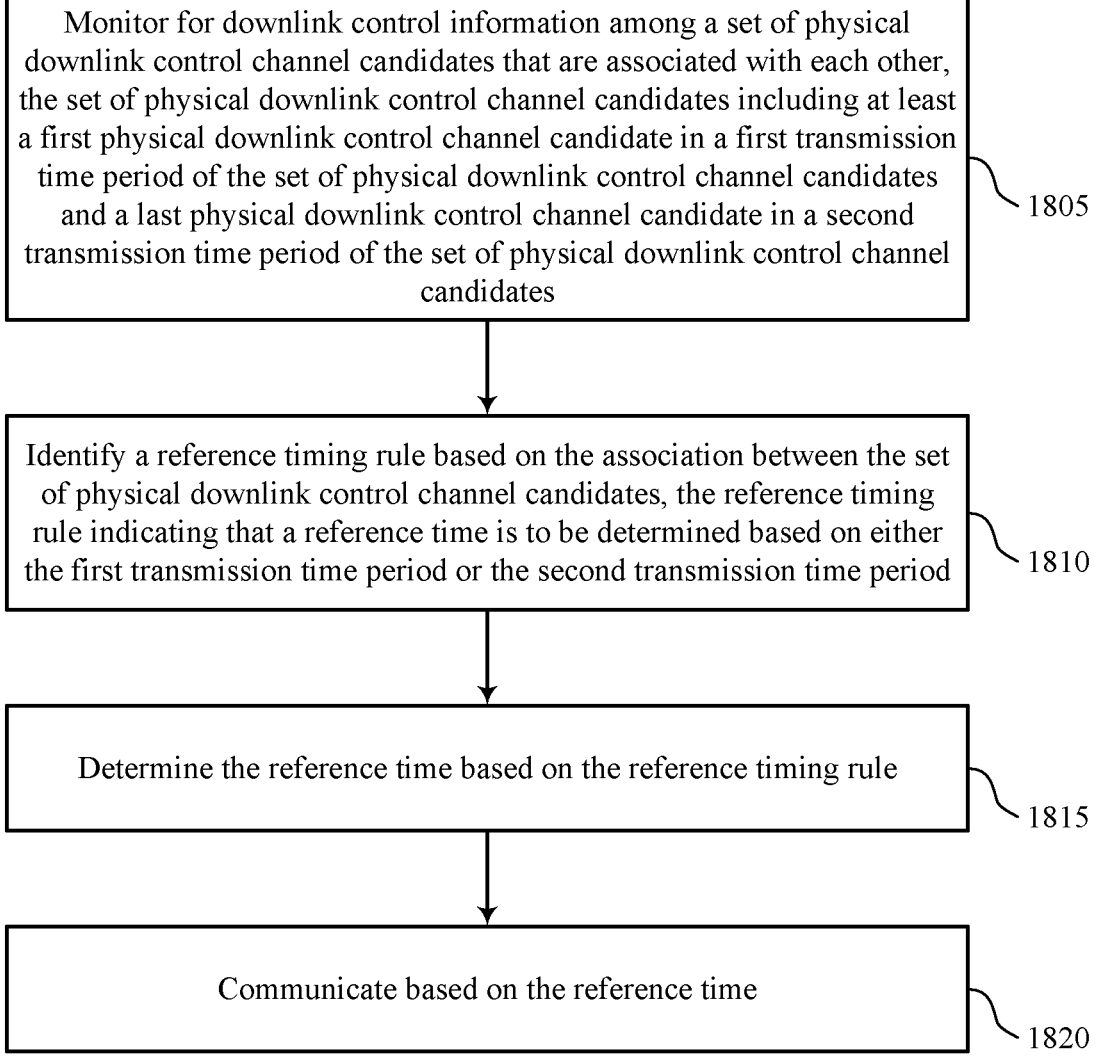

Monitor for downlink control information among a set of physical downlink control channel candidates that are associated with each other, the set of physical downlink control channel candidates including at least a first physical downlink control channel candidate in a first transmission time period of the set of physical downlink control channel candidates and a last physical downlink control channel candidate in a second transmission time period of the set of physical downlink control channel candidates

1805

Identify a reference timing rule based on the association between the set of physical downlink control channel candidates, the reference timing rule indicating that a reference time is to be determined based on either the first transmission time period or the second transmission time period

1810

Determine the reference time based on the reference timing rule

1815

Communicate based on the reference time

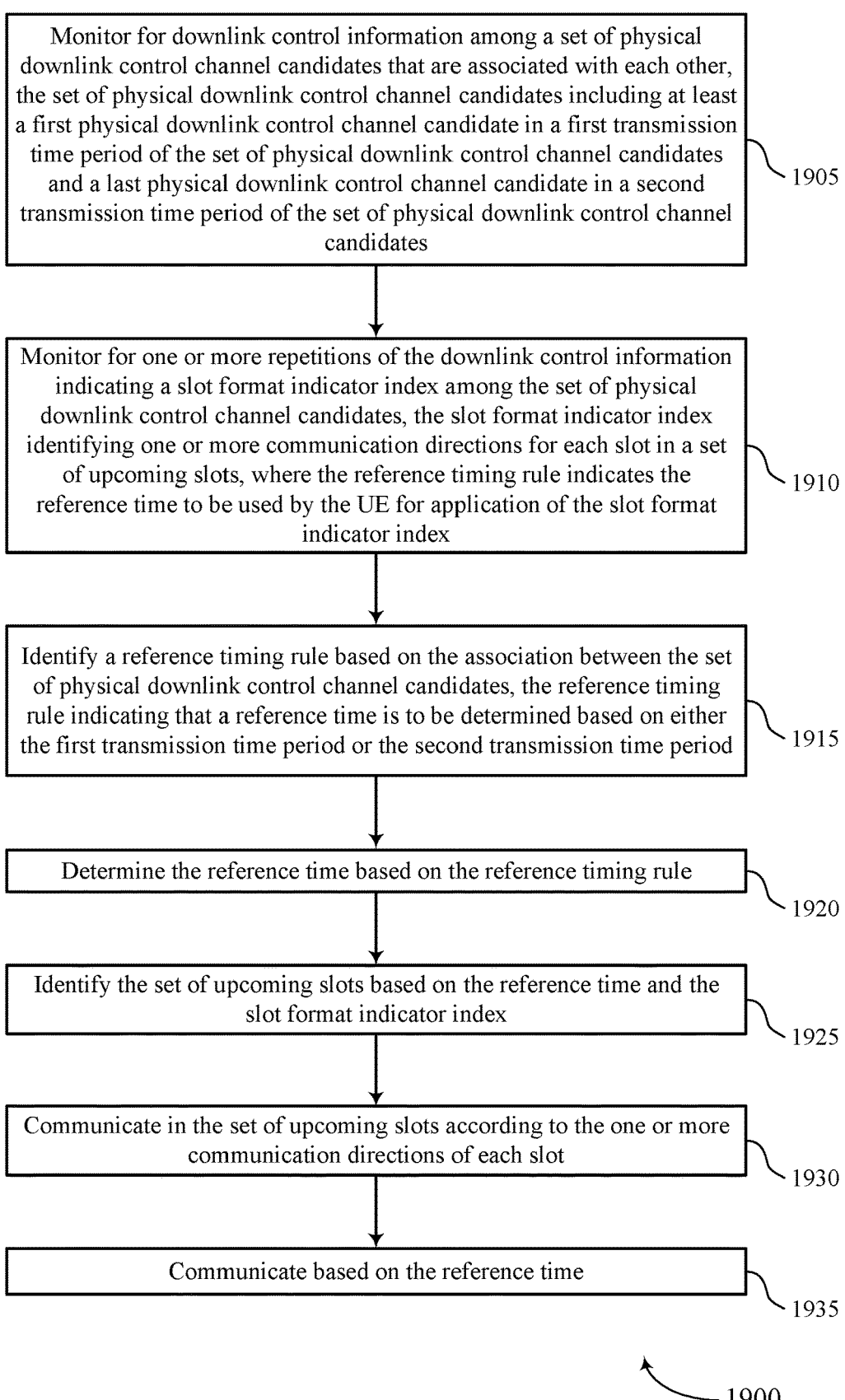

Monitor for downlink control information among a set of physical downlink control channel candidates that are associated with each other, the set of physical downlink control channel candidates including at least a first physical downlink control channel candidate in a first transmission time period of the set of physical downlink control channel candidates and a last physical downlink control channel candidate in a second transmission time period of the set of physical downlink control channel candidates ⟩ 1905

Monitor for one or more repetitions of the downlink control information indicating a slot format indicator index among the set of physical downlink control channel candidates, the slot format indicator index identifying one or more communication directions for each slot in a set of upcoming slots, where the reference timing rule indicates the reference time to be used by the UE for application of the slot format indicator index ⟩ 1910

Identify a reference timing rule based on the association between the set of physical downlink control channel candidates, the reference timing rule indicating that a reference time is to be determined based on either the first transmission time period or the second transmission time period ⟩ 1915

Determine the reference time based on the reference timing rule ⟩ 1920

Identify the set of upcoming slots based on the reference time and the slot format indicator index ⟩ 1925

Communicate in the set of upcoming slots according to the one or more communication directions of each slot ⟩ 1930

Communicate based on the reference time ⟩ 1935

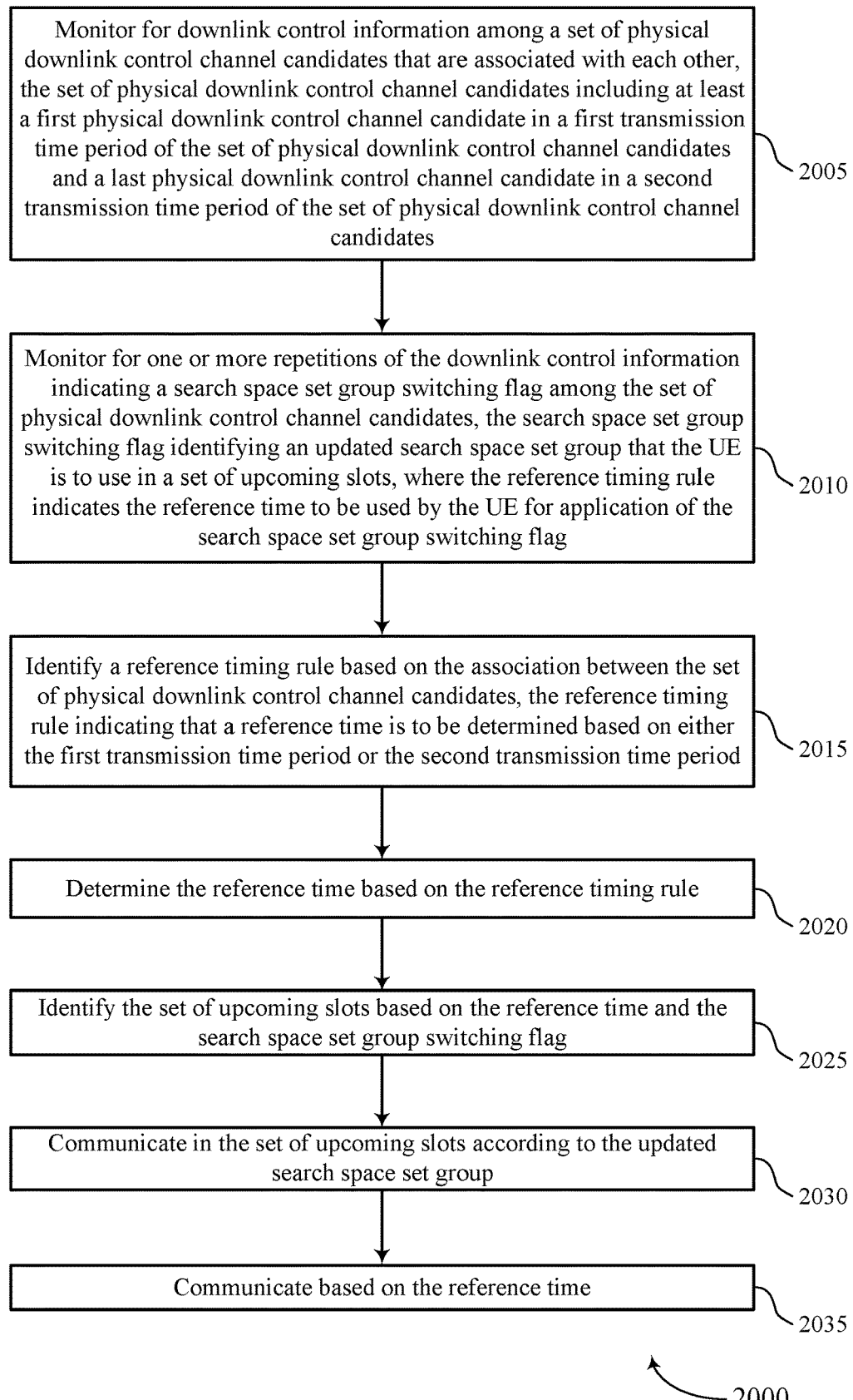

Monitor for downlink control information among a set of physical downlink control channel candidates that are associated with each other, the set of physical downlink control channel candidates including at least a first physical downlink control channel candidate in a first transmission time period of the set of physical downlink control channel candidates and a last physical downlink control channel candidate in a second transmission time period of the set of physical downlink control channel candidates

2005

Monitor for one or more repetitions of the downlink control information indicating a search space set group switching flag among the set of physical downlink control channel candidates, the search space set group switching flag identifying an updated search space set group that the UE is to use in a set of upcoming slots, where the reference timing rule indicates the reference time to be used by the UE for application of the search space set group switching flag

2010

Identify a reference timing rule based on the association between the set of physical downlink control channel candidates, the reference timing rule indicating that a reference time is to be determined based on either the first transmission time period or the second transmission time period

2015

Determine the reference time based on the reference timing rule

2020

Identify the set of upcoming slots based on the reference time and the search space set group switching flag

2025

Communicate in the set of upcoming slots according to the updated search space set group

2030

Communicate based on the reference time

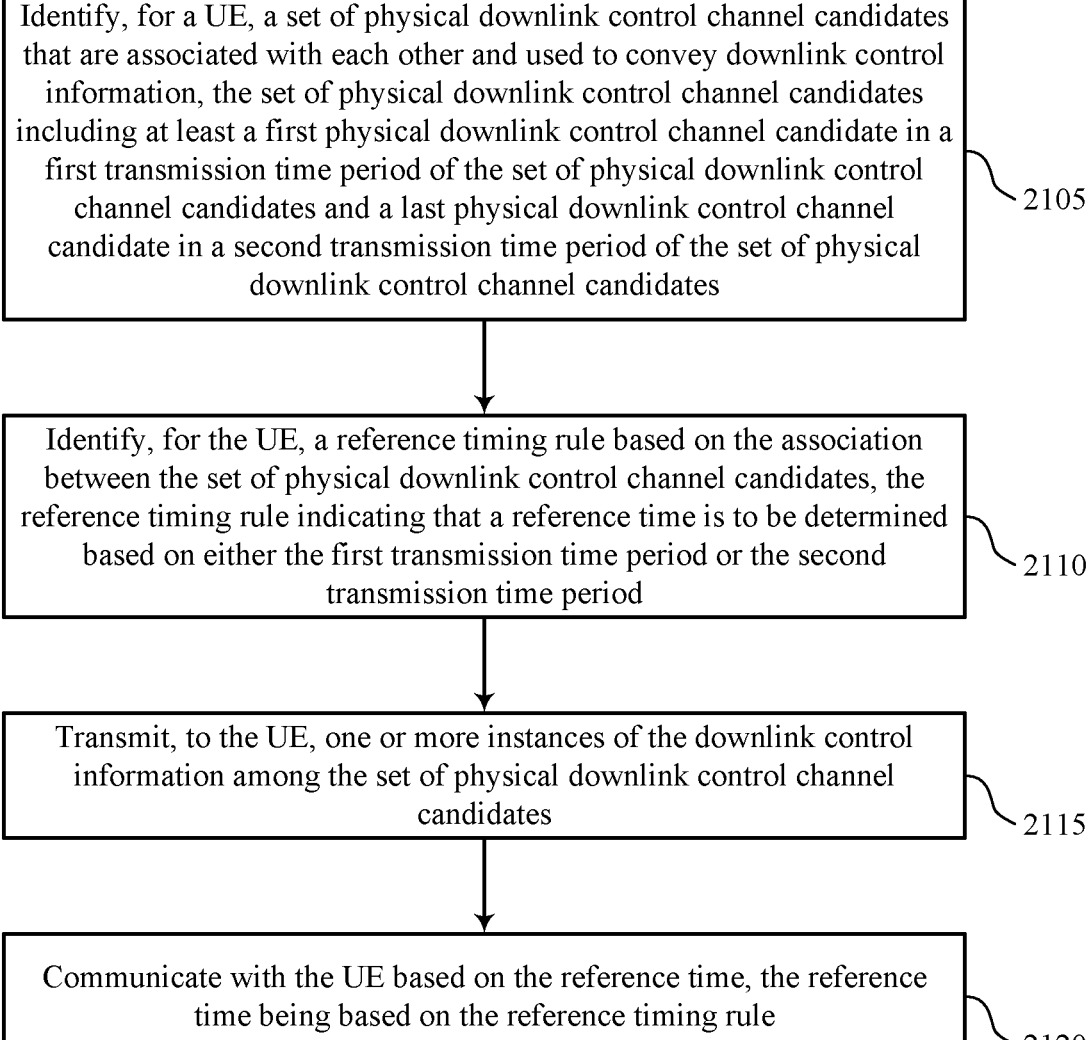

Identify, for a UE, a set of physical downlink control channel candidates that are associated with each other and used to convey downlink control information, the set of physical downlink control channel candidates including at least a first physical downlink control channel candidate in a first transmission time period of the set of physical downlink control channel candidates and a last physical downlink control channel candidate in a second transmission time period of the set of physical downlink control channel candidates

2105

Identify, for the UE, a reference timing rule based on the association between the set of physical downlink control channel candidates, the reference timing rule indicating that a reference time is to be determined based on either the first transmission time period or the second transmission time period

2110

Transmit, to the UE, one or more instances of the downlink control information among the set of physical downlink control channel candidates

2115

Communicate with the UE based on the reference time, the reference time being based on the reference timing rule

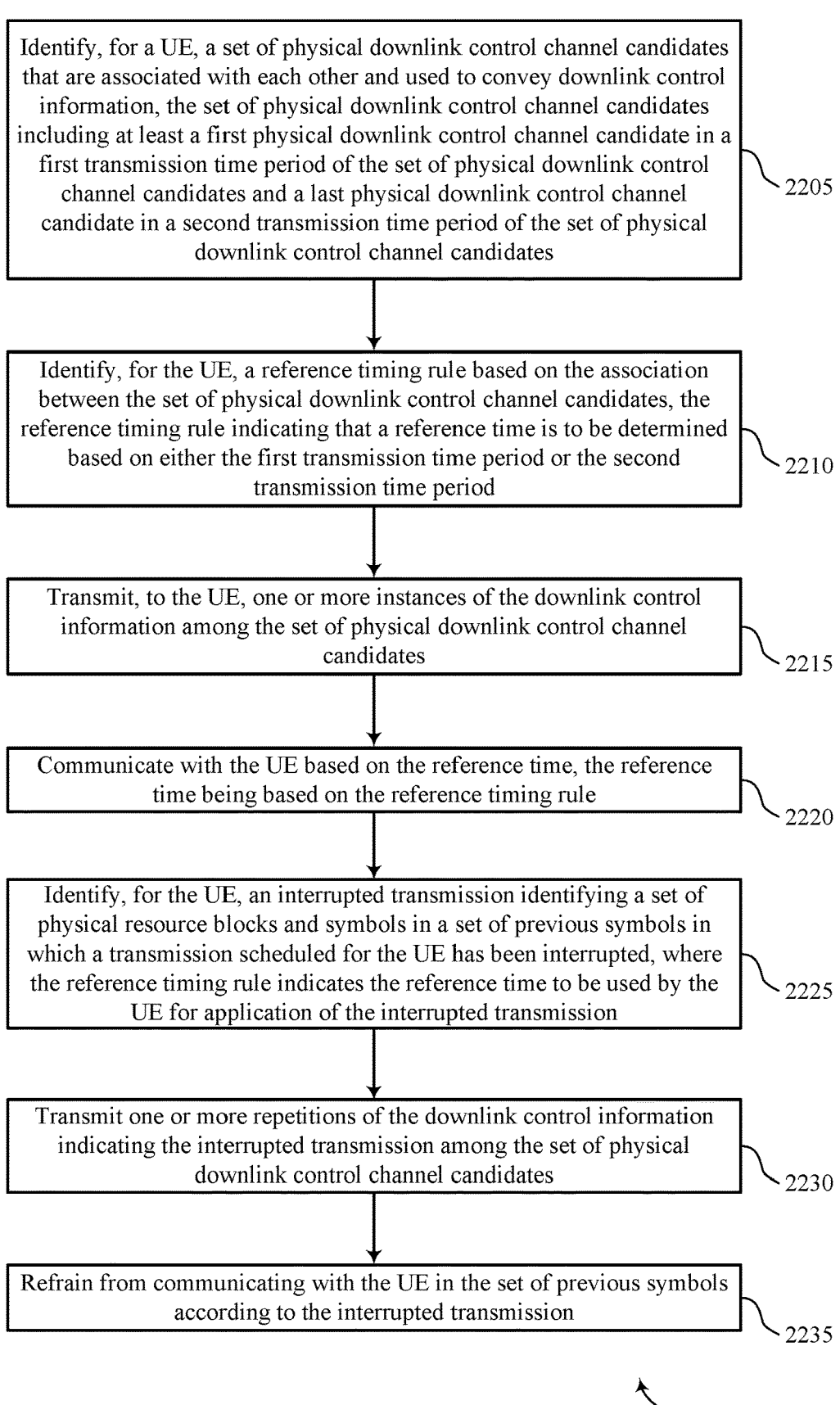

Identify, for a UE, a set of physical downlink control channel candidates that are associated with each other and used to convey downlink control information, the set of physical downlink control channel candidates including at least a first physical downlink control channel candidate in a first transmission time period of the set of physical downlink control channel candidates and a last physical downlink control channel candidate in a second transmission time period of the set of physical downlink control channel candidates

2205

Identify, for the UE, a reference timing rule based on the association between the set of physical downlink control channel candidates, the reference timing rule indicating that a reference time is to be determined based on either the first transmission time period or the second transmission time period

2210

Transmit, to the UE, one or more instances of the downlink control information among the set of physical downlink control channel candidates

2215

Communicate with the UE based on the reference time, the reference time being based on the reference timing rule

2220

Identify, for the UE, an interrupted transmission identifying a set of physical resource blocks and symbols in a set of previous symbols in which a transmission scheduled for the UE has been interrupted, where the reference timing rule indicates the reference time to be used by the UE for application of the interrupted transmission

2225

Transmit one or more repetitions of the downlink control information indicating the interrupted transmission among the set of physical downlink control channel candidates

2230

Refrain from communicating with the UE in the set of previous symbols according to the interrupted transmission

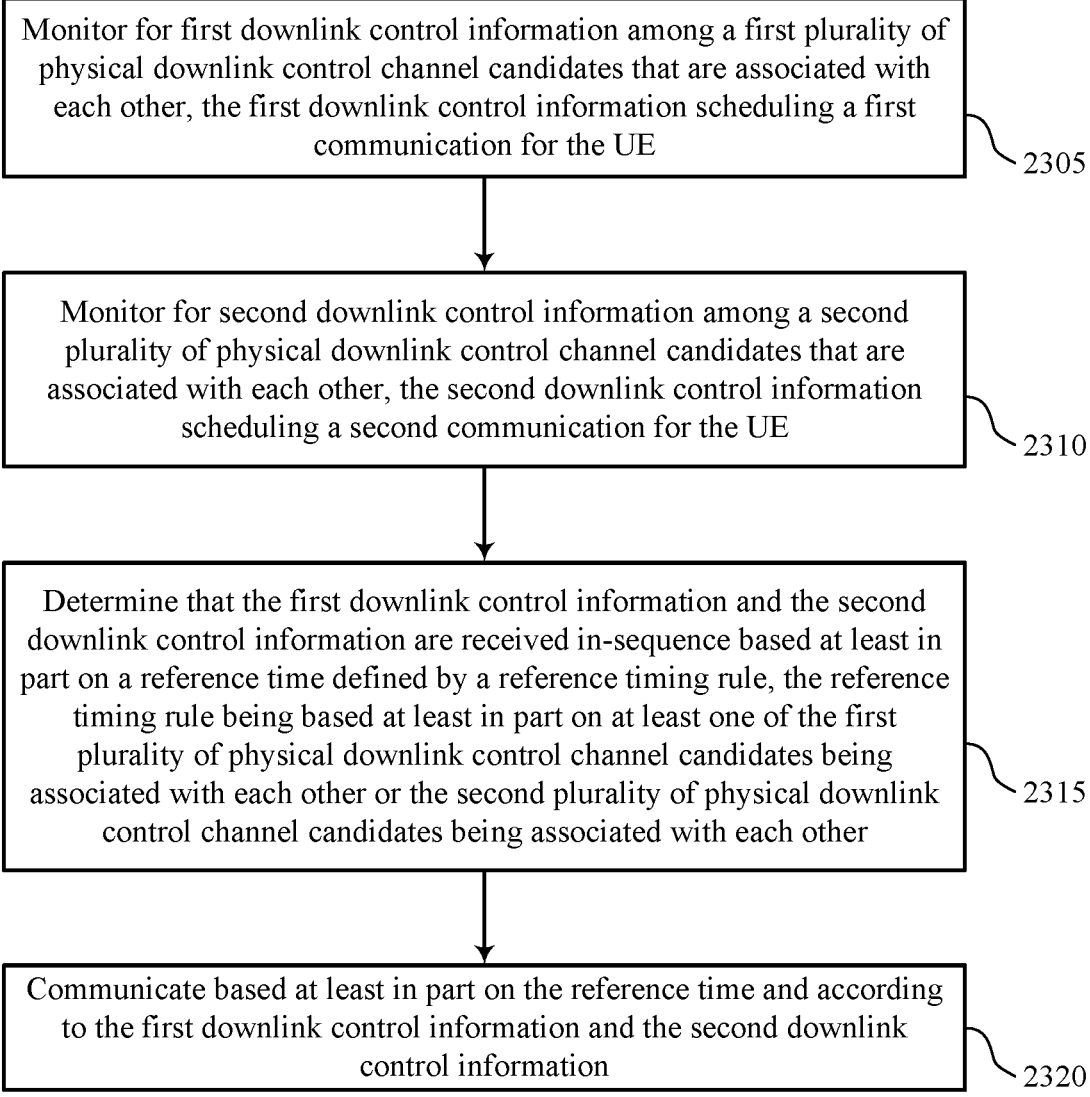

Monitor for first downlink control information among a first plurality of physical downlink control channel candidates that are associated with each other, the first downlink control information scheduling a first communication for the UE ⟍2305

Monitor for second downlink control information among a second plurality of physical downlink control channel candidates that are associated with each other, the second downlink control information scheduling a second communication for the UE ⟍2310

Determine that the first downlink control information and the second downlink control information are received in-sequence based at least in part on a reference time defined by a reference timing rule, the reference timing rule being based at least in part on at least one of the first plurality of physical downlink control channel candidates being associated with each other or the second plurality of physical downlink control channel candidates being associated with each other ⟍2315

Communicate based at least in part on the reference time and according to the first downlink control information and the second downlink control information ⟍2320

LINKED PHYSICAL DOWNLINK CONTROL CHANNEL CANDIDATE RULES

CROSS REFERENCE

The present Application for Patent claims the benefit of U.S. Provisional Patent Application No. 63/082,823 by KHOSHNEVISAN et al., entitled "LINKED PHYSICAL DOWNLINK CONTROL CHANNEL CANDIDATE RULES," filed Sep. 24, 2020, assigned to the assignee hereof, and expressly incorporated by reference herein.

FIELD OF TECHNOLOGY

The following relates to wireless communications, including linked physical downlink control channel candidate rules.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support linked physical downlink control channel (PDCCH) candidate rules. Generally, the described techniques provide rules that may be applied when linked or otherwise associated PDCCH candidates carry downlink control information (DCI)(s) indicating information for a user equipment (UE). For example, a base station and/or UE may identify a reference timing rule that generally defines that a reference time for a change, transmission, update, etc., indicated in the DCI is determined based on a timing of a first PDCCH candidate or a last PDCCH candidate among the linked PDCCH candidates. The specific reference timing rule may vary based on the specific type of change, transmission, updated, etc., being signaled in the DCI. Examples of scenarios where the reference timing rule may be applied include, but are not limited to, slot format indicator (SFI) index indications, search space (SS) set group switching indications, timing for application of an interrupted transmission indication, timing for application of a cancellation indication, timing for a bandwidth part (BWP) change indications, application of an in-order or out-of-order transmission scheduling, and the like.

A method for wireless communication at a UE is described. The method may include monitoring for first DCI among a first set of multiple PDCCH candidates that are associated with each other, the first DCI scheduling a first communication for the UE, monitoring for second DCI among a second set of multiple PDCCH candidates that are associated with each other, the second DCI scheduling a second communication for the UE, determining that the first DCI and the second DCI are received in-sequence based on a reference time defined by a reference timing rule, the reference timing rule being based on at least one of the first set of multiple PDCCH candidates being associated with each other or the second set of multiple PDCCH candidates being associated with each other, and communicating based on the reference time and according to the first DCI and the second DCI.

An apparatus for wireless communication at a UE is described. The apparatus may include a processor, memory coupled with the processor, and instructions stored in the memory. The instructions may be executable by the processor to cause the apparatus to monitor for first DCI among a first set of multiple PDCCH candidates that are associated with each other, the first DCI scheduling a first communication for the UE, monitor for second DCI among a second set of multiple PDCCH candidates that are associated with each other, the second DCI scheduling a second communication for the UE, determine that the first DCI and the second DCI are received in-sequence based on a reference time defined by a reference timing rule, the reference timing rule being based on at least one of the first set of multiple PDCCH candidates being associated with each other or the second set of multiple PDCCH candidates being associated with each other, and communicate based on the reference time and according to the first DCI and the second DCI.

Another apparatus for wireless communication at a UE is described. The apparatus may include means for monitoring for first DCI among a first set of multiple PDCCH candidates that are associated with each other, the first DCI scheduling a first communication for the UE, means for monitoring for second DCI among a second set of multiple PDCCH candidates that are associated with each other, the second DCI scheduling a second communication for the UE, means for determining that the first DCI and the second DCI are received in-sequence based on a reference time defined by a reference timing rule, the reference timing rule being based on at least one of the first set of multiple PDCCH candidates being associated with each other or the second set of multiple PDCCH candidates being associated with each other, and means for communicating based on the reference time and according to the first DCI and the second DCI.

A non-transitory computer-readable medium storing code for wireless communication at a UE is described. The code may include instructions executable by a processor to monitor for first DCI among a first set of multiple PDCCH candidates that are associated with each other, the first DCI scheduling a first communication for the UE, monitor for second DCI among a second set of multiple PDCCH candidates that are associated with each other, the second DCI scheduling a second communication for the UE, determine that the first DCI and the second DCI are received in-sequence based on a reference time defined by a reference timing rule, the reference timing rule being based on at least one of the first set of multiple PDCCH candidates being associated with each other or the second set of multiple PDCCH candidates being associated with each other, and communicate based on the reference time and according to the first DCI and the second DCI.

Some examples of the method, apparatuses, and non-transitory computer-readable medium described herein may further include operations, features, means, or instructions for identifying that the reference timing rule defines the reference time as a PDCCH ending symbol that may be a last symbol of a last PDCCH candidate of a set of associated PDCCH candidates, the set of associated PDCCH candidates corresponding to the first plurality of PDCCH candidates, the second plurality of PDCCH candidates, or both.

In some examples of the method, apparatuses, and non-transitory computer-readable medium described herein, determining that the first DCI and the second DCI may be received in-sequence may include operations, features, means, or instructions for applying the reference timing rule to the first set of multiple PDCCH candidates to determine the reference time, where the first set of multiple PDCCH candidates may be associated with a first feedback process identifier and the second set of multiple PDCCH candidates may be associated with a second feedback process identifier and verifying that the second set of multiple PDCCH candidates end after the reference time but that the second communication starts after an end of the first communication.

Some examples of the method, apparatuses, and non-transitory computer-readable medium described herein may further include operations, features, means, or instructions for identifying that the reference timing rule defines the reference time as a PDCCH ending symbol that may be either a last symbol of an earliest PDCCH candidate of a set of associated PDCCH candidates or the last symbol of any PDCCH candidate of the set of associated PDCCH candidates, the set of associated PDCCH candidates corresponding to the first plurality of PDCCH candidates, the second plurality of PDCCH candidates, or both.

Some examples of the method, apparatuses, and non-transitory computer-readable medium described herein may further include operations, features, means, or instructions for identifying that the reference timing rule defines a first reference time as a first PDCCH ending symbol for a first set of associated PDCCH candidates and a second reference time as a second PDCCH ending symbol for a second set of associated PDCCH candidates, where when the first communication corresponds to the first set of associated PDCCH candidates and occurs before the second communication which corresponds with the second set of associated PDCCH candidates, the first reference time may be a last symbol of an earliest PDCCH candidate of the first set of associated PDCCH candidates and the second reference time may be the last symbol of a last PDCCH candidate of the second set of associated PDCCH candidates, or the first reference time may be a last symbol of the last PDCCH candidate of the first set of associated PDCCH candidates and the second reference time may be the last symbol of the earliest PDCCH candidate of the second set of associated PDCCH candidates.

In some examples of the method, apparatuses, and non-transitory computer-readable medium described herein, the reference time may be specified by the reference timing rule as one of a second transmission time period associated with a last received instance of the second DCI, a first transmission time period associated with a first received instance of the first DCI, or a last symbol associated with the first DCI or second DCI, the last symbol associated with any received instance of the first DCI or second DCI, or a first symbol associated with the first received instance of the first DCI and the last symbol associated with the last received instance of the second DCI, or the last symbol associated with the first received instance of the first DCI and the first symbol associated with the last received instance of the second DCI.

In some examples of the method, apparatuses, and non-transitory computer-readable medium described herein, the first set of multiple PDCCH candidates may be associated with a first set of transmission time periods and the second set of multiple PDCCH candidates may be associated with a second set of transmission time periods.

In some examples of the method, apparatuses, and non-transitory computer-readable medium described herein, the first communication and the second communication include uplink communications (e.g., physical uplink control channel (PUCCH) communications and/or physical uplink shared channel (PUSCH) communications), downlink communications (e.g., PDCCH communications and/or physical downlink shared channel (PD SCH) communications), or both.

In some examples of the method, apparatuses, and non-transitory computer-readable medium described herein, the first plurality of PDCCH candidates are associated with a first set of repetitions of the first DCI and the second plurality of PDCCH candidates are associated with a second set of repetitions of the second DCI.

A method for wireless communication at a base station is described. The method may include identifying, for a UE, a first set of multiple PDCCH candidates that are associated with each other and used to convey DCI, identifying, for the UE, a second set of multiple PDCCH candidates that are associated with each other and used to convey DCI, identifying, for the UE, a reference timing rule that is based on at least one of the first set of multiple PDCCH candidates being associated with each other or the second set of multiple PDCCH candidates being associated with each other, transmitting, to the UE, first DCI among the first set of multiple PDCCH candidates, the first DCI scheduling a first communication for the UE, transmitting, to the UE, second DCI among the second set of multiple PDCCH candidates, the second DCI scheduling a second communication for the UE, and communicating with the UE based on a reference time and according to the first DCI and the second DCI, where the reference timing rule defines the reference time based at least in part on the first DCI and the second DCI being received in-sequence.

An apparatus for wireless communication at a base station is described. The apparatus may include a processor, memory coupled with the processor, and instructions stored in the memory. The instructions may be executable by the processor to cause the apparatus to identify, for a UE, a first set of multiple PDCCH candidates that are associated with each other and used to convey DCI, identify, for the UE, a second set of multiple PDCCH candidates that are associated with each other and used to convey DCI, identify, for the UE, a reference timing rule that is based on at least one of the first set of multiple PDCCH candidates being associated with each other or the second set of multiple PDCCH candidates being associated with each other, transmit, to the UE, first DCI among the first set of multiple PDCCH candidates, the first DCI scheduling a first communication for the UE, transmit, to the UE, second DCI among the second set of multiple PDCCH candidates, the second DCI scheduling a second communication for the UE, and communicate with the UE based on a reference time and according to the first DCI and the second DCI, where the reference timing rule defines the reference time based at least in part on the first DCI and the second DCI being received in-sequence.

Another apparatus for wireless communication at a base station is described. The apparatus may include means for identifying, for a UE, a first set of multiple PDCCH candidates that are associated with each other and used to convey DCI, means for identifying, for the UE, a second set of multiple PDCCH candidates that are associated with each other and used to convey DCI, means for identifying, for the UE, a reference timing rule that is based on at least one of the first set of multiple PDCCH candidates being associated with each other or the second set of multiple PDCCH candidates being associated with each other, means for transmitting, to the UE, first DCI among the first set of multiple PDCCH candidates, the first DCI scheduling a first communication for the UE, means for transmitting, to the UE, second DCI among the second set of multiple PDCCH candidates, the second DCI scheduling a second communication for the UE, and means for communicating with the UE based on a reference time and according to the first DCI and the second DCI, where the reference timing rule defines the reference time based at least in part on the first DCI and the second DCI being received in-sequence.

A non-transitory computer-readable medium storing code for wireless communication at a base station is described. The code may include instructions executable by a processor to identify, for a UE, a first set of multiple PDCCH candidates that are associated with each other and used to convey DCI, identify, for the UE, a second set of multiple PDCCH candidates that are associated with each other and used to convey DCI, identify, for the UE, a reference timing rule that is based on at least one of the first set of multiple PDCCH candidates being associated with each other or the second set of multiple PDCCH candidates being associated with each other, transmit, to the UE, first DCI among the first set of multiple PDCCH candidates, the first DCI scheduling a first communication for the UE, transmit, to the UE, second DCI among the second set of multiple PDCCH candidates, the second DCI scheduling a second communication for the UE, and communicate with the UE based on a reference time and according to the first DCI and the second DCI, where the reference timing rule defines the reference time based at least in part on the first DCI and the second DCI being received in-sequence.

Some examples of the method, apparatuses, and non-transitory computer-readable medium described herein may further include operations, features, means, or instructions for identifying that the reference timing rule defines the reference time as a PDCCH ending symbol that may be a last symbol of a last PDCCH candidate of a set of associated PDCCH candidates, the set of associated PDCCH candidates corresponding to the first plurality of PDCCH candidates, the second plurality of PDCCH candidates, or both.

In some examples of the method, apparatuses, and non-transitory computer-readable medium described herein, the reference timing rule defining that the first DCI and the second DCI may be received in-sequence may include operations, features, means, or instructions for applying the reference timing rule to the first set of multiple PDCCH candidates to determine the reference time, where the first set of multiple PDCCH candidates may be associated with a first feedback process identifier and the second set of multiple PDCCH candidates may be associated with a second feedback process identifier and verifying that the second set of multiple PDCCH candidates end after the reference time but that the second communication starts after an end of the first communication.

Some examples of the method, apparatuses, and non-transitory computer-readable medium described herein may further include operations, features, means, or instructions for identifying that the reference timing rule defines the reference time as a PDCCH ending symbol that may be either a last symbol of an earliest PDCCH candidate of a set of associated PDCCH candidates or the last symbol of any PDCCH candidate of the set of associated PDCCH candidates, the set of associated PDCCH candidates corresponding to the first plurality of PDCCH candidates, the second plurality of PDCCH candidates, or both.

Some examples of the method, apparatuses, and non-transitory computer-readable medium described herein may further include operations, features, means, or instructions for identifying that the reference timing rule defines a first reference time as a first PDCCH ending symbol for a first set of associated PDCCH candidates and a second reference time as a second PDCCH ending symbol for a second set of associated PDCCH candidates, where when the first communication corresponds to the first set of associated PDCCH candidates and occurs before the second communication which corresponds with the second set of associated PDCCH candidates, the first reference time may be a last symbol of an earliest PDCCH candidate of the first set of associated PDCCH candidates and the second reference time may be the last symbol of a last PDCCH candidate of the second set of associated PDCCH candidates, or the first reference time may be a last symbol of the last PDCCH candidate of the first set of associated PDCCH candidates and the second reference time may be the last symbol of the earliest PDCCH candidate of the second set of associated PDCCH candidates.

In some examples of the method, apparatuses, and non-transitory computer-readable medium described herein, the reference time may be specified by the reference timing rule as one of a second transmission time period associated with a last received instance of the second DCI, a first transmission time period associated with a first received instance of the first DCI, or a last symbol associated with the first DCI or second DCI, the last symbol associated with any received instance of the first DCI or second DCI, or a first symbol associated with the first received instance of the first DCI and the last symbol associated with the last received instance of the second DCI, or the last symbol associated with the first received instance of the first DCI and the first symbol associated with the last received instance of the second DCI.

In some examples of the method, apparatuses, and non-transitory computer-readable medium described herein, the first set of multiple PDCCH candidates may be associated with a first set of transmission time periods and the second set of multiple PDCCH candidates may be associated with a second set of transmission time periods.

In some examples of the method, apparatuses, and non-transitory computer-readable medium described herein, the first communication and the second communication include uplink communications (e.g., PUCCH communications and/ or PUSCH communications), downlink communications (e.g., PDCCH communications and/or PDSCH communications), or both.

In some examples of the method, apparatuses, and non-transitory computer-readable medium described herein, the first plurality of PDCCH candidates are associated with a first set of repetitions of the first DCI and the second plurality of PDCCH candidates are associated with a second set of repetitions of the second DCI.

A method of wireless communication at a UE is described. The method may include monitoring for DCI among a set of PDCCH candidates that are associated with each other, the set of PDCCH candidates including at least a first PDCCH candidate in a first transmission time period of the set of PDCCH candidates and a last PDCCH candidate in a second transmission time period of the set of PDCCH candidates, identifying a reference timing rule based on the association between the set of PDCCH candidates, the reference timing rule indicating that a reference time is to be determined based on either the first transmission time period or the second transmission time period, determining the reference time based on the reference timing rule, and communicating based on the reference time.

An apparatus for wireless communication at a UE is described. The apparatus may include a processor, memory coupled with the processor, and instructions stored in the memory. The instructions may be executable by the processor to cause the apparatus to monitor for DCI among a set of PDCCH candidates that are associated with each other, the set of PDCCH candidates including at least a first PDCCH candidate in a first transmission time period of the set of PDCCH candidates and a last PDCCH candidate in a second transmission time period of the set of PDCCH candidates, identify a reference timing rule based on the association between the set of PDCCH candidates, the reference timing rule indicating that a reference time is to be determined based on either the first transmission time period or the second transmission time period, determine the reference time based on the reference timing rule, and communicate based on the reference time.

Another apparatus for wireless communication at a UE is described. The apparatus may include means for monitoring for DCI among a set of PDCCH candidates that are associated with each other, the set of PDCCH candidates including at least a first PDCCH candidate in a first transmission time period of the set of PDCCH candidates and a last PDCCH candidate in a second transmission time period of the set of PDCCH candidates, identifying a reference timing rule based on the association between the set of PDCCH candidates, the reference timing rule indicating that a reference time is to be determined based on either the first transmission time period or the second transmission time period, determining the reference time based on the reference timing rule, and communicating based on the reference time.

A non-transitory computer-readable medium storing code for wireless communication at a UE is described. The code may include instructions executable by a processor to monitor for DCI among a set of PDCCH candidates that are associated with each other, the set of PDCCH candidates including at least a first PDCCH candidate in a first transmission time period of the set of PDCCH candidates and a last PDCCH candidate in a second transmission time period of the set of PDCCH candidates, identify a reference timing rule based on the association between the set of PDCCH candidates, the reference timing rule indicating that a reference time is to be determined based on either the first transmission time period or the second transmission time period, determine the reference time based on the reference timing rule, and communicate based on the reference time.

Some examples of the method, apparatuses, and non-transitory computer-readable medium described herein may further include operations, features, means, or instructions for monitoring for one or more repetitions of the DCI indicating a SFI index among the set of PDCCH candidates, the SFI index identifying one or more communication directions for each slot in a set of upcoming slots, where the reference timing rule indicates the reference time to be used by the UE for application of the SFI index, identifying the set of upcoming slots based on the reference time and the SFI index, and communicating in the set of upcoming slots according to the one or more communication directions of each slot.

In some examples of the method, apparatuses, and non-transitory computer-readable medium described herein, the reference time may be specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

Some examples of the method, apparatuses, and non-transitory computer-readable medium described herein may further include operations, features, means, or instructions for monitoring for one or more repetitions of the DCI indicating a SS set group switching flag among the set of PDCCH candidates, the SS set group switching flag identifying an updated SS set group that the UE may be to use in a set of upcoming slots, where the reference timing rule indicates the reference time to be used by the UE for application of the SS set group switching flag, identifying the set of upcoming slots based on the reference time and the SS set group switching flag, and communicating in the set of upcoming slots according to the updated SS set group.

In some examples of the method, apparatuses, and non-transitory computer-readable medium described herein, the reference timing rule indicates that application of the updated SS set group switching flag may be to occur in a first slot that may be at least a first number of symbols after a last symbol of the reference time.

In some examples of the method, apparatuses, and non-transitory computer-readable medium described herein, the reference time may be specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

Some examples of the method, apparatuses, and non-transitory computer-readable medium described herein may further include operations, features, means, or instructions for initiating a timer at a start of the set of upcoming slots based on the reference time and the SS set group switching flag.

Some examples of the method, apparatuses, and non-transitory computer-readable medium described herein may further include operations, features, means, or instructions for receiving a configuration signal indicating a switching delay between the DCI indicating the SS set group switching flag and the set of upcoming slots, where the set of upcoming slots may be identified based on the switching delay.

Some examples of the method, apparatuses, and non-transitory computer-readable medium described herein may further include operations, features, means, or instructions for monitoring for one or more repetitions of the DCI indicating an interrupted transmission among the set of PDCCH candidates, the interrupted transmission identifying a set of physical resource blocks and symbols in a set of previous symbols in which a transmission scheduled for the UE may have been interrupted, where the reference timing rule indicates the reference time to be used by the UE for application of the interrupted transmission, identifying the set of previous symbols based on the reference time and the interrupted transmission, and refraining from communicating in the set of previous symbols according to the interrupted transmission.

In some examples of the method, apparatuses, and non-transitory computer-readable medium described herein, the reference timing rule indicates that application of the interrupted transmission may be to occur in a number of symbols that may be prior to a first symbol of the reference time.

In some examples of the method, apparatuses, and non-transitory computer-readable medium described herein, the reference time may be specified by the reference timing rule as one of the first transmission time period associated with the first PDCCH candidate, the second transmission time period associated with the last PDCCH candidate, or additionally a PDCCH candidate index among the set of PDCCH candidates, a SS set identifier associated with the set of PDCCH candidates, or a control resource set identifier associated with the set of PDCCH candidates.

Some examples of the method, apparatuses, and non-transitory computer-readable medium described herein may further include operations, features, means, or instructions for monitoring for one or more repetitions of the DCI indicating a cancelation indication among the set of PDCCH candidates, the cancelation indication identifying a set of physical resource blocks and symbols in a set of upcoming symbols in which the UE may be to cancel uplink transmission, where the reference timing rule indicates the reference time to be used by the UE for application of the cancelation indication, identifying the set of upcoming symbols based on the reference time and the cancelation indication, and refraining from performing uplink transmissions in the set of upcoming symbols according to the cancelation indication.

In some examples of the method, apparatuses, and non-transitory computer-readable medium described herein, the reference timing rule indicates that application of the cancelation indication may be to occur in a first symbol after a processing time that follows the reference time.

In some examples of the method, apparatuses, and non-transitory computer-readable medium described herein, the reference time may be specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

Some examples of the method, apparatuses, and non-transitory computer-readable medium described herein may further include operations, features, means, or instructions for monitoring for one or more repetitions of the DCI indicating a BWP change among the set of PDCCH candidates, the BWP change identifying a change in a BWP configured for the UE in a set of upcoming slots, where the reference timing rule indicates the reference time to be used by the UE for application of the BWP change, identifying the set of upcoming slots based on the reference time and the BWP change, refraining from communicating during a time period between the first transmission time period or the second transmission time period in which the DCI indicating the BWP change may be received and the set of upcoming slots, and communicating in the set of upcoming slots according to the BWP change.

In some examples of the method, apparatuses, and non-transitory computer-readable medium described herein, the reference time may be specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

Some examples of the method, apparatuses, and non-transitory computer-readable medium described herein may further include operations, features, means, or instructions for monitoring for at least two DCI scheduling corresponding communications with the UE, the at least two DCI scheduling at least one of uplink communications, downlink communications, or both, for the UE, where the reference timing rule indicates the reference time to be used by the UE for application of an in-sequence delivery rule for the at least two DCI, determining that the at least two DCI scheduling corresponding communications with the UE may be received in-sequence based on the reference time and the in-sequence delivery rule, and performing the communications according to the at least two DCI.

In some examples of the method, apparatuses, and non-transitory computer-readable medium described herein, the reference time may be specified by the reference timing rule as one of the second transmission time period associated with a last received instance of the at least two DCI, the first transmission time period associated with a first received instance of the at least two DCI, or a last symbol associated with either of the at least two DCI, the last symbol associated with any received instance of the at least two DCI, or a first symbol associated with the first received instance of a first DCI of the at least two DCI and the last symbol associated with the last received instance of a last DCI of the at least two DCI, or the last symbol associated with the first received instance of the first DCI of the at least two DCI and the first symbol associated with the last received instance of the last DCI of the at least two DCI.

A method of wireless communication at a base station is described. The method may include identifying, for a UE, a set of PDCCH candidates that are associated with each other and used to convey DCI, the set of PDCCH candidates including at least a first PDCCH candidate in a first transmission time period of the set of PDCCH candidates and a last PDCCH candidate in a second transmission time period of the set of PDCCH candidates, identifying, for the UE, a reference timing rule based on the association between the set of PDCCH candidates, the reference timing rule indicating that a reference time is to be determined based on either the first transmission time period or the second transmission time period, transmitting, to the UE, one or more instances of the DCI among the set of PDCCH candidates, and communicating with the UE based on the reference time, the reference time being based on the reference timing rule.

An apparatus for wireless communication at a base station is described. The apparatus may include a processor, memory coupled with the processor, and instructions stored in the memory. The instructions may be executable by the processor to cause the apparatus to identify, for a UE, a set of PDCCH candidates that are associated with each other and used to convey DCI, the set of PDCCH candidates including at least a first PDCCH candidate in a first transmission time period of the set of PDCCH candidates and a last PDCCH candidate in a second transmission time period of the set of PDCCH candidates, identify, for the UE, a reference timing rule based on the association between the set of PDCCH candidates, the reference timing rule indicating that a reference time is to be determined based on either the first transmission time period or the second transmission time period, transmit, to the UE, one or more instances of the DCI among the set of PDCCH candidates, and communicate with the UE based on the reference time, the reference time being based on the reference timing rule.

Another apparatus for wireless communication at a base station is described. The apparatus may include means for identifying, for a UE, a set of PDCCH candidates that are associated with each other and used to convey DCI, the set of PDCCH candidates including at least a first PDCCH candidate in a first transmission time period of the set of PDCCH candidates and a last PDCCH candidate in a second transmission time period of the set of PDCCH candidates, identifying, for the UE, a reference timing rule based on the association between the set of PDCCH candidates, the reference timing rule indicating that a reference time is to be determined based on either the first transmission time period or the second transmission time period, transmitting, to the UE, one or more instances of the DCI among the set of PDCCH candidates, and communicating with the UE based on the reference time, the reference time being based on the reference timing rule.

A non-transitory computer-readable medium storing code for wireless communication at a base station is described. The code may include instructions executable by a processor to identify, for a UE, a set of PDCCH candidates that are associated with each other and used to convey DCI, the set of PDCCH candidates including at least a first PDCCH candidate in a first transmission time period of the set of PDCCH candidates and a last PDCCH candidate in a second transmission time period of the set of PDCCH candidates, identify, for the UE, a reference timing rule based on the association between the set of PDCCH candidates, the reference timing rule indicating that a reference time is to be determined based on either the first transmission time period or the second transmission time period, transmit, to the UE, one or more instances of the DCI among the set of PDCCH candidates, and communicate with the UE based on the reference time, the reference time being based on the reference timing rule.

Some examples of the method, apparatuses, and non-transitory computer-readable medium described herein may further include operations, features, means, or instructions for identifying, for the UE, a SFI index identifying one or more communication directions for each slot in a set of upcoming slots, where the reference timing rule indicates the reference time to be used by the UE for application of the SFI index, transmitting one or more repetitions of the DCI indicating the SFI index among the set of PDCCH candidates, and communicating with the UE in the set of upcoming slots according to the one or more communication directions of each slot.

In some examples of the method, apparatuses, and non-transitory computer-readable medium described herein, the reference time may be specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

Some examples of the method, apparatuses, and non-transitory computer-readable medium described herein may further include operations, features, means, or instructions for identifying, for the UE, a SS set group switching flag identifying an updated SS set group that the UE may be to use in a set of upcoming slots, where the reference timing rule indicates the reference time to be used by the UE for application of the SS set group switching flag, transmitting one or more repetitions of the DCI indicating the SS set group switching flag among the set of PDCCH candidates, and communicating in the set of upcoming slots according to the updated SS set group.

In some examples of the method, apparatuses, and non-transitory computer-readable medium described herein, the reference timing rule indicates that application of the SS set group switching flag may be to occur in a first slot that may be at least a first number of symbols after a last symbol of the reference time.

In some examples of the method, apparatuses, and non-transitory computer-readable medium described herein, the reference time may be specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

Some examples of the method, apparatuses, and non-transitory computer-readable medium described herein may further include operations, features, means, or instructions for transmitting, to the UE, a configuration signal indicating a switching delay between the DCI indicating the SS set group switching flag and the set of upcoming slots, where the set of upcoming slots may be identified by the UE based on the switching delay.

Some examples of the method, apparatuses, and non-transitory computer-readable medium described herein may further include operations, features, means, or instructions for identifying, for the UE, an interrupted transmission identifying a set of physical resource blocks and symbols in a set of previous symbols in which a transmission scheduled for the UE may have been interrupted, where the reference timing rule indicates the reference time to be used by the UE for application of the interrupted transmission, transmitting one or more repetitions of the DCI indicating the interrupted transmission among the set of PDCCH candidates, and refraining from communicating with the UE in the set of previous symbols according to the interrupted transmission.

In some examples of the method, apparatuses, and non-transitory computer-readable medium described herein, the reference timing rule indicates that application of the interrupted transmission may be to occur in a number of symbols that may be prior to a first symbol of the reference time.

In some examples of the method, apparatuses, and non-transitory computer-readable medium described herein, the reference time may be specified by the reference timing rule as one of first transmission time period associated with the first PDCCH candidate, the second transmission time period associated with the last PDCCH candidate, or additionally a PDCCH candidate index among the set of PDCCH candidates, a SS set identifier associated with the set of PDCCH candidates, or a control resource set identifier associated with the set of PDCCH candidates.

Some examples of the method, apparatuses, and non-transitory computer-readable medium described herein may further include operations, features, means, or instructions for identifying, for the UE, a cancelation indication identifying a set of physical resource blocks and symbols in a set of upcoming symbols in which the UE may be to cancel an uplink transmission, where the reference timing rule indicates the reference time to be used by the UE for application of the cancelation indication, transmitting one or more repetitions of the DCI indicating the cancelation indication among the set of PDCCH candidates, and refraining from receiving uplink transmissions from the UE in the set of upcoming symbols according to the cancelation indication.

In some examples of the method, apparatuses, and non-transitory computer-readable medium described herein, the reference timing rule indicates that application of the cancelation indication may be to occur in a number of symbols that may be after a first symbol of the reference time.

In some examples of the method, apparatuses, and non-transitory computer-readable medium described herein, the reference time may be specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

Some examples of the method, apparatuses, and non-transitory computer-readable medium described herein may further include operations, features, means, or instructions for identifying, for the UE, a BWP change identifying a change in a BWP configured for the UE in a set of upcoming slots, where the reference timing rule indicates the reference time to be used by the UE for application of the BWP change, transmitting one or more repetitions of the DCI indicating the BWP change among the set of PDCCH candidates, the BWP change, refraining from communicating with the UE during a time period between the first transmission time period or the second transmission time period in which the DCI indicating the BWP change may be receive and the set of upcoming slots, and communicating with the UE in the set of upcoming slots according to the BWP change.

In some examples of the method, apparatuses, and non-transitory computer-readable medium described herein, the reference time may be specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

Some examples of the method, apparatuses, and non-transitory computer-readable medium described herein may further include operations, features, means, or instructions for identifying at least two DCI scheduling at least one of uplink communications, downlink communications, or both, for the UE, where the reference timing rule indicates the reference time to be used by the UE for application of an in-sequence delivery rule for the at least two DCI, transmitting the at least two DCI scheduling corresponding communications with the UE, and performing the communications with the UE according to the at least two DCI.

In some examples of the method, apparatuses, and non-transitory computer-readable medium described herein, the reference time may be specified by the reference timing rule as one of the second transmission time period associated with a last received instance of the at least two DCI, the first transmission time period associated with a first received instance of the at least two DCI, or a last symbol associated with either of the at least two DCI, the last symbol associated with any received instance of the at least two DCI, or a first symbol associated with the first received instance of a first DCI of the at least two DCI and the last symbol associated with the last received instance of a last DCI of the at least two DCI, or the last symbol associated with the first received instance of the first DCI of the at least two DCI and the first symbol associated with the last received instance of the last DCI of the at least two DCI.

BRIEF DESCRIPTION OF THE DRAWINGS

FIGS. 18 through 23 show flowcharts illustrating methods that support linked PDCCH candidate rules in accordance with aspects of the present disclosure.

DETAILED DESCRIPTION

Figure 1:
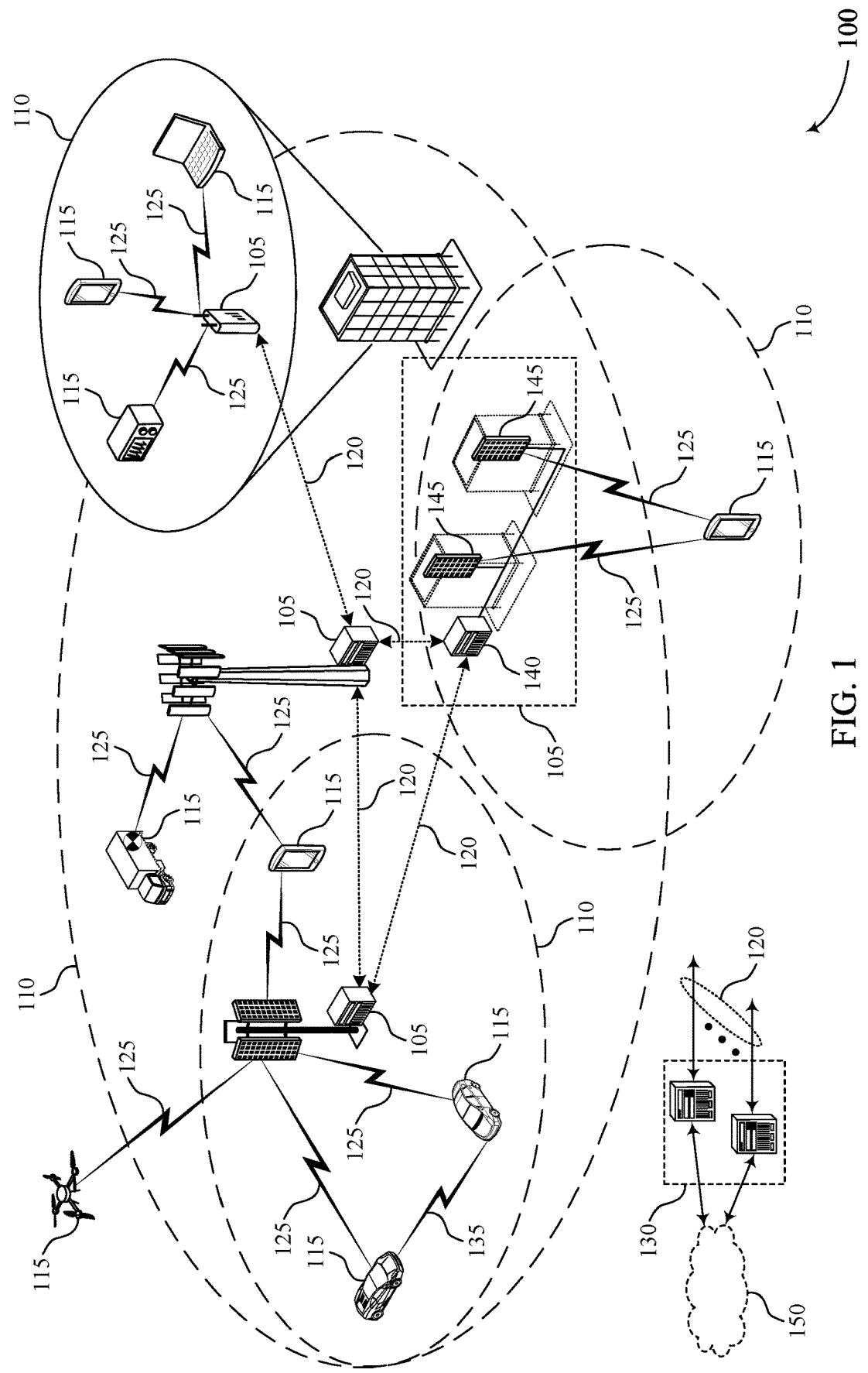
FIG. 1 illustrates an example of a system for wireless communications that supports linked physical downlink control channel (PDCCH) candidate rules in accordance with aspects of the present disclosure.

Wireless communications systems may use various downlink control information (DCI) formats to convey different indications to connected user equipment (UE). For example, DCI formats 2_x are used to indicate information such as a slot format indicator (SFI) index, changes to the search space (SS) set configuration for a UE, changes to the bandwidth part (BWP) configuration for the UE, and the like. Other DCI formats may be used to schedule uplink communications from the UE (e.g., physical uplink shared channel (PUSCH) communications) and/or downlink communications to the UE (e.g., physical downlink shared channel (PDSCH) communications). Generally, the DCI may explicitly/implicitly indicate such changes/scheduling for the UE, but the timing of the change (for example, when the change is to take place) is understood by the UE to follow certain rules (depending on the change). For many rules, the timing of the change is relative to some aspect of the DCI—often a first or last symbol of the physical downlink control channel (PDCCH) candidate carrying the DCI.

However, linked PDCCH candidates may be used in some wireless communications systems. A linked PDCCH candidate may be used, for example, to transmit repetitions of a DCI. When the linked PDCCH candidates include a repeated DCI, and when the DCI indicates some of the changes/scheduling identified above, the current timing rules for applying the change may not be helpful. For example, if a UE receives two instances of a repeated DCI (in different PDCCH candidates), the UE may not know which PDCCH candidate to use to actually trigger the change. As an example, the UE may not know whether to use the first symbol/last of a first PDCCH candidate or a first/last symbol of a second PDCCH candidate as a reference for the timing of the change. This may result in the UE and base station being out-of-sync with respect to the indicated change, which may disrupt communications.

Aspects of the disclosure are initially described in the context of wireless communications systems. Generally, the described techniques provide rules that may be applied when linked or otherwise associated PDCCH candidates carry DCI(s) indicating information for a UE. For example, a base station and/or UE may identify a reference timing rule that generally defines that a reference time for a change, transmission, update, etc., indicated in the DCI is determined based on a timing of a first PDCCH candidate or a last PDCCH candidate among the linked PDCCH candidates. The specific reference timing rule may vary based on the specific type of change, transmission, update, etc., being signaled in the DCI. Examples of scenarios where the reference timing rule may be applied include, but are not limited to, SFI index indications, SS set group switching indications, timing for application of an interrupted transmission indication, timing for application of a cancellation indication, timing for a BWP change indications, application of an in-order or out-of-order transmission scheduling, and the like.

Aspects of the disclosure are further illustrated by and described with reference to apparatus diagrams, system diagrams, and flowcharts that relate to linked PDCCH candidate rules.

FIG. 1 illustrates an example of a wireless communications system 100 that supports linked PDCCH candidate rules in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-*c* carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more SS sets, and each SS set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. SS sets may include common SS sets configured for sending control information to multiple UEs 115 and UE-specific SS sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may monitor for DCI among a plurality of PDCCH candidates that are associated with each other, the plurality of PDCCH candidates including at least a first PDCCH candidate in a first transmission time period of the plurality of PDCCH candidates and a last PDCCH candidate in a second transmission time period of the plurality of PDCCH candidates. The UE 115 may identify a reference timing rule based at least in part on the association between the plurality of PDCCH candidates, the reference timing rule indicating that a reference time is to be determined based at least in part on either the first transmission time period or the second transmission time period. The UE 115 may determine the reference time based at least in part on the reference timing rule. The UE 115 may communicate based at least in part on the reference time.

A base station 105 may identify, for a UE 115, a plurality of PDCCH candidates that are associated with each other and used to convey DCI, the plurality of PDCCH candidates including at least a first PDCCH candidate in a first transmission time period of the plurality of PDCCH candidates and a last PDCCH candidate in a second transmission time period of the plurality of PDCCH candidates. The base station 105 may identify, for the UE 115, a reference timing rule based at least in part on the association between the plurality of PDCCH candidates, the reference timing rule indicating that a reference time is to be determined based at least in part on either the first transmission time period or the second transmission time period. The base station 105 may transmit, to the UE 115, one or more instances of the DCI among the plurality of PDCCH candidates. The base station 105 may communicate with the UE 115 based at least in part on the reference time, the reference time being based at least in part on the reference timing rule.

Figure 2:
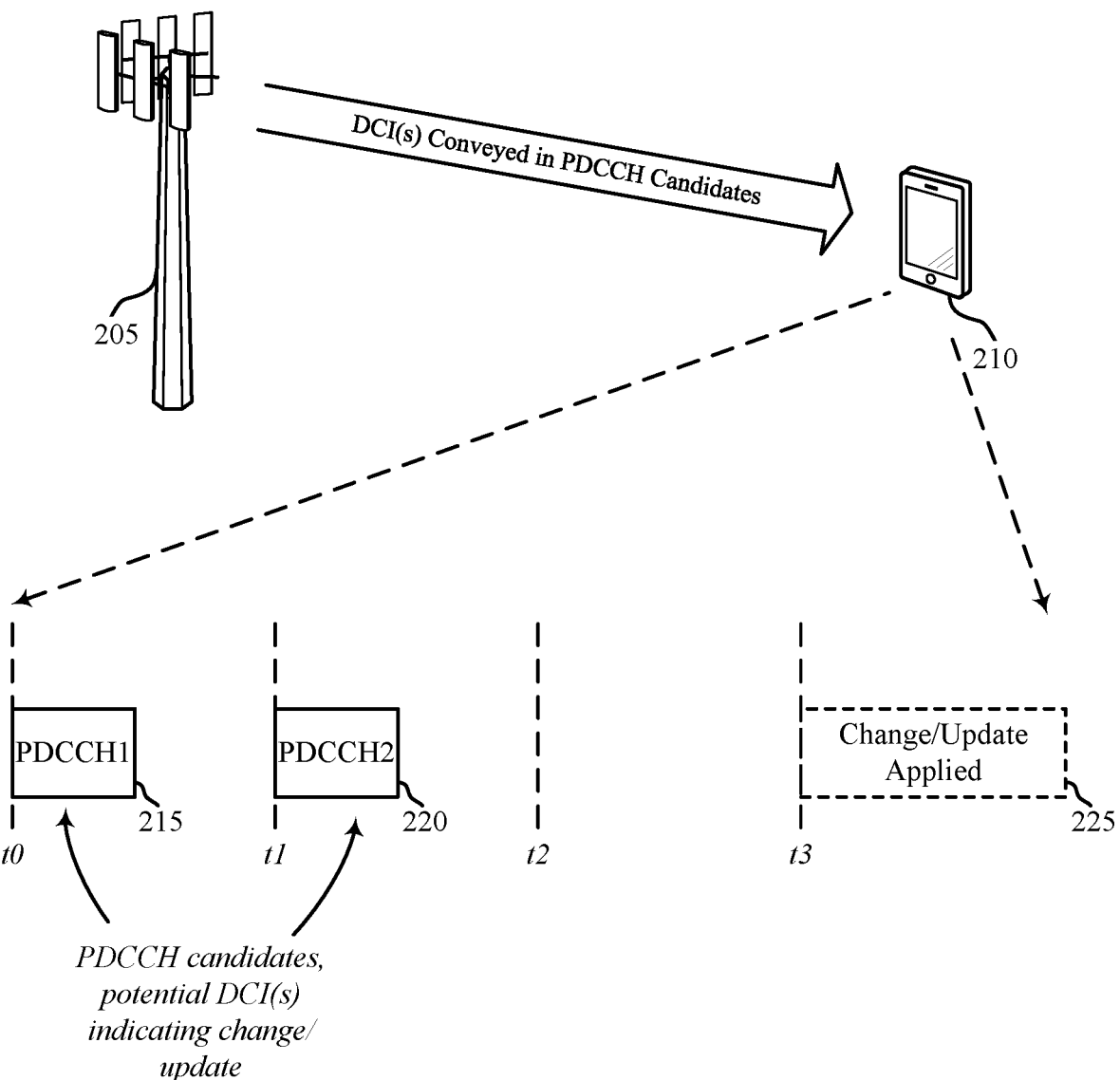
FIG. 2 illustrates an example of a wireless communication system that supports linked PDCCH candidate rules in accordance with aspects of the present disclosure.

FIG. 2 illustrates an example of a wireless communication system 200 that supports linked or otherwise associated PDCCH candidate rules in accordance with aspects of the present disclosure. In some examples, wireless communication system 200 may implement aspects of wireless communication system 100. Wireless communication system 200 may include base station 205 and/or UE 210, which may be examples of the corresponding devices described herein. In some aspects, base station 205 may be a serving base station for UE 210 and configure UE 210 with a plurality of PDCCH candidates that are linked together or otherwise associated with each other.

For example, UE 210 may be configured with up to three, five, or some other number of CORESETs in a BWP of a serving cell (e.g., on a per-CC basis). Each CORESET may be associated with one active transmission configuration indicator (TCI) state. For example, as part of CORESET configurations, the resource block(s) (RB)(s) of a CORESET in the frequency domain and/or a number of symbols of the CORESET (1/2/3 OFDM symbols) may be RRC configured. Each SS set may be associated with one CORESET. There may be up to ten SS sets in a BWP of the component carrier. As part of SS set configurations, the following may be RRC configured: the associated CORESET; the monitoring slots periodicity and offset, and monitoring symbols within the slot (time domain monitoring); the DCI formats for the UE to monitor; the number of PDCCH candidates for a given aggregation level (AL); and the like.

PDCCH candidates may be defined as part of SS set configurations (e.g., base station 205 may configure PDCCH candidates that UE 210 is to monitor for DCI scheduling communications, indicating changes/updates to be applied, and the like). A PDCCH candidate with a given AL and a given PDCCH candidate index/identifier may be defined in a given SS set. A DCI may then be received in a PDCCH candidate. That is, UE 210 monitors PDCCH candidates in SS sets, and one or more candidates that pass a CRC (successful decoding) may correspond to a successfully received and decoded DCI. Accordingly, a control channel candidate (e.g., a PDCCH candidate) may also be referred to as a potential DCI, as an encoded DCI and/or as a data carrying DCI. The decoding attempt(s) by UE 210 may be considered blind decoding attempt(s) (e.g., UE blindly attempts to decode the PDCCH candidates to determine if the CRC passes, and therefore the PDCCH candidate carries a DCI for UE 210).

In some examples, wireless communication system 200 may be configured to enable a PDCCH transmission with two TCI states. One alternative to support this may include one CORESET being associated with two active TCI states. Another alternative may include one SS set being associated with two different CORESETs. Another alternative may include two SS sets being associated with corresponding CORESETs (e.g., each SS set is associated with a different CORESET). In some aspects, the following features may be considered: the multiplexing schemes (e.g., TDM, FDM, SFN, and/or combined multiplexing schemes), the blind decode (BD)/CCE limits configured for UE 210, an over-booking configuration, the CCE-resource element group (REG) mapping, the PDCCH candidate CCEs (e.g., based on a hashing function), the CORESET/SS set configurations, and other procedural impacts.

For the first alternative where one CORESET is associated with two active TCI states, one variation of this may include one PDCCH candidate (in a given SS set) being associated with both TCI states of the CORESET. Another variation of this may include two sets of PDCCH candidates (in a given SS set) that are associated with (e.g., linked) the two TCI states of the CORESET, respectively. Another variation of this may include two sets of PDCCH candidates being associated with two corresponding SS sets, where both SS sets are associated with the CORESET and each SS set is associated with one TCI state of the CORESET. In some aspects, a set of PDCCH candidates may contain a single or multiple PDCCH candidates, and a PDCCH candidate in a set corresponds to a repetition or chance for UE 210 to monitor for a DCI. In some aspects of the alternatives discussed above, two (or more) PDCCH candidates may be explicitly linked together or otherwise associated (e.g., UE 210 may know the linkage/association before attempting to decode a DCI in a PDCCH candidate), such as using RRC signaling, a MAC CE, DCI, and the like. In other aspects, two (or more) PDCCH candidates may not be explicitly linked together (e.g., UE 210 may not know the linking before attempting to decode a PDCCH candidate). Regardless, the PDCCH candidates may be linked together or otherwise associated with each other based on any of the features discussed above. In some aspects, the PDCCH candidates may be linked together or otherwise associated with each other based on being used to convey repetition(s) of the same DCI.

In some aspects, wireless communication system 200 may support PDCCH repetition. For example, PDCCH repetition may be configured where each repetition is a PDCCH candidate, and two or more PDCCH candidates are linked together for possible repetition of the same information (e.g., may carry the same DCI). That is, base station 205 may configure UE 210 with a plurality of PDCCH candidates that are associated with each other (e.g., PDCCH candidates associated with one CORESET with two active TCI states, PDCCH candidates associated with one SS set that is associated with two different CORESETS, etc.). In this situation, UE 210 may successfully decode the DCI carried in the first repetition, the second repetition, and/or both repetitions by soft combining the first and second repetitions together. This may result in the situation where the network may not know which repetition of the DCI that UE 210 has successfully decoded.

In some aspects, the information that is determined by UE 210 as a result of successfully decoding a DCI (e.g., PDCCH format detection) is not only a function of the DCI payload (e.g., the information carried or otherwise conveyed in the DCI) but also based on a function of the timing where the DCI is detected (e.g., the first symbol and/or last symbol of the detected DCI may be used as a reference time to either interpret the DCI payload and/or perform an action). Given the ambiguity in this situation with two linked or otherwise associated PDCCH candidates (e.g., using PDCCH repetition), the network (e.g., via base station 205) and UE 210 may not be on the same page, or otherwise synchronized, with respect to the action or interpretation of the information conveyed by the DCI. That is, if the payload and the timing of a DCI carried in a PDCCH candidate both convey information to be acted upon by UE 210 (e.g., the payload of the DCI may indicate the action and the timing of the DCI may be considered a reference time used to determine when the action is to be applied to or otherwise references), a plurality of PDCCH candidates that are associated with each other may create the situation where UE 210 may decode the first repetition of the DCI carried in a first PDCCH candidate (e.g., first PDCCH candidate 215) and/or the second repetition of the DCI carried in a second PDCCH candidate (e.g., second PDCCH candidate 220), e.g., using soft combining. In this scenario, the timing function/information of the DCI may be lost to both base station 205 and UE 210. This out-of-synchronization scenario may result in the action not being taken by UE 210 and/or the timing of the action implemented by UE 210 being incorrect, which may result in a loss of communications.

Accordingly, aspects of the described techniques define various rules (e.g., reference timing rules) that may be adopted when base station 205 is transmitting DCI to UE 210 in a plurality of associated PDCCH candidates. Broadly, the reference timing rule may be utilized by base station 205 and/or UE 210 in order to identify or otherwise determine a reference time used for application of the action indicated in the DCI. That is, the reference timing rules may be implemented in wireless communication system 200 that may, for a given DCI action/scheduling, be used to determine the timing function of the DCI triggering the action/scheduling, regardless of which PDCCH candidate(s) that UE 210 successfully recovers the DCI from.

For example, base station 205 may identify or otherwise determine a plurality PDCCH candidates that are associated with each other and used to convey DCI. For example, the plurality of PDCCH candidates may be associated with repetition-based PDCCH candidates where each or some PDCCH candidate(s) may carry a repetition of the DCI. The plurality PDCCH candidates may be associated with each other by other means (e.g., such as the alternatives discussed above where one CORESET is associated with two active TCI states, one SS set is associated with two different CORESETs, and the like). Accordingly, the plurality of PDCCH candidates may include a first PDCCH candidate 215 in a first transmission time period (e.g., in a first set of symbol(s) of a first slot and/or in a first slot that may begin at time t0, in this example) and a second PDCCH candidate 220 in a second transmission time period (e.g., in a second set of symbol(s) of a second slot and/or a second slot that may begin at time t1, in this example). The second PDCCH candidate 220 may also be considered as a last PDCCH candidate in this example where the plurality PDCCH candidates include two PDCCH candidates. However, in other examples there may be more than two PDCCH candidates in the plurality PDCCH candidates.

Base station 205 may identify or otherwise determine a reference timing rule to be applied based, at least in some aspects, on the association between the plurality of PDCCH candidates. That is, base station 205 may determine that it has DCI(s) to transmit to UE 210 carrying or otherwise conveying an indication of a change (e.g., a SFI index change, a cancelation indication, a BWP change, etc.), scheduling communications with UE 210 (e.g., in compliance with an in-sequence delivery rule), and the like. Base station 205 may determine that one or more repetitions of the DCI may be conveyed among the associated PDCCH candidates. Accordingly, base station 205 may identify a reference timing rule applicable to the change/scheduling being signaled by the DCI repetitions carried in the plurality of associated PDCCH candidates. As discussed above, the reference timing rule may generally indicate that a reference time (e.g., associated with the change/scheduling) is to be determined based on the first transmission time period or the second transmission time period. That is, the reference timing rule may be applied to specify the reference time in which the change/scheduling information carried in the DCI is to be applied, regardless of which PDCCH candidate(s) that UE 210 successfully recovers the DCI from. Accordingly, base station 205 may transmit one or more instances of the DCI among the plurality PDCCH candidates to UE 210. Hence, by applying a reference timing rule to determine a reference time and/or by specifying the reference time for applying the information carried by the control channel candidate(s) via a reference timing rule, the advantage of preventing a loss of synchronization between the receiving and transmitting entities in the communication network may be achieved even when multiple associated or linked control channel candidates exist that could otherwise lead to ambiguity regarding the correct timing that shall be applied, thus preventing a loss of communications.

UE 210 may monitor for or otherwise detect the DCI (e.g., one or more repetitions of the DCI) among the plurality of associated PDCCH candidates. UE 210 may also identify or otherwise determine the reference timing rule to be applied for the change/update 225 triggered by the DCI (e.g., to be applied for the SFI index, BWP change, communications scheduled by two DCI, and the like). That is, UE 210 may determine the reference time for the change/update 225 application based on the reference timing rule in the situation where one or more repetitions of the DCI are successfully recovered (e.g., CRC passes) from associated or otherwise linked PDCCH candidates. Accordingly, base station 205 and UE 210 may communicate based on the reference time.

That is, UE 210 may recover one or more repetitions of the DCI triggering change/update 225 from among the plurality PDCCH candidates. UE 210 may decode the DCI(s) (e.g., recovered from the first PDCCH candidate 215, from the second PDCCH candidate 220, and/or from both repetitions when soft combined by UE 210). With regard to the timing function for the change/update 225 signaled by the DCI(s), UE 210 may apply the reference timing rule to this situation in order to determine when to implement the change/update 225 (e.g., beginning at time t3 in the non-limiting example illustrated in FIG. 2).

As discussed above, examples of the change/update 225 indicated by the recovered DCI(s) may correspond to a SFI index, SS set group switching, a cancelation indication (e.g., canceling one or more uplink transmissions previously scheduled for UE 210), BWP switching, and the like. Another example of the change/update 225 indicated by the recovered DCI(s) may correspond to an interrupted transmission. That is, although change/update 225 is illustrated as beginning at time t3, in some examples the recovered DCI(s) may indicate that PDSCH transmission(s) previously scheduled to UE 210 (e.g., in a set of previous symbol(s)) may have been interrupted or otherwise corrupted. In this situation, the recovered DCI(s) may identify the number of symbols prior to the reference time in order to determine which symbol(s) that UE 210 is to discard from the interrupted downlink transmission. Accordingly, in this example the change/update 225 would occur prior to the reference time rather than after the reference time as illustrated.

Another example of the change/update 225 indicated by the recovered DCI(s) may correspond to a grant scheduling communications for UE 210 (e.g., PDSCH and/or PUSCH communications). That is, in some examples wireless communication system 200 may support in-order delivery of DCI grants scheduling communications with UE 210. However, in the situation where UE 210 may receive one or more of the DCI grants among the plurality of PDCCH candidates, this may impact whether the corresponding communication is scheduled in the proper order (e.g., comports with the in-sequence/in-order delivery rule). In this situation, UE 210 may apply the reference timing rule in order to determine the reference time to ensure, when possible, the proper order for sequencing the DCI grants scheduling PDSCH/PUSCH communications with UE 210. This sequencing may be used to determine conformance with the in-sequence delivery rule.

Accordingly, the described techniques provide various reference timing rules that may be applied by base station 205 and UE 210 when communicating DCI(s) among a plurality of linked or otherwise associated PDCCH candidates. The reference timing rules may be applied in order to determine the reference time with respect to the DCI(s) signaling the change/update 225. Base station 205 and UE 210 may therefore continue to be synchronized in terms of application of the change/update 225 triggered by the DCI(s).

Figure 3:
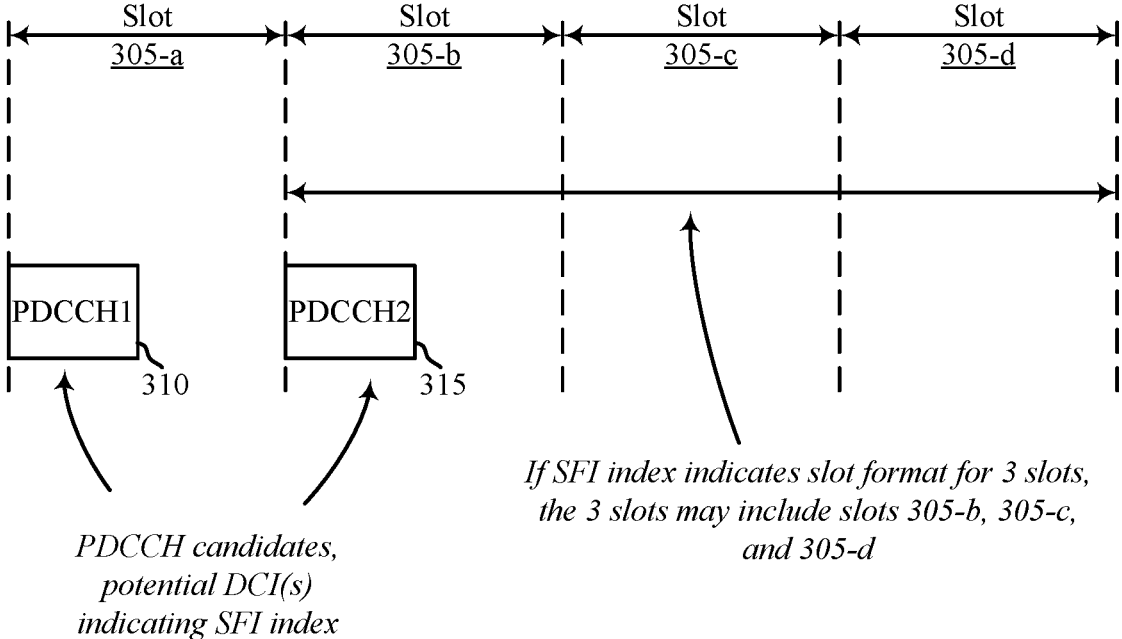
FIG. 3 illustrates an example of a timing configuration that supports linked PDCCH candidate rules in accordance with aspects of the present disclosure.

FIG. 3 illustrates an example of a timing configuration 300 that supports linked or otherwise associated PDCCH candidate rules in accordance with aspects of the present disclosure. In some examples, timing configuration 300 may implement aspects of wireless communication systems 100 and/or 200. Aspects of timing configuration 300 may be implemented by or at a UE and/or base station, which may be examples of the corresponding devices described herein. Broadly, timing configuration 300 illustrates an example where DCI(s) carried among a plurality of PDCCH candidates indicate or otherwise identify a SFI index to be applied in a set of upcoming slots.

As discussed above, aspects of the described techniques provide for reference timing rules to be applied by the base station and UE in the situation where DCI(s) are conveyed or otherwise carried in a plurality of PDCCH candidates, such as a first PDCCH candidate 310 and a second PDCCH candidate 315. The first PDCCH candidate 310 may be scheduled in a first transmission time period, which may correspond to symbol(s) of slot 305-a in this example. The second PDCCH candidate 315 may be scheduled in a second transmission time period, which may correspond to symbol(s) of slot 305-b in this example. The reference timing rule may indicate that a reference time for application of the change/update indicated in the DCI (s) (e.g., the SFI index field in this example) is to be determined based on the first transmission time period or the second transmission time period. That is, the reference time may correspond to the point in time or other time marker from which the UE is to apply the change/update (the SFI index in this example) indicated in the DCI(s). Accordingly, the base station and UE may be synchronized or otherwise in agreement with respect to when the change/update will be applied, regardless of which PDCCH candidate(s) that the DCI(s) is/are recovered from.

In some aspects, a SFI index may be indicated in a DCI carried in a PDCCH candidate that uses a DCI format 2_0. The SFI index may generally identify the communication direction (e.g., the slot format, such as uplink (U), downlink (D), or flexible (F) symbols within the slot(s) 305) for a number of slots 305. That is, an SFI index field value indicated in DCI format 2_0 may convey an indication to the UE of a slot format for each slot 305 in a number of slots 305 for each downlink BWP and/or each uplink BWP. Typically, the reference time for applying the SFI index (e.g., identification of the slots 305 that the DCI is configuring the communication direction) is considered to start from the slot 305 where the UE detects the DCI format 2_0. However, when multiple repetitions of the DCI are conveyed among a plurality PDCCH candidates, the UE may recover the DCI in the first PDCCH candidate 310, the second PDCCH candidate 315, and/or both repetitions based on soft combining the DCI repetitions. In this situation, the base station and UE may be out of synchronization/agreement with respect to which slots 305 that the SFI index corresponds to. For example, if the UE misses the second PDCCH candidates 315, but recovers the DCI conveying the SFI index in the first PDCCH candidate 310, the UE may determine that the reference time begins at slot 305-a or some other slot 305. However, the base station may have intended the reference time to begin at slot 305-b, which may result in confusion between the base station and UE.

Accordingly, aspects of the described techniques provide for a reference timing rule to be applied in this situation.

That is, when two or more PDCCH candidates in different slots 305 are linked together or otherwise associated with each other and the UE monitors DCI format 2_0 for the same SFI indication in the two or more PDCCH candidates, the SFI-index field value in DCI format 2_0, is applied to a number of slots 305 starting from the reference time. In one example, the reference timing rule may indicate that the reference time corresponds to the slot 305 corresponding to the last PDCCH candidate in time among the two or more PDCCH candidates (e.g., the second PDCCH candidate 315 in this example). In another example, the reference timing rule may indicate that the reference time corresponds to the slot 305 corresponding to the earliest PDCCH candidate among the two or more PDCCH candidates, that is corresponding to a first PDCCH candidate in time (e.g., the first PDCCH candidate 310 in this example). In another example, the reference timing rule may indicate that the reference time may be based on the slot 305 of a PDCCH candidate with the lowest or highest PDCCH candidate index, SS set identifier (ID), and/or CORESET ID. These examples are irrespective of which of the one or more PDCCH candidates of the two or more PDCCH candidates that the DCI format 2_0 is detected.

Accordingly, the UE may monitor for one or more repetitions of the DCI indicating the SFI index among the plurality of PDCCH candidates. The SFI index may identify one or more communication directions (e.g., U/D/F) for each slot 305 in a set of upcoming slots (with the set of upcoming slots including slot 305-*b*, 305-*c*, and 305-*d* in the example illustrated in FIG. 3). In this situation, the reference timing rule may indicate the reference time to be used by the UE for application of the SFI index. Accordingly, the UE may identify the set of upcoming slots based at least in part on the reference time and the SFI index. The UE and base station may communicate in the set of upcoming slots according to the one or more communication directions of each symbol/slot.

As discussed above, the reference time may be specified by the reference timing rule as one of the second transmission time period associated with the last PDCCH candidate (e.g., the second PDCCH candidate 315 in this example) or the first transmission time period associated with the first PDCCH candidate (e.g., the first PDCCH candidate 310 in this example). As also discussed above, the reference time may be specified by the reference timing rule as being associated with, or otherwise based on, a PDCCH candidate index among the plurality of PDCCH candidates, a SS set ID associated with the plurality of PDCCH candidates, a CORESET ID associated with the plurality of PDCCH candidates, and the like.

Figure 4:
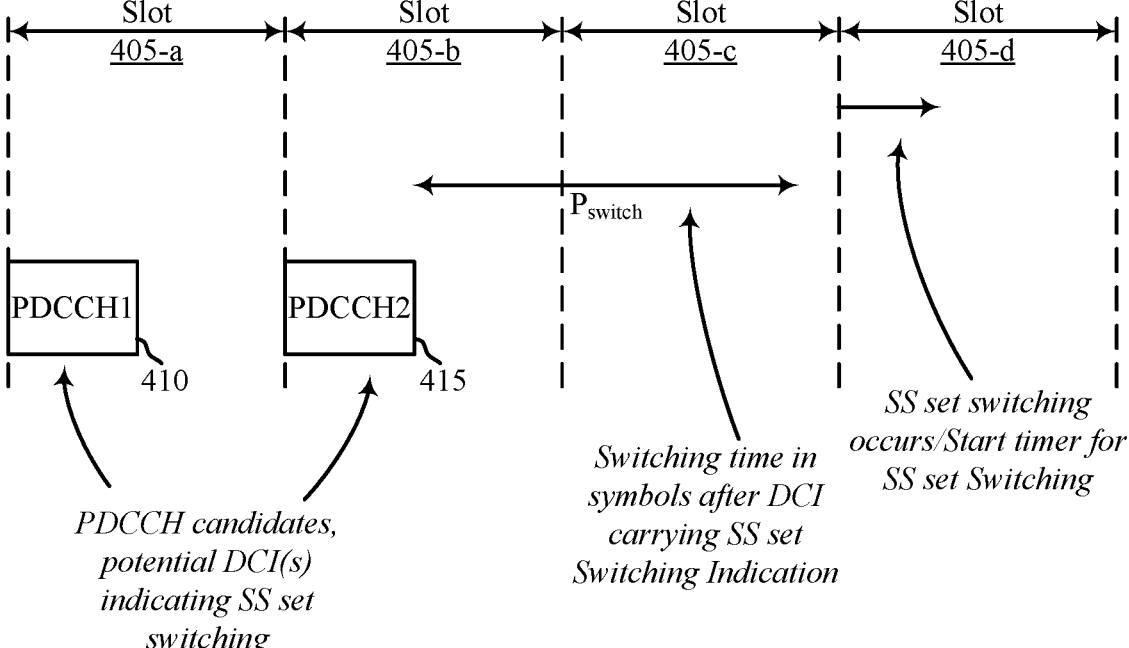
FIG. 4 illustrates an example of a timing configuration that supports linked PDCCH candidate rules in accordance with aspects of the present disclosure.

FIG. 4 illustrates an example of a timing configuration 400 that supports linked or otherwise associated PDCCH candidate rules in accordance with aspects of the present disclosure. In some examples, timing configuration 400 may implement aspects of wireless communication systems 100 and/or 200 and/or timing configuration 300. Aspects of timing configuration 400 may be implemented by or at a UE and/or base station, which may be examples of the corresponding devices described herein. Broadly, timing configuration 400 illustrates an example where DCI(s) carried among a plurality of PDCCH candidates indicate or otherwise identify a SS set group switching flag to be applied in a set of upcoming slots.

Aspects of the described techniques provide for reference timing rules to be applied by the base station and UE in the situation where DCI(s) conveyed or otherwise carried in a plurality of PDCCH candidates, such as a first PDCCH candidate 410 and a second PDCCH candidate 415. The first PDCCH candidate 410 may be scheduled in a first transmission time period, which may correspond to symbol(s) of slot 405-*a* in this example. The second PDCCH candidate 415 may be scheduled in a second transmission time period, which may correspond to symbol(s) of slot 405-*b* in this example. The reference timing rule may indicate that a reference time for application of the change/update indicated in the DCI(s) (e.g., the SS set group switching flag index field in this example) is to be determined based on the first transmission time period or the second transmission time period. That is, the reference time may correspond to the point in time or other time marker from which the UE is to apply the change/update (the SS set group switching flag in this example) indicated in the DCI(s). Accordingly, the base station and UE may be synchronized or otherwise in agreement with respect to when the change/update will be applied, regardless of which PDCCH candidate(s) that the DCI(s) is/are recovered from.

In some aspects, a SS set group switching flag may be indicated in a DCI carried in a PDCCH candidate that uses a DCI format 2_0, e.g., DCI format 2_0 may also be used for SS set group switching. For example, a UE may be provided with two groups of SS sets, and switch between the two SS sets. The switching mechanism may be explicit (e.g., a bit carried in a DCI format 2_0) or implicit (PDCCH decoding based), or based on a timer. In any scenario, the last symbols of the PDCCH candidate used to carry the DCI format 2_0 may be used as the reference time (e.g., plays a role in determining when the SS sets will switch). In some aspects, the time period corresponding to $P_{switch}$ may correspond to a number of symbols provided to the UE in RRC configuration signaling indicating a searchSpaceSwitchingDelay. That is, the $P_{switch}$ may correspond to the delay associated with the UE switching between SS set group indices.

For example, if a UE is provided by SearchSpaceSwitchTrigger-r16 with a location of a SS set group switching flag field for a serving cell in a DCI format 2_0, two configurations may be considered. In a first configuration, if the UE detects a DCI format 2_0 and a value of the SS set group switching flag field in the DCI format 2_0 is 0, the UE starts monitoring PDCCH according to SS sets with group index 0, and stops monitoring PDCCH according to SS sets with group index 1, on the serving cell at a first slot that is at least $P_{switch}$ symbols after the last symbol of the PDCCH with the DCI format 2_0, and the UE sets the timer value to the value provided by searchSpaceSwitchingTimer-r16. In a second configuration, if the UE detects a DCI format 2_0 and a value of the SS set group switching flag fields in the DCI format 2_0 is 1, the UE starts monitoring PDCCCH according to SS sets with the group index 1, and stops monitoring PDCCH according to SS sets with group index 0, on the serving cell at a first slot that is at least $P_{switch}$ symbols after the last symbol of the PDCCH with the DCI format 2_0, and the UE sets the timer value to the value provided by searchSpaceSwitchingTimer-r16. In the situation where the UE is not provided with SearchSpaceSwitchTrigger-r16 for a serving cell, if the UE detects a DCI format by monitoring PDCCH according to a SS set with group index 0, the UE starts monitoring PDCCH according to SS sets with group index 1, and stops monitoring PDCCH according to SS sets with group index 0, on the serving cell at a first slot that is at least $P_{switch}$ symbols after the last symbol of the PDCCH with the DCI format. The UE sets the timer value to the value provided by searchSpaceSwitchingTimer-r16 if the UE detects a DCI format by monitoring PDCCH in any SS set.

Accordingly, the timing of the DCI indicating the SS set group switching flag may determine the reference time that the UE will apply the SS set group switching (e.g., the first slot that is at least $P_{switch}$ symbols after the last symbol of the DCI). However, when multiple repetitions of the DCI are conveyed among a plurality PDCCH candidates, the UE may recover the DCI in the first PDCCH candidate 410, the second PDCCH candidate 415, and/or both repetitions based on soft combining the DCI repetitions. In this situation, the base station and UE may be out of synchronization/agreement with respect to which slots 405 that the SS set group switching flag corresponds to. For example, if the UE misses the second PDCCH candidates 415, but recovers the DCI conveying the SS set group switching flag in the first PDCCH candidate 410, the UE may determine that the reference time begins at a last symbol of the first PDCCH candidate 410 carrying the DCI in slot 405-*a*, which results in the UE applying the action in slot 405-*c*, which is after $P_{switch}$ symbols after the last symbols of the first PDCCH candidate 410. However, the base station may have intended the reference time to begin at some other point in time, e.g., for the UE to apply the action at slot 405-*d*, which may result in confusion between the base station and UE.

Accordingly, aspects of the described techniques provide for a reference timing rule to be applied in this situation. That is, when two or more PDCCH candidates are linked together and the UE monitors DCI format 2_0 for a SS set group switching flag in the two or more PDCCH candidates, if the UE detects the DCI format 2_0 in one or more PDCCH candidates, the UE considers a first slot 405 that is at least $P_{switch}$ symbols after the last symbol of the reference time. In one example, the reference timing rule may indicate that the reference time may correspond to the last PDCCH candidate among the one or more PDCCH candidates that are linked (e.g., the second PDCCH candidate 415 in this example). In another example, the reference timing rule may indicate that the reference time may correspond to the earliest PDCCH candidate among the two or more PDCCH candidates that are linked (e.g., the first PDCCH candidate in this example). In another example, the reference timing rule may indicate that the reference time may correspond a PDCCH candidate with the lowest or highest PDCCH candidate index, SS set ID, CORESET ID, and the like.

The first slot 405 as determined above may be used for switching from SS set group index 0 to group index 1, or vice versa, based on the SS set group switching flag field in the DCI format 2_0. The timer may be started when the UE is switched to SS set group index 1 from SS set group index 0, or vice versa. Accordingly, in this example the UE and base station may be synchronized with respect to when the SS set group switching flag field may begin, based on the reference time, in slot 405-*d*.

Accordingly, the UE may monitor for one or more repetitions of the DCI indicating the SS set group switching flag among the plurality of PDCCH candidates, the SS set group switching flag may identify an updated SS set group (the other SS set group index) that the UE is to use in a set of upcoming slots. In this example, the set of upcoming slots begins at slot 405-*d*, and may optionally continue for one or more subsequent slots (not shown) after slot 405-*d*. In this situation the reference timing rule may indicate that the reference time to be used by the UE for application of the SS set group switching flag. The UE may identify the set of upcoming slots based at least in part on the reference time and the SS set group switching flag. The UE may communicate in the set of upcoming slots according to the updated SS set group. For example, the UE may monitor one or more PDCCH candidates occurring in the set of upcoming slots.

As discussed above, the reference timing rule may generally indicate that application of the updated SS set group may be based on the reference time. In some aspects, the reference timing rule may indicate that the reference time is to occur in a first slot that is at least a first number of symbols after a last symbol of the reference time. In some aspects, the reference time may be specified by the reference timing rule as one of the second transmission time period associated with the last PDCCH candidate (e.g., the second PDCCH candidate 415 in this example) or the first transmission time period associated with the first PDCCH candidate (e.g., the first PDCCH candidate 410). In some aspects, the reference timing rule may indicate that the reference time may be based on a PDCCH candidate index among the plurality of PDCCH candidates, a SS set ID associated with the plurality of PDCCH candidates, and/or a CORESET ID associated with the plurality of PDCCH candidates.

In some aspects, the UE may initiate a timer at the start of the set of upcoming slots based at least in part on the reference time and the SS set group switching flag. For example, the UE may start a timer that tracks when the UE switches between the SS set group indices. In some aspects, the base station may transmit (and the UE may receive) a configuration signal indicating a switching delay (e.g., $P_{switch}$) between the DCI indicating the SS set group switching flag and the set of upcoming slots. The set of upcoming slots may be identified based at least in part on the switching delay.

Figure 5:
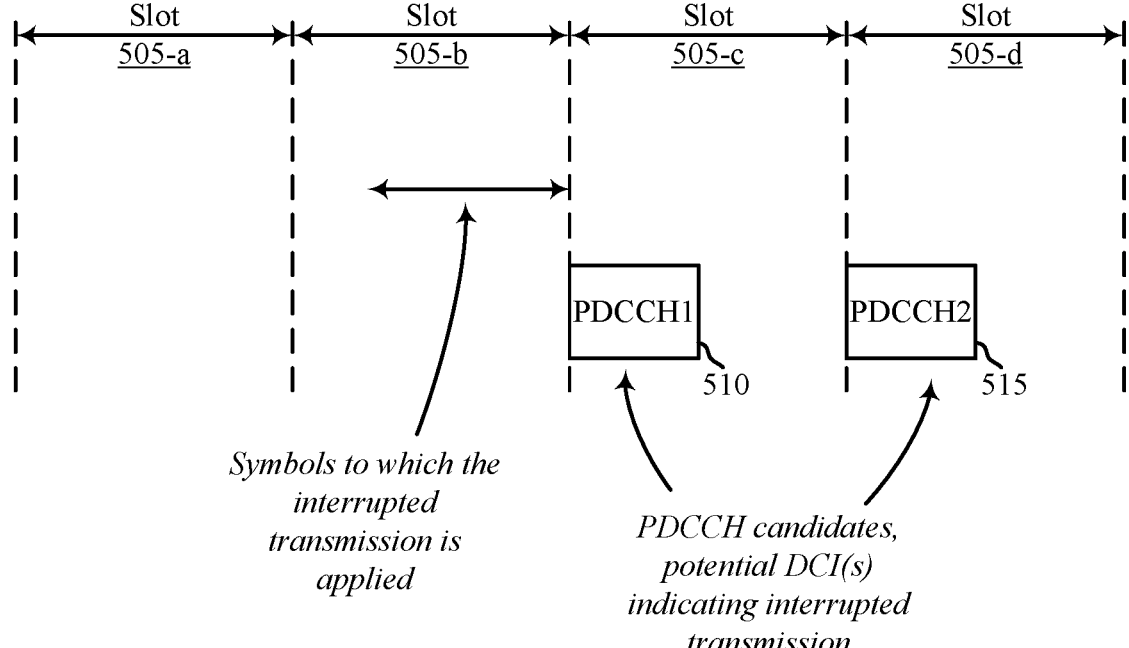
FIG. 5 illustrates an example of a timing configuration that supports linked PDCCH candidate rules in accordance with aspects of the present disclosure.

FIG. 5 illustrates an example of a timing configuration 500 that supports linked or otherwise associated PDCCH candidate rules in accordance with aspects of the present disclosure. In some examples, timing configuration 500 may implement aspects of wireless communication systems 100 and/or 200 and/or timing configurations 300 and/or 400. Aspects of timing configuration 500 may be implemented by or at a UE and/or base station, which may be examples of the corresponding devices described herein. Broadly, timing configuration 500 illustrates an example where DCI(s) carried among a plurality of PDCCH candidates indicate or otherwise identify an interrupted transmission to be applied in a set of previous symbols of a slot 505.

Aspects of the described techniques provide for reference timing rules to be applied by the base station and UE in the situation where DCI(s) are conveyed or otherwise carried in a plurality of PDCCH candidates, such as a first PDCCH candidate 510 and a second PDCCH candidate 515. The first PDCCH candidate 510 may be scheduled in a first transmission time period, which may correspond to symbol(s) of slot 505-*c* in this example. The second PDCCH candidate 515 may be scheduled in a second transmission time period, which may correspond to symbol(s) of slot 505-*d* in this example. The reference timing rule may indicate that a reference time for application of the change/update indicated in the DCI(s) (e.g., the interrupted transmission in this example) is to be determined based on the first transmission time period or the second transmission time period. That is, the reference time may correspond to the point in time or other time marker from which the UE is to apply the change/update (the interrupted transmission in this example) indicated in the DCI(s). Accordingly, the base station and UE may be synchronized or otherwise in agreement with respect to when the change/update will be applied, regardless of which PDCCH candidate(s) that the DCI(s) is/are recovered from.

In some aspects, a DCI format 2_1 may be used for notifying or otherwise indicating the PRB(s) and OFDM symbol(s) where a UE may assume that no transmission is intended for the UE (e.g., an interrupted transmission). For example, if a UE detects a DCI format 2_1 in a PDCCH transmitted in a CORESET in a slot 505, the set of previous symbols may correspond to the last $$N_{symb}^{slot} \times T_{INT} \times 2^{\mu - \mu_{INT}}$$

symbols prior to the first symbol of the CORESET in the slot 505, where $T_{INT}$ is the PDCCH monitoring periodicity provided by the value of monitoringSlotPeriodicityAndOff-set, $$N_{symb}^{slot}$$

is the number of symbols per slot, and $\mu$ is the subcarrier spacing (SCS) configuration for a serving cell with a mapping to a respective field in the DCI format 2_1. $\mu_{INT}$ may correspond to the SCS configuration of the downlink BWP where the UE receives the PDCCH with the DCI format 2_1.

Accordingly, the timing of the DCI indicating the interrupted transmission may determine the reference time that the UE will apply the interrupted transmission to. However, when multiple repetitions of the DCI are conveyed among a plurality PDCCH candidates, the UE may recover the DCI in the first PDCCH candidate 510, the second PDCCH candidate 515, and/or both repetitions based on soft combining the DCI repetitions. In this situation, the base station and UE may be out of synchronization/agreement with respect to which symbol(s) of the previous slot that the interrupted transmission corresponds to. This may result in confusion between the base station and UE, which may result in a loss of communications.

Accordingly, aspects of the described techniques provide for a reference timing rule to be applied in this situation. That is, when two or more PDCCH candidates are linked together and the UE monitors a DCI format 2_1 for an interrupted transmission indication in the two or more PDCCH candidates, if the UE detects the DCI format 2_1 in one or more PDCCH candidates, the set of previous symbols that the interrupted transmission indication is applied to are the last symbols prior to the first symbol corresponding to the reference time. In one example, the reference timing rule may indicate that the reference time may correspond to the earliest PDCCH candidate among the one or more PDCCH candidates that are linked (e.g., the first PDCCH candidate 510 in this example). In another example, the reference timing rule may indicate that the reference time may correspond to the last PDCCH candidate among the two or more PDCCH candidates that are linked (e.g., the second PDCCH candidate 515 in this example). In another example, the reference timing rule may indicate that the reference time may correspond to the PDCCH candidate with the lowest or highest PDCCH candidate index, SS set ID, CORESET ID, and the like. In this example, the UE and base station may apply the reference timing rule to determine the previous symbols (e.g., the symbol(s) within slot 505-b in this example) in which the interrupted transmission applies to.

The symbol(s) of the previous slot as determined above may be used by the UE to discard signal(s) received in previous symbols as those transmissions were interrupted, based on the interrupted transmission indication in the DCI format 2_1. Accordingly, in this example the UE and base station may be synchronized with respect to when the interrupted transmission occurred, based on the reference time, in slot 505-b.

Accordingly, the UE may monitor for one or more repetitions of the DCI indicating an interrupted transmission (e.g., the DCI format 2_1) among the plurality of PDCCH candidates. The interrupted transmission may identify a set of PRBs and symbols in a set of previous symbols (e.g., the symbol(s) in slot 505-b prior to the first PDCCH candidate 510 in slot 505-c) in which a transmission scheduled for the UE has been interrupted. In this situation, the reference timing rule may indicate the reference time to be used by the UE for application of the interrupted transmission. Accordingly, the base station and UE may identify the set of previous symbols based at least in part on the reference time and the interrupted transmission indication and refrain from communicating in the set of previous symbols according to the interrupted transmission. In some aspects, the reference timing rule may indicate that application of the interrupted transmission is to occur in a number of symbols that are prior to a first symbol of the reference time.

As discussed above, the reference timing rule may generally indicate that application of the interrupted transmission may be based on the reference time. In some aspects, the reference timing rule may indicate that the reference time corresponds to the first transmission time period associated with the first PDCCH candidate (e.g., the first symbol of the first PDCCH candidate 510), the second transmission time period associated with the last PDCCH candidate (e.g., the first symbol of the second PDCCH candidate 515). In some aspects, the reference timing rule may indicate that the reference time may be based on a PDCCH candidate index among the plurality of PDCCH candidates, a SS set ID associated with the plurality of PDCCH candidates, a CORESET ID associated with the plurality of PDCCH candidates, and the like.

Figure 6:
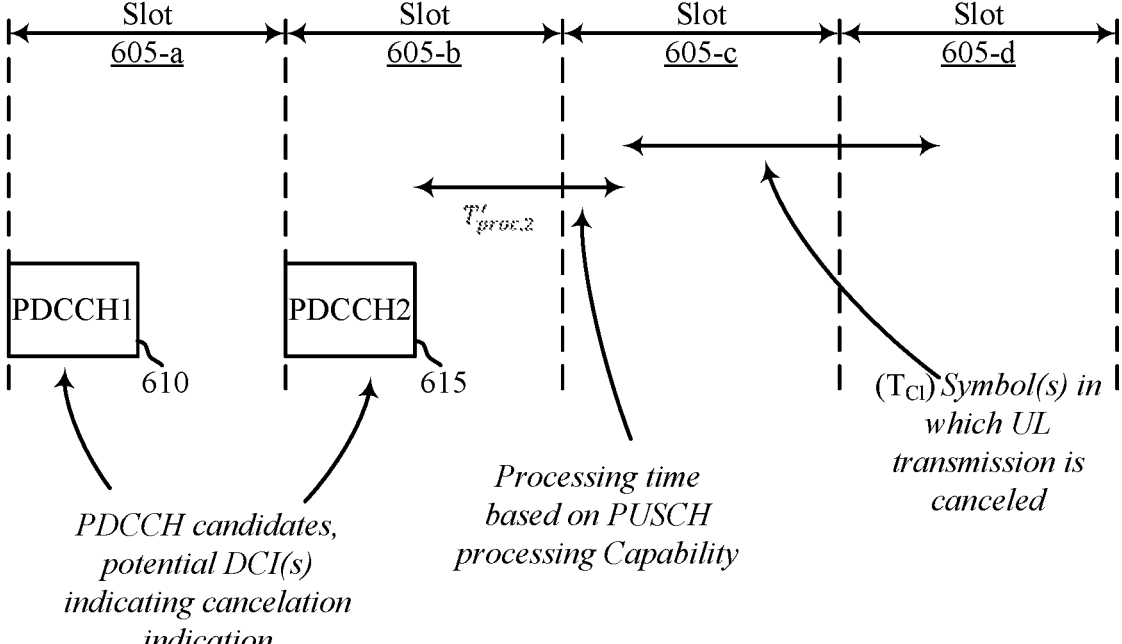
FIG. 6 illustrates an example of a timing configuration that supports linked PDCCH candidate rules in accordance with aspects of the present disclosure.

FIG. 6 illustrates an example of a timing configuration 600 that supports linked or otherwise associated PDCCH candidate rules in accordance with aspects of the present disclosure. In some examples, timing configuration 600 may implement aspects of wireless communication systems 100 and/or 200 and/or timing configurations 300, 400 and/or 500. Aspects of timing configuration 600 may be implemented by or at a UE and/or base station, which may be examples of the corresponding devices described herein. Broadly, timing configuration 600 illustrates an example where DCI(s) carried among a plurality of PDCCH candidates indicate or otherwise identify a cancelation indication to be applied in a set of upcoming symbols of a slot 605.

Aspects of the described techniques provide for reference timing rules to be applied by the base station and UE in the situation where DCI(s) are conveyed or otherwise carried in a plurality of PDCCH candidates, such as a first PDCCH candidate 610 and a second PDCCH candidate 615. The first PDCCH candidate 610 may be scheduled in a first transmission time period, which may correspond to symbol(s) of slot 605-a in this example. The second PDCCH candidate 615 may be scheduled in a second transmission time period, which may correspond to symbol(s) of slot 605-b in this example. The reference timing rule may indicate that a reference time for application of the change/update indicated in the DCI(s) (e.g., the cancelation indication in this example) is to be determined based on the first transmission time period or the second transmission time period. That is, the reference time may correspond to the point in time or other time marker from which the UE is to apply the change/update (the cancelation indication in this example) indicated in the DCI(s). Accordingly, the base station and UE may be synchronized or otherwise in agreement with respect to when the change/update will be applied, regardless of which PDCCH candidate(s) that the DCI(s) is/are recovered from.

In some aspects, a DCI format 2_4 may be used for notifying or otherwise indicating the PRB(s) and OFDM symbol(s) where a UE may cancel a corresponding uplink transmission scheduled for the UE (e.g., a cancelation indication). For example, if a UE detects or otherwise determines that a DCI format 2_4 is used to notify the UE of the PRB(s) and OFDM symbol(s) where the UE may cancel the corresponding uplink transmission, the UE may refrain from performing the uplink transmission scheduled for the indicated PRB(s) and OFDM symbol(s) (e.g., according to the cancellation indication). For the serving cell, the UE may determine the first symbol of the $T_{CI}$ symbols to be the first symbol that is after $$T'_{proc,2}$$

from the end of a PDCCH reception where the UE detects the DCI format 2_4, where $$T'_{proc,2}$$

obtained from $$T'_{proc,2}$$

for PUSCH processing capability. This may assume that $T_{CI}$ is the time span of the uplink cancelation indication (ULCI) (the ULCI field in DCI format 2_4 indicates which group of symbols within the $T_{CI}$ symbols are canceled).

Accordingly, the timing of the DCI carrying the cancelation indication may determine the reference time that the UE will apply the cancelation indication to (e.g., which uplink transmissions are to be canceled). However, when multiple repetitions of the DCI are conveyed among a plurality PDCCH candidates, the UE may recover the DCI in the first PDCCH candidate 610, the second PDCCH candidate 615, and/or both repetitions based on soft combining the DCI repetitions. In this situation, the base station and UE may be out of synchronization/agreement with respect to which symbol(s) of the upcoming slot that the cancelation indication corresponds to. This may result in confusion between the base station and UE, which may result in a loss of communications.

Accordingly, aspects of the described techniques provide for a reference timing rule to be applied in this situation. That is, when two or more PDCCH candidates are linked together or otherwise associated with each other and the UE monitors DCI format 2_4 for a cancelation indication in the two or more PDCCH candidates, if the UE detects the DCI format 2_4 in one or more PDCCH candidates, the first symbol of the set of symbols that the cancelation indication is applied to (first symbol of the time span of ULCI or $T_{CI}$) may correspond to the first symbol that is after $$T'_{proc,2}$$

from the end of the reference time.

The reference timing rule may be applied in this situation to identify or otherwise determine the reference time corresponding to the DCI(s) carrying the cancelation indication. In one example, the reference timing rule may indicate that the reference time corresponds to the last PDCCH candidate among the one or more PDCCH candidates that are linked (e.g., the second PDCCH candidate 615, which corresponds to the reference time in the example shown in FIG. 6). In another example, the reference timing rule may indicate that the reference time corresponds to the earliest PDCCH candidate among the two or more PDCCH candidates that are linked (e.g., the first PDCCH candidate 610). In another example, the reference timing rule may indicate that the reference time corresponds to the PDCCH candidate with the lowest or highest PDCCH candidate index, SS set ID, CORESET ID, and the like.

Accordingly, the PRB(s) or symbol(s) of the slot 605 as determined above in which an uplink transmission is scheduled for the UE may go unused by the UE to perform the uplink transmission, based on the cancelation indication carried or otherwise conveyed in the DCI format 2_4. Accordingly, in this example the UE and base station may be synchronized with respect to when the cancelation indication is to be applied, based on the reference time beginning after $$T'_{proc,2}$$

in slot 605-*c* and spanning the remaining PRB(s) symbol(s) of slot 605-*c* and into slot 605-*d*.

Accordingly, the UE may monitor for one or more repetitions of the DCI indicating a cancelation indication among the plurality of PDCCH candidates (e.g., the UE may recover the ULCI indication in the DCI format 2_4). The cancelation indication may identify a set of PRB(s) and symbol(s) in a set of upcoming symbols in which the UE is to cancel or otherwise refrain from performing the uplink transmission (e.g., based on the ULCI indication). In this situation, the reference timing rule may indicate the reference time to be used by the UE for application of the cancelation indication. Accordingly, the UE may identify the set of upcoming symbols based at least in part on the reference time and the cancelation indication (e.g., the set of symbols may begin after $$T'_{proc,2}$$

in slot 605-*c* and span the remaining PRB(s) and symbol(s) of slot 605-*c* and into slot 605-*d*). The UE may refrain from performing uplink transmissions in the set of upcoming symbols according to the cancelation indication.

In some aspects, the reference timing rule may indicate that application of the cancelation indication is to occur in a first symbol after a processing time (e.g., $$T'_{proc,2}$$

that follows the reference time. That is, in some examples the reference timing rule may indicate that the reference time for application of the cancelation indication may correspond to a last symbol after the first PDCCH candidate 610 or the second PDCCH candidate 615 (as is shown in FIG. 6). In this situation, the UE may know that the canceled uplink PRB(s) and symbol(s) may be based on the reference time plus the processing time.

As discussed above, the reference timing rule may generally indicate that application of the cancelation indication may be based on the reference time. In some aspects, the reference timing rule may indicate that the reference time corresponds the second transmission time period associated with the last PDCCH candidate (e.g., the second PDCCH candidate 615) or the first transmission time period associated with the first PDCCH candidate (e.g., the first PDCCH candidate 610). In some aspects, the reference timing rule may indicate that the reference time may be based on a PDCCH candidate index among the plurality of PDCCH candidates, a SS set ID associated with the plurality of PDCCH candidates, a CORESET ID associated with the plurality of PDCCH candidates, and the like.

Figure 7:
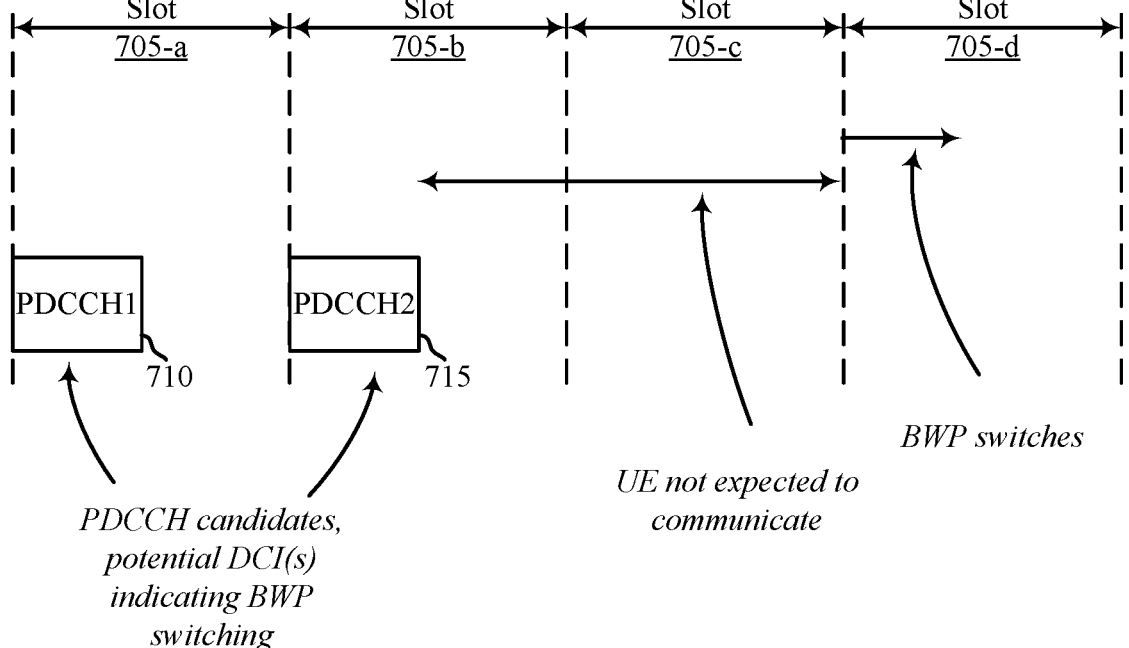
FIG. 7 illustrates an example of a timing configuration that supports linked PDCCH candidate rules in accordance with aspects of the present disclosure.

FIG. 7 illustrates an example of a timing configuration 700 that supports linked or otherwise associated PDCCH candidate rules in accordance with aspects of the present disclosure. In some examples, timing configuration 700 may implement aspects of wireless communication systems 100 and/or 200 and/or timing configurations 300, 400, 500 and/or 600. Aspects of timing configuration 700 may be implemented by or at a UE and/or base station, which may be examples of the corresponding devices described herein. Broadly, timing configuration 700 illustrates an example where DCI(s) carried among a plurality of PDCCH candidates indicate or otherwise identify a BWP change to be applied in a set of upcoming slots.

Aspects of the described techniques provide for reference timing rules to be applied by the base station and UE in the situation where DCI(s) are conveyed or otherwise carried in a plurality of PDCCH candidates, such as a first PDCCH candidate 710 and a second PDCCH candidate 715. The first PDCCH candidate 710 may be scheduled in a first transmission time period, which may correspond to symbol(s) of slot 705-*a* in this example. The second PDCCH candidate 715 may be scheduled in a second transmission time period, which may correspond to symbol(s) of slot 705-*b* in this example. The reference timing rule may indicate that a reference time for application of the change/update indicated in the DCI(s) (e.g., the BWP change in this example) is to be determined based on the first transmission time period or the second transmission time period. That is, the reference time may correspond to the point in time or other time marker from which the UE is to apply the change/update (the BWP change in this example) indicated in the DCI(s). Accordingly, the base station and UE may be synchronized or otherwise in agreement with respect to when the change/update will be applied, regardless of which PDCCH candidate(s) that the DCI(s) is/are recovered from.

For active BWP switching (e.g., where the UE switches from one BWP to another BWP), a gap may be defined in which UE does not expect to transmit or receive in the cell (e.g., a gap where the UE is not expected to communicate) between BWP switching. If a UE detects a DCI format indicating an active downlink and/or uplink BWP change for a cell, the UE may not be required to receive or transmit in the cell during a time duration from the end of the third symbol of a slot where the UE receives the PDCCH that includes the DCI format in a scheduling cell until the beginning of a slot indicated by the slot offset value of the time domain resource assignment (TDRA) field in the DCI format.

Accordingly, the timing of the DCI carrying the BWP change indication may determine the reference time that the UE will apply the BWP change to (e.g., when the delay/gap occurs and/or when the BWP change begins). However, when multiple repetitions of the DCI are conveyed among a plurality PDCCH candidates, the UE may recover the DCI in the first PDCCH candidate 710, the second PDCCH candidate 715, and/or both repetitions based on soft combining the DCI repetitions. In this situation, the base station and UE may be out of synchronization/agreement with respect to which of the upcoming slots that the BWP change corresponds to. This may result in confusion between the base station and UE, which may result in a loss of communications.

Accordingly, aspects of the described techniques provide for a reference timing rule to be applied in this situation. That is, for active BWP part switching, the delay/gap may be defined in which UE does not expect to transmit or receive in the cell. If the UE detects a DCI format indicating an active downlink and/or uplink BWP change for a cell, the UE is not required to receive or transmit in the cell during a time duration from the end of the third symbol of a slot 705 where the UE receives the PDCCH that includes the DCI format in a scheduling cell until the beginning of a slot 705 indicated by the slot offset value of the TDRA field in the DCI format. In the non-limiting example, the delay/gap may begin after the third symbol of the slot 705 (slot 705-*b* in the non-limiting example shown in FIG. 7) in which the BWP change is indicated and continue until the slot 705 (slot 705-*d* in the non-limiting example shown in FIG. 7) in which the BWP is changed (e.g., as indicated in the TDRA field in the DCI).

Accordingly, the set of upcoming slots as determined above in which the BWP configured for the UE may change, based on the BWP change indication carried or otherwise conveyed in the DCI. Accordingly, in this example the UE and base station may be synchronized with respect to when the BWP change is to be applied, based on the gap spanning symbols of slots 705-*b* and 705-*c* and beginning in slot 705-*d*, and potentially extending into one or more subsequent slots (not shown).

Accordingly, the UE may monitor for repetition(s) of the DCI indicating a BWP change among the plurality of PDCCH candidates. The BWP change may signal or otherwise identify a change in a BWP configured for the UE in a set of upcoming slots (e.g., beginning in slot 705-*d* in the non-limiting example shown in FIG. 7). In this situation, the reference timing rule may indicate the reference time to be used by the UE for application of the BWP change. Accordingly, the UE may identify the set of upcoming slots based at least in part on the reference time and the BWP change (e.g., slots 705-*d* and optionally one or more subsequent slots). The UE may refrain from communicating during a time period between the first transmission time period or the second transmission time period in which the DCI indicating the BWP change is received and the set of upcoming slots (e.g., the UE may refraining from performing uplink and/or downlink communications during the delay or gap). The UE may then communicate in the set of upcoming slots according to the BWP change (e.g., in the new or changed BWP in the set of upcoming slots).

In some aspects, the reference timing rule may indicate that application of the BWP change is to occur based on the reference time. That is, in some examples the reference timing rule may indicate that the reference time for application of the BWP change may correspond to the second transmission time period associated with the last PDCCH candidate (e.g., the second PDCCH candidate 715, as is shown in the non-limiting example shown in FIG. 7). In some examples, the reference timing rule may indicate that the reference time for application of the BWP change may correspond to the first transmission time period associated with the first PDCCH candidate (e.g., the first PDCCH candidate 710). In some aspects, the reference timing rule may indicate that the reference time may be based on a PDCCH candidate index among the plurality of PDCCH candidates, a SS set ID associated with the plurality of PDCCH candidates, a CORESET ID associated with the plurality of PDCCH candidates, and the like.

In some aspects, the BWP switching discussed herein may also include switching from a non-dormant BWP to a dormant BWP (e.g., for secondary cell dormancy). Accordingly, the DCI indicating the BWP change may correspond to an activation/deactivation DCI configuring a BWP associated with a secondary cell as dormant or non-dormant.

Figure 8A:
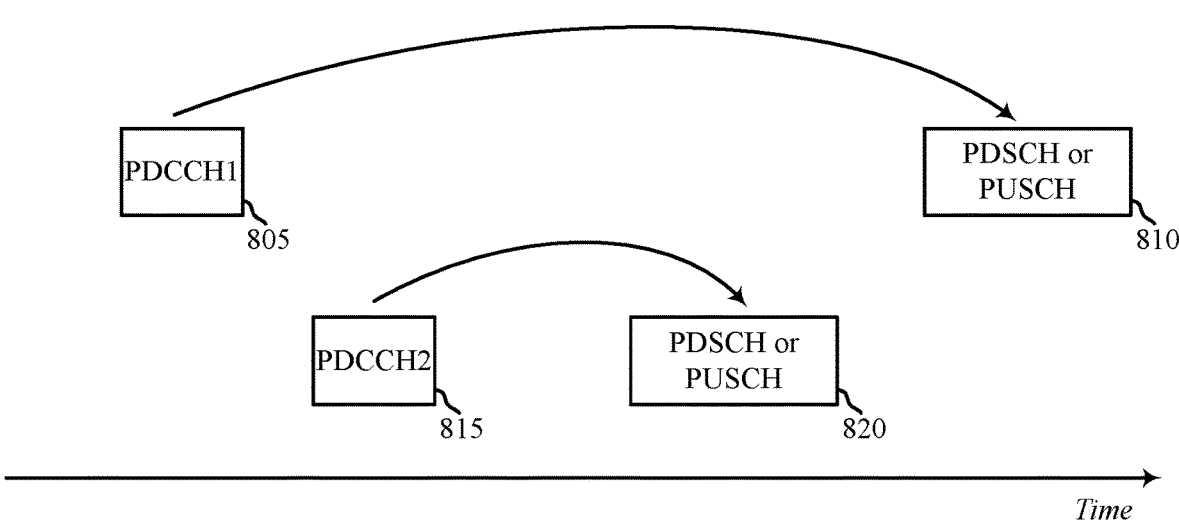
FIGS. 8A and 8B illustrate examples of a timing configuration that supports linked PDCCH candidate rules in accordance with aspects of the present disclosure.
Figure 8A:
Figure 8B:
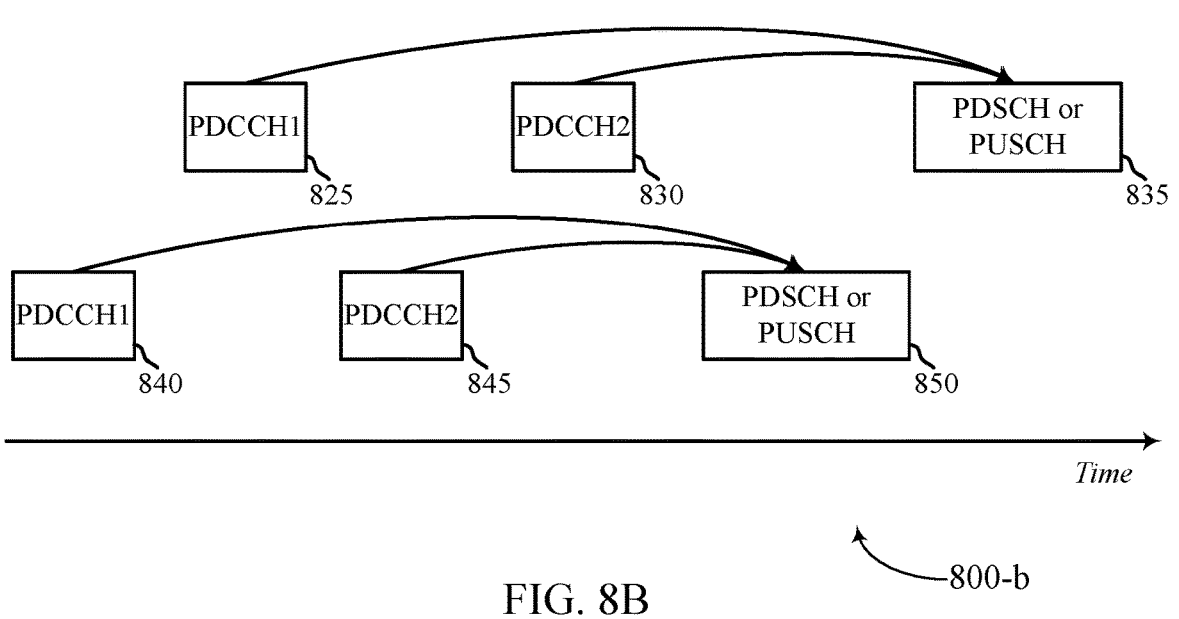

FIGS. 8A and 8B illustrate examples of a timing configuration 800 that supports linked or otherwise associated PDCCH candidate rules in accordance with aspects of the present disclosure. In some examples, timing configuration 800 may implement aspects of wireless communication systems 100 and/or 200 and/or timing configurations 300, 400, 500, 600 and/or 700. Aspects of timing configuration 800 may be implemented by or at a UE and/or base station, which may be examples of the corresponding devices described herein. Broadly, timing configuration 800-*a* of FIG. 8A illustrates an example where out-of-order delivery of DCIs scheduling PDSCH and/or PUSCH communications with UE is provided and timing configuration 800-*b* of FIG. 8B illustrates an example where in-order DCI(s) scheduling PDSCH and/or PUSCH communications with the UE are provided among a plurality of PDCCH candidates.

Aspects of the described techniques provide for reference timing rules to be applied by the base station and UE in the situation where DCI(s) are conveyed or otherwise carried in a plurality of PDCCH candidates, such as a first PDCCH candidate and a second PDCCH candidate. The first PDCCH candidate may be scheduled in a first transmission time period, which may correspond to symbol(s) of a slot. The second PDCCH candidate may be scheduled in a second transmission time period, which may correspond to symbol(s) of a slot. The reference timing rule may indicate that a reference time for application of the communications scheduled by the DCI(s) (e.g., the two DCIs scheduling communications with the UE in this example) is to be determined based on the first transmission time period or the second transmission time period. That is, the reference time may correspond to the point in time or other time marker from which the UE is to apply with respect to the scheduled communications. Accordingly, the base station and UE may be synchronized or otherwise in agreement with respect to when/how the scheduled communications will be performed, regardless of which PDCCH candidate(s) that the DCI(s) is/are recovered from. The base station and UE may also be synchronized or otherwise in agreement regarding whether the in-order/in-sequence delivery rule is satisfied. Accordingly, application of the reference time rule may provide a mechanism, when PDCCH candidates are linked or otherwise associated with each other, that enables improved scheduling of PDSCH/PUSCH communication with the UE and/or ensures in-order/in-sequence delivery of such communications in the situation where the UE may or may not be able to recover each DCI instance carried in the DCI(s).

Turning first to timing configuration 800-*a* of FIG. 8A, in some aspects the UE may expect in-order scheduling in a given component carrier (CC) (e.g., out-of-order scheduling is not allowed). That is, for any two HARQ process IDs (e.g., for any two feedback process identifiers) in a given scheduled cell, if the UE is scheduled to start receiving a first PDSCH (e.g., PDSCH/PUSCH 810) starting in symbol j (symbol j in this example would correspond to the first symbol of PDSCH/PUSCH 810) by a PDCCH ending in symbol i (e.g., PDCCH 805 in this example, where symbol i in this example would correspond to the last symbol of PDCCH 805), the UE is not expected to be scheduled to receive a PDSCH (e.g., PDSCH/PUSCH 820) starting earlier than the end of the first PDSCH with a PDCCH (e.g., PDCCH 815) that ends later than symbol i. For any two HARQ process IDs in a given scheduled cell, if the UE is scheduled to start a first PUSCH (e.g., PDSCH/PUSCH 810) transmission starting in symbol j by a PDCCH (e.g., PDCCH 805) ending in symbol i, the UE is not expected to be scheduled to transmit a PUSCH (e.g., PDSCH/PUSCH 820) starting earlier than the end of the first PUSCH by a PDCCH (e.g., PDCCH 815) that ends later than symbol i. Accordingly, timing configuration 800-*a* illustrates an example where the in-order scheduling constraint (e.g., in-sequence delivery rule) is not followed.

Accordingly, the timing of the DCIs scheduling the communications may determine the reference time that the UE will apply when determining whether or not the in-order scheduling constraint is followed. However, this creates the situation where it may be difficult to define in-order/out-of-order scheduling in situations where one or more of the scheduling DCI(s) is carried among multiple linked PDCCH candidates (e.g., with PDCCH repetition). That is, depending on which scheduling DCI is received in (e.g., the first PDCCH candidate or the second PDCCH candidate), this may impact the in-order/out-of-order scheduling constraint compliance. Accordingly, when multiple repetitions of the scheduling DCI are conveyed among a plurality PDCCH candidates, the UE may recover the DCI in the first PDCCH candidate, the second PDCCH candidate, and/or both repetitions based on soft combining the scheduling DCI repetitions. In this situation, the base station and UE may be out of synchronization/agreement with respect to the delivery sequence of the scheduling DCIs. This may result in confusion between the base station and UE, which may result in a loss of communications.

Accordingly and turning to timing configuration 800-*b* of FIG. 8B, aspects of the described techniques provide for a reference timing rule to be applied in this situation. That is, for a DCI format scheduling PDSCH or PUSCH, if the DCI format is monitored in two or more PDCCH candidates that are linked or otherwise associated with each other, out-of-order operation for two DCI formats that schedule corresponding PDSCHs or PUSCHs may be defined as discussed above, where the "PDCCH ending symbol" may be determined according to application of the reference timing rule to identify the reference time. That is, the PDCCH ending symbol may correspond to the reference time in this situation.

In one option, the reference timing rule may indicate that the reference time, for each DCI format, may correspond to the last symbol of the last PDCCH candidate (e.g., second PDCCH candidates 830 and/or second PDCCH candidate 845) that the UE monitors for detection of the DCI format. This option may result in timing configuration 800-*b* following the in-order sequence rule for the scheduled communications (e.g., PDSCH/PUSCH 835 and/or PDSCH/PUSCH 850, respectively).

In another option, the reference timing rule may indicate that the reference time, for each DCI format, may correspond to the last symbol of the earliest PDCCH candidate (e.g., first PDCCH candidate 825 and/or first PDCCH candidate 840) that the UE monitors for detection of the DCI format. This option may result in timing configuration 800-*b* following the in-order sequence rule for the scheduled communications (e.g., PDSCH/PUSCH 835 and/or PDSCH/PUSCH 850, respectively).

In another option, the reference timing rule may indicate that the reference time, for each DCI format, may correspond to the last symbol of any of the PDCCH candidates (e.g., any of the first PDCCH candidate 825, the first PDCCH candidate 840, the second PDCCH candidate 830, and/or the second PDCCH candidate 845) that the UE monitors for detection of the DCI format (it is in-order if for any of the PDCCH candidates, the operation is in order). That is, the UE may consider any PDCCH candidate carrying the scheduling DCI that comports with the in-order scheduling constraint. In some implementations of this option, this may result in timing configuration 800-*b* not following the in-order sequence rule for the scheduled communications (e.g., PDSCH/PUSCH 835 and/or PDSCH/PUSCH 850, respectively).

In another option, the reference timing rule may indicate that the reference time, for the DCI format that schedules the earlier PDSCH/PUSCH (e.g., PDSCH/PUSCH 850), is the last symbol of the earliest PDCCH candidate (e.g., the first PDCCH candidate 840) that the UE monitors for detection of the DCI format is considered. And for the DCI format that schedules the later PDSCH/PUSCH (e.g., PDSCH/PUSCH 835), the last symbol of the last PDCCH candidate (e.g., the second PDCCH candidate 830) that the UE monitors for detection of the DCI format is considered. This option may result in timing configuration 800-*b* following the in-order sequence rule, in some applications, for the scheduled communications (e.g., PDSCH/PUSCH 835 and/or PDSCH/PUSCH 850, respectively).

In another option, the reference timing rule may indicate that the reference time, for the DCI format that schedules the earlier PDSCH/PUSCH (e.g., PDSCH 850), is the last symbol of the last PDCCH candidate (e.g., the second PDCCH candidate 845) that the UE monitors for detection of the DCI format is considered. And for the DCI format that schedules the later PDSCH/PUSCH (e.g., PDSCH/PUSCH 835), the last symbol of the earliest PDCCH candidate (e.g., the first PDCCH candidate 825) that the UE monitors for detection of the DCI format is considered. In some implementations of this option, this may result in timing configuration 800-*b* not following the in-order sequence rule for the scheduled communications (e.g., PDSCH/PUSCH 835 and/or PDSCH/PUSCH 850, respectively).

Accordingly, the UE may apply the reference timing rule to determine the reference time applied for the in-order scheduling constraint determination. Accordingly, in this example the UE and base station may be synchronized with respect to conformance with the in-order scheduling constraint for two DCI scheduling communications with the UE, when at least one of the DCI is carried among a plurality of PDCCH candidates.

Accordingly, the UE may monitor for at least two DCI scheduling corresponding communications with the UE, the at least two DCI scheduling uplink communications and/or downlink communications for the UE. In this situation, the reference timing rule may indicate the reference time to be used by the UE for application of an in-sequence delivery constraint or rule for the at least two DCI. Accordingly, the UE may determine that the at least two DCI scheduling corresponding communications with the UE are received in-sequence or in-order based at least in part on the reference time and the in-sequence delivery rule. Therefore, the UE may perform the communications according to the at least two DCI.

In some aspects, the reference timing rule may indicate that application of the reference time used in application of the in-order (or in-sequence) rule may be followed. That is, in some examples the reference timing rule may indicate that the reference time for application of the in-sequence (or in-order) scheduling rule/constraint may correspond to the second transmission time period associated with a last received instance of the at least two DCI (e.g., the second PDCCH candidate 830 and/or the second PDCCH candidate 845). In some examples, the reference timing rule may indicate that the reference time for application of the in-sequence (or in-order) scheduling rule/constraint may correspond to the first transmission time period associated with a first received instance of the at least two DCI (e.g., the first PDCCH candidate 825 and/or the first PDCCH candidate 840).

In some examples, the reference timing rule may indicate that the reference time for application in-sequence (or in-order) scheduling rule/constraint may correspond to a last symbol associated with either of the at least two DCI, the last symbol associated with any received instance of the at least two DCI (e.g., the last symbols of any PDCCH candidate). In some examples the reference timing rule may indicate that the reference time for application in-sequence (or in-order) scheduling rule/constraint may correspond to a first symbol associated with the first received instance of a first DCI of the at least two DCI (e.g., the first symbol of the first received DCI carried in any PDCCH candidate) and the last symbol associated with the last received instance of a last DCI of the at least two DCI (e.g., the last symbol of the last received DCI carried in any PDCCH candidate). In some examples the reference timing rule may indicate that the reference time for application of the in-sequence (or in-order) scheduling rule/constraint may correspond to the last symbol associated with the first received instance of the first DCI of the at least two DCI (e.g., the last symbol of the first received DCI carried in any PDCCH candidate) and the first symbol associated with the last received instance of the last DCI of the at least two DCI (e.g., the first symbol of the last received DCI carried in any PDCCH candidate).

Figure 9:
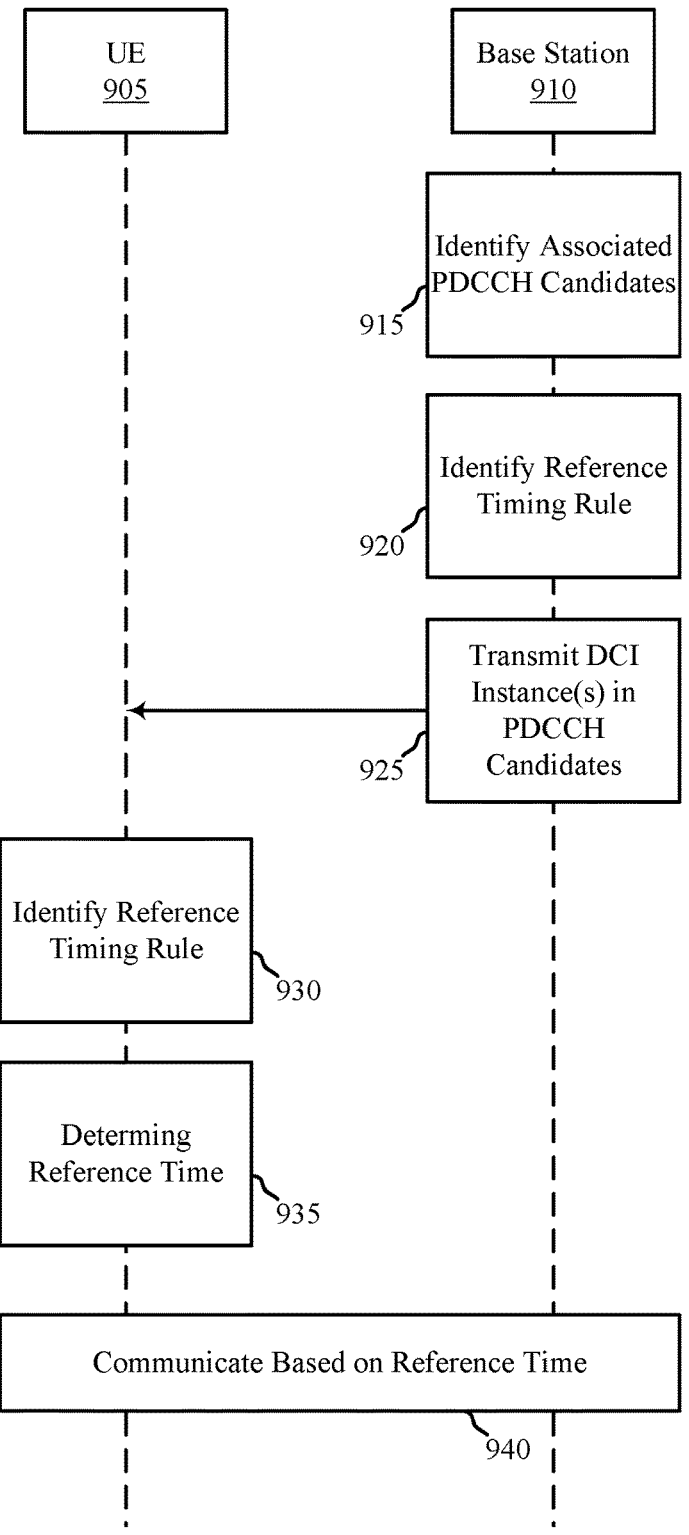
FIG. 9 illustrates an example of a process that supports linked PDCCH candidate rules in accordance with aspects of the present disclosure.

FIG. 9 illustrates an example of a process 900 that supports linked or otherwise associated PDCCH candidate rules in accordance with aspects of the present disclosure. In some examples, process 900 may implement aspects of wireless communication systems 100 and/or 200 and/or timing configurations 300, 400, 500, 600 700 and/or 800. Aspects of process 900 may be implemented by or at UE 905 and/or UE 910, which may be examples of the corresponding devices described herein.

At 915, base station 910 may identify, for UE 905, a plurality of PDCCH candidates that are associated with each other and used to convey DCI. For example, the plurality of PDCCH candidates may be associated with a common or different CORESET(s), SS set group(s), TCI state(s), and the like. The plurality of PDCCH candidates may be associated with each other based on DCI repetition. The plurality PDCCH candidates may be used to carry or otherwise convey an indication of repetitions of the DCI. The plurality PDCCH candidates may include a first PDCCH candidate in a first transmission time period (e.g., a first set of symbol(s) of a slot and/or a first slot). The plurality of PDCCH candidates may include a second PDCCH candidate in a second transmission time period (e.g., a second set of symbol(s) of a second slot and/or a second slot). The second PDCCH candidate may also be referred to as a last PDCCH candidate in the second transmission time period (e.g., when there are more than two PDCCH candidates). In some examples, the first PDCCH candidate and the second PDCCH candidate may represent the first PDCCH candidate and the last PDCCH candidate of a set of linked candidates. A nominal PDCCH reception may be defined as the union of symbols across all linked PDCCH candidates where a DCI is monitored. In this way, the first and the second (e.g., last) PDCCH candidates mark the endpoints of the nominal PDCCH reception.

At 920, base station 910 may identify, for UE 905, a reference timing rule based on the association between the plurality PDCCH candidates. Broadly, the reference timing rule may identify or otherwise convey an indication that a reference time is to be determined based on the first transmission time period or the second transmission time period. That is, the reference timing rule to be applied to identify the reference time that UE 905 will use to adopt the change/ update/scheduling information being indicated in the repetition(s) of the DCI. In some examples, when considering the nominal PDCCH reception, the first or the last symbol of the nominal PDCCH reception may be considered as a reference time serving as a basis for timing of the change or update or other scheduling that is to occur.

At 925, base station 910 may transmit or otherwise provide (and UE 905 may receive or otherwise obtain) the one or more instances of the DCI (e.g., the one or more repetitions) among the plurality of PDCCH candidates. Accordingly, UE 905 may monitor for DCI among the plurality of PDCCH candidates that are associated with each other.

At 930, UE 905 may determine or otherwise identify the reference timing rule based on the association between the plurality PDCCH candidates. Again, the reference timing rule may carry or otherwise convey an indication that a reference time is to be determined based on the first transmission time period and/or the second transmission time period.

At 935, UE 905 may determine the reference time according to the reference timing rule. For example, UE 905 (and base station 910) may apply the reference timing rule to identify the reference time in relation to the plurality PDCCH candidates carrying the DCI(s). In some examples, the UE may also determine a nominal PDCCH reception as the union of symbols across all linked PDCCH candidates where a DCI is monitored. In this way, the first and the second (e.g., last) PDCCH candidates mark the endpoints of the nominal PDCCH reception. When considering the nominal PDCCH reception, the first or the last symbol of the nominal PDCCH reception may be considered as a reference time serving as a basis for timing of the change or update or other scheduling that is to occur.

As discussed above, this may include repetition(s) of the DCI indicating an SFI index, a SS set group switching flag, an interrupted transmission, a cancellation indication, a BWP change, and/or at least two DCI scheduling corresponding communications with UE 905. Accordingly, the reference time in this context may correspond to a reference time used to implement or otherwise adopt the SFI index, the SS set group switching flag, the interrupted transmission, the cancellation indication, the BWP change, and/or the scheduled communications. For example, UE 905 may apply the reference timing rule to determine the reference time with respect to the transmission time period of the first PDCCH candidate, the last PDCCH candidate, and/or any intermediate PDCCH candidate(s) when more than two PDCCH candidates are used.

Accordingly and at 940, base station 910 and UE 905 may communicate based at least in part on the reference time. For example, UE 905 and/or base station 910 may perform communications using communication directions indicated in the SFI index for a set of upcoming slots based on the SFI index indicated in the DCI repetition(s). In another example, UE 905 and/or base station 910 may perform communications after switching to a different SS set group index in a set of upcoming slots based on the SS set group switching flag indicated in the DCI repetition(s). In another example, UE 905 and/or base station 910 may perform communications by avoiding or otherwise refraining from performing/recovering PDSCH transmissions received in a set of previous symbols based on the interrupted transmission indication carried in the DCI repetition(s). In another example, UE 905 and/or base station 910 may perform communications by UE 905 refraining from performing uplink transmissions to base station 910 in a set of upcoming symbols based on the cancellation indication carried or otherwise conveyed in the DCI repetition(s). In another example, UE 905 and/or base station 910 may perform communications by switching to a different BWP (and/or activating/deactivating a BWP associated with a secondary cell) based on the BWP change indicated in the DCI repetition(s). In another example, UE 905 and/or base station 910 may perform communications by applying the reference timing rule to determine the reference time, which may be used when determining whether two DCIs scheduling corresponding communications with UE 905 follow the in-order/in-sequence scheduling constraint/rule (e.g., the in-sequence delivery rule).

Accordingly, aspects of process 900 illustrates examples where the reference timing rule may be applied to determine the reference time used in application of the SFI index, BWP change, etc. indicated in DCI repetition(s) carried among the plurality PDCCH candidates. This may improve synchronization or agreement between UE 905 and/or base station 910 with respect to implementing the cancellation indication, interrupted transmission indication, and the like, when the DCI repetitions are carried among the plurality PDCCH candidates.

Figure 10:
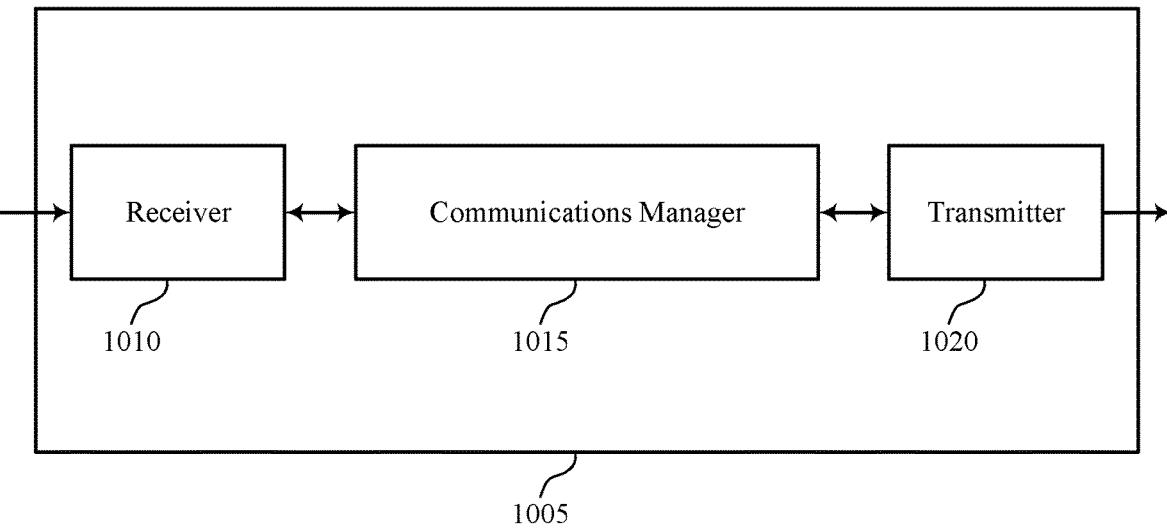
FIGS. 10 and 11 show block diagrams of devices that support linked PDCCH candidate rules in accordance with aspects of the present disclosure.

FIG. 10 shows a block diagram 1000 of a device 1005 that supports linked or otherwise associated PDCCH candidate rules in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to linked PDCCH candidate rules, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may monitor for DCI among a set of PDCCH candidates (e.g., at least two PDCCH candidates) that are associated with each other, the set of PDCCH candidates including at least a first PDCCH candidate in a first transmission time period of the set of PDCCH candidates and a last PDCCH candidate in a second transmission time period of the set of PDCCH candidates, identify a reference timing rule based on the association between the set of PDCCH candidates, the reference timing rule indicating that a reference time is to be determined based on either the first transmission time period or the second transmission time period (e.g., any of the first to the second transmission time periods), determine the reference time based on the reference timing rule, and communicate based on the reference time. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
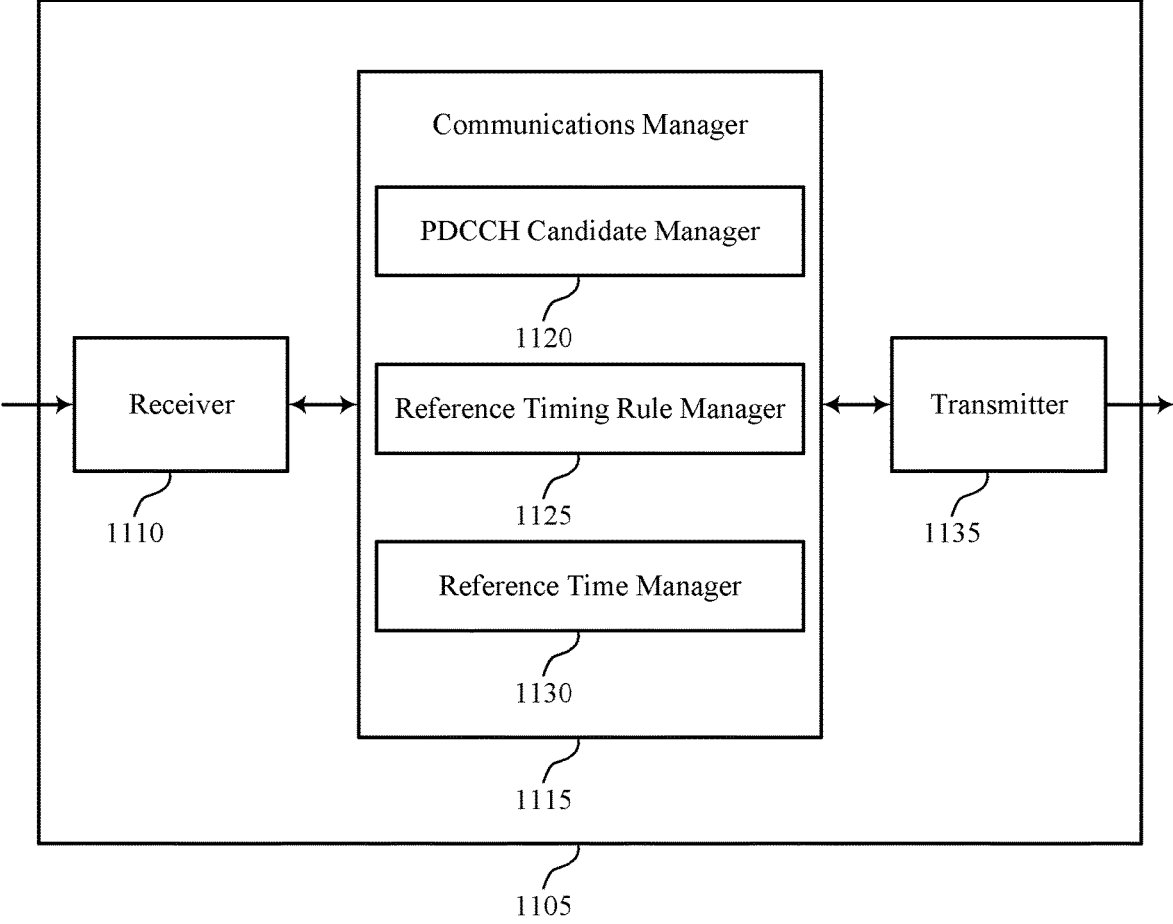

FIG. 11 shows a block diagram 1100 of a device 1105 that supports linked or otherwise associated PDCCH candidate rules in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to linked PDCCH candidate rules, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a PDCCH candidate manager 1120, a reference timing rule manager 1125, and a reference time manager 1130. The communications manager 1115 may be an example of aspects of the communications manager 1310 described herein.

The PDCCH candidate manager 1120 may monitor for DCI among a set of PDCCH candidates (e.g., at least two PDCCH candidates) that are associated with each other, the set of PDCCH candidates including at least a first PDCCH candidate in a first transmission time period of the set of PDCCH candidates and a last PDCCH candidate in a second transmission time period of the set of PDCCH candidates.

The reference timing rule manager 1125 may identify a reference timing rule based on the association between the set of PDCCH candidates, the reference timing rule indicating that a reference time is to be determined based on either the first transmission time period or the second transmission time period.

The reference time manager 1130 may determine the reference time based on the reference timing rule and communicate based on the reference time.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
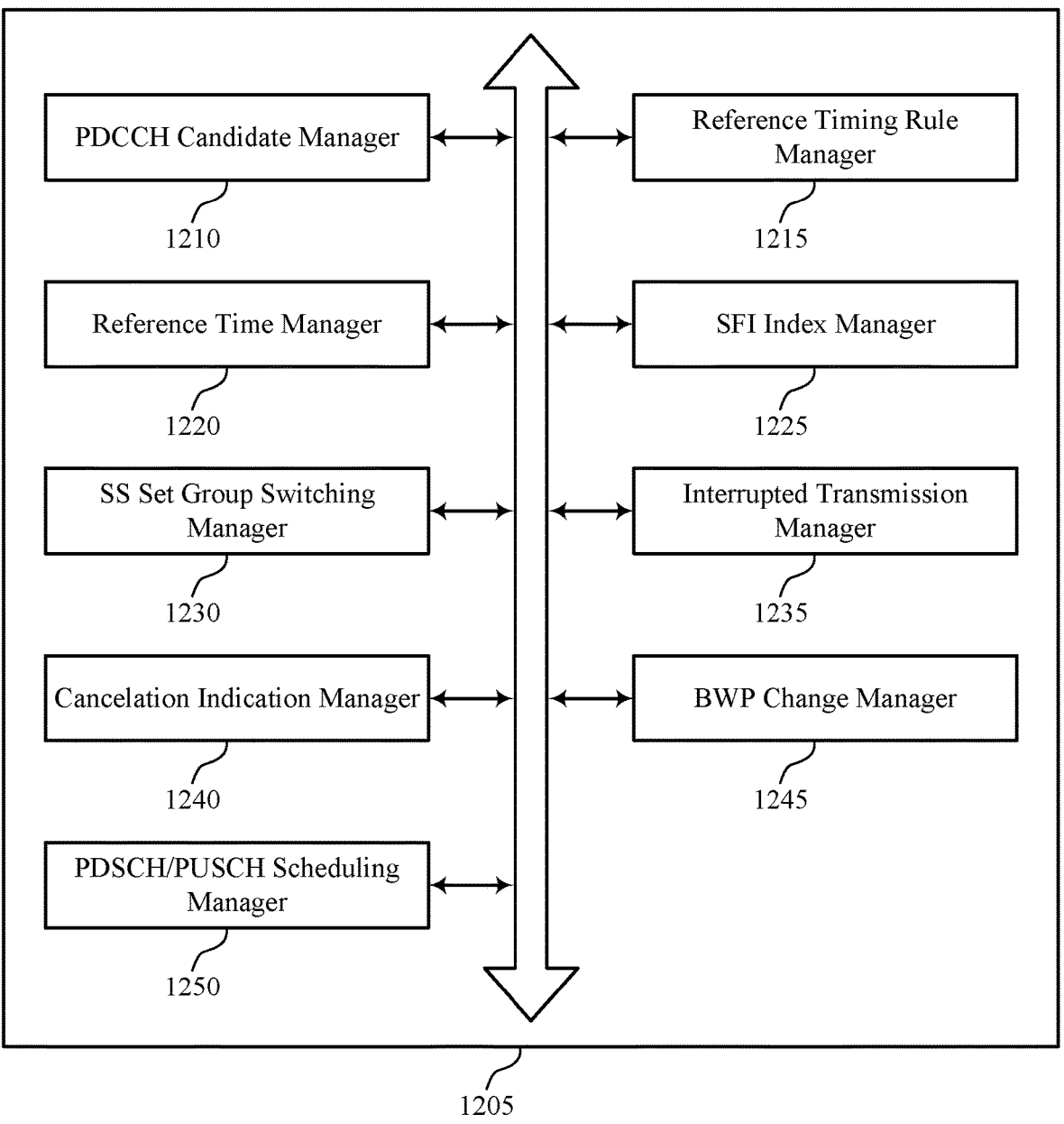
FIG. 12 shows a block diagram of a communications manager that supports linked PDCCH candidate rules in accordance with aspects of the present disclosure.

FIG. 12 shows a block diagram 1200 of a communications manager 1205 that supports linked or otherwise associated PDCCH candidate rules in accordance with aspects of the present disclosure. The communications manager 1205 may be an example of aspects of a communications manager 1015, a communications manager 1115, or a communications manager 1310 described herein. The communications manager 1205 may include a PDCCH candidate manager 1210, a reference timing rule manager 1215, a reference time manager 1220, a SFI index manager 1225, a SS set group switching manager 1230, an interrupted transmission manager 1235, a cancelation indication manager 1240, a BWP change manager 1245, and a PDSCH/PUSCH scheduling manager 1250. Each of these modules may communicate, directly or indirectly, with one another (e.g., via one or more buses).

The PDCCH candidate manager 1210 may monitor for DCI among a set of PDCCH candidates that are associated with each other, the set of PDCCH candidates including at least a first PDCCH candidate in a first transmission time period of the set of PDCCH candidates and a last PDCCH candidate in a second transmission time period of the set of PDCCH candidates.

The reference timing rule manager 1215 may identify a reference timing rule based on the association between the set of PDCCH candidates, the reference timing rule indicating that a reference time is to be determined based on either the first transmission time period or the second transmission time period.

The reference time manager 1220 may determine the reference time based on the reference timing rule. In some examples, the reference time manager 1220 may communicate based on the reference time.

The SFI index manager 1225 may monitor for one or more repetitions of the DCI indicating a slot format indicator index among the set of PDCCH candidates, the slot format indicator index identifying one or more communication directions for each slot in a set of upcoming slots, where the reference timing rule indicates the reference time to be used by the UE for application of the slot format indicator index.

In some examples, the SFI index manager 1225 may identify the set of upcoming slots based on the reference time and the slot format indicator index. In some examples, the SFI index manager 1225 may communicate in the set of upcoming slots according to the one or more communication directions of each slot. In some cases, the reference time is specified by the reference timing rule as one of the second transmission time period associated with the last PDCCH candidate, the first transmission time period associated with the first PDCCH candidate, or additionally a PDCCH candidate index among the set of PDCCH candidates, a SS set ID associated with the set of PDCCH candidates, or a control resource set identifier associated with the set of PDCCH candidates.

The SS set group switching manager 1230 may monitor for one or more repetitions of the DCI indicating a SS set group switching flag among the set of PDCCH candidates, the SS set group switching flag identifying an updated SS set group that the UE is to use in a set of upcoming slots, where the reference timing rule indicates the reference time to be used by the UE for application of the SS set group switching flag. In some examples, the SS set group switching manager 1230 may identify the set of upcoming slots based on the reference time and the SS set group switching flag. In some examples, the SS set group switching manager 1230 may communicate in the set of upcoming slots according to the updated SS set group. In some examples, the SS set group switching manager 1230 may initiate a timer at a start of the set of upcoming slots based on the reference time and the SS set group switching flag. In some examples, the SS set group switching manager 1230 may receive a configuration signal indicating a switching delay between the DCI indicating the SS set group switching flag and the set of upcoming slots, where the set of upcoming slots are identified based on the switching delay.

In some cases, the reference timing rule indicates that application of the updated SS set group switching flag is to occur in a first slot that is at least a first number of symbols after a last symbol of the reference time. In some cases, the reference time is specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

The interrupted transmission manager 1235 may monitor for one or more repetitions of the DCI indicating an interrupted transmission among the set of PDCCH candidates, the interrupted transmission identifying a set of physical resource blocks and symbols in a set of previous symbols in which a transmission scheduled for the UE has been interrupted, where the reference timing rule indicates the reference time to be used by the UE for application of the interrupted transmission. In some examples, the interrupted transmission manager 1235 may identify the set of previous symbols based on the reference time and the interrupted transmission. In some examples, the interrupted transmission manager 1235 may refrain from communicating in the set of previous symbols according to the interrupted transmission.

In some cases, the reference timing rule indicates that application of the interrupted transmission is to occur in a number of symbols that are prior to a first symbol of the reference time. In some cases, the reference time is specified by the reference timing rule as one of the first transmission time period associated with the first PDCCH candidate, the second transmission time period associated with the last PDCCH candidate, or additionally a PDCCH candidate index among the set of PDCCH candidates, a SS set identifier associated with the set of PDCCH candidates, or a control resource set identifier associated with the set of PDCCH candidates.

The cancelation indication manager 1240 may monitor for one or more repetitions of the DCI indicating a cancelation indication among the set of PDCCH candidates, the cancelation indication identifying a set of physical resource blocks and symbols in a set of upcoming symbols in which the UE is to cancel uplink transmission, where the reference timing rule indicates the reference time to be used by the UE for application of the cancelation indication. In some examples, the cancelation indication manager 1240 may identify the set of upcoming symbols based on the reference time and the cancelation indication. In some examples, the cancelation indication manager 1240 may refrain from performing uplink transmissions in the set of upcoming symbols according to the cancelation indication.

In some cases, the reference timing rule indicates that application of the cancelation indication is to occur in a first symbol after a processing time that follows the reference time. In some cases, the reference time is specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

The BWP change manager 1245 may monitor for one or more repetitions of the DCI indicating a bandwidth part change among the set of PDCCH candidates, the bandwidth part change identifying a change in a bandwidth part configured for the UE in a set of upcoming slots, where the reference timing rule indicates the reference time to be used by the UE for application of the bandwidth part change. In some examples, the BWP change manager 1245 may identify the set of upcoming slots based on the reference time and the bandwidth part change. In some examples, the BWP change manager 1245 may refrain from communicating during a time period between the first transmission time period or the second transmission time period in which the DCI indicating the bandwidth part change is received and the set of upcoming slots. In some examples, the time period can be a time duration from the end of a specific symbol of a slot where the UE receives the PDCCH that includes the DCI format until the beginning of a slot indicated by the slot offset value of the TDRA fields in the DCI format. In some examples, the BWP change manager 1245 may communicate in the set of upcoming slots according to the bandwidth part change.

In some cases, the reference time is specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

The PDSCH/PUSCH scheduling manager 1250 may monitor for at least two DCI scheduling corresponding communications with the UE, the at least two DCI scheduling at least one of uplink communications, downlink communications, or both, for the UE, where the reference timing rule indicates the reference time to be used by the UE for application of an in-sequence delivery rule for the at least two DCI. In some examples, the PDSCH/PUSCH scheduling manager 1250 may determine that the at least two DCI scheduling corresponding communications with the UE are received in-sequence based on the reference time and the in-sequence delivery rule. In some examples, the PDSCH/PUSCH scheduling manager 1250 may perform the communications according to the at least two DCI.

In some cases, the reference time is specified by the reference timing rule as one of the second transmission time period associated with a last received instance of the at least two DCI, the first transmission time period associated with a first received instance of the at least two DCI, or a last symbol associated with either of the at least two DCI, the last symbol associated with any received instance of the at least two DCI, or a first symbol associated with the first received instance of a first DCI of the at least two DCI and the last symbol associated with the last received instance of a last DCI of the at least two DCI, or the last symbol associated with the first received instance of the first DCI of the at least two DCI and the first symbol associated with the last received instance of the last DCI of the at least two DCI.

Figure 13:
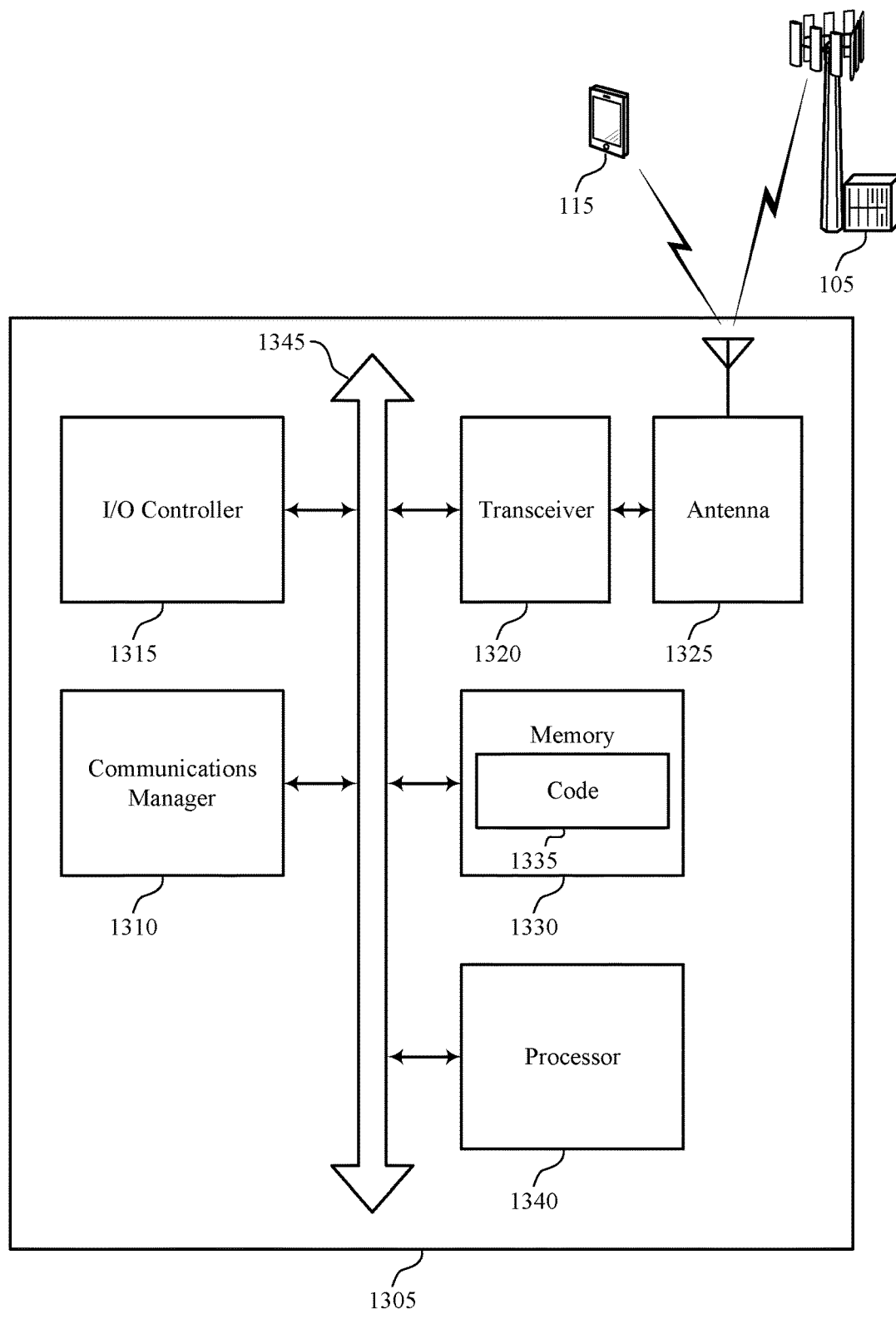
FIG. 13 shows a diagram of a system including a device that supports linked PDCCH candidate rules in accordance with aspects of the present disclosure.

FIG. 13 shows a diagram of a system 1300 including a device 1305 that supports linked or otherwise associated PDCCH candidate rules in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may monitor for DCI among a set of PDCCH candidates that are associated with each other, the set of PDCCH candidates including at least a first PDCCH candidate in a first transmission time period of the set of PDCCH candidates and a last PDCCH candidate in a second transmission time period of the set of PDCCH candidates, identify a reference timing rule based on the association between the set of PDCCH candidates, the reference timing rule indicating that a reference time is to be determined based on either the first transmission time period or the second transmission time period, determine the reference time based on the reference timing rule, and communicate based on the reference time.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic input/output system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting linked PDCCH candidate rules).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
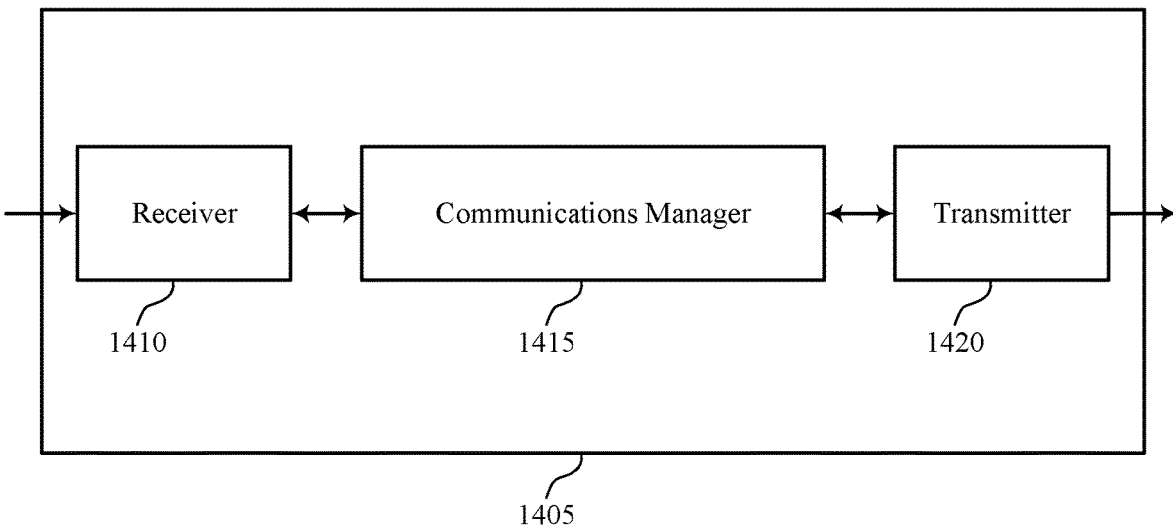
FIGS. 14 and 15 show block diagrams of devices that support linked PDCCH candidate rules in accordance with aspects of the present disclosure.

FIG. 14 shows a block diagram 1400 of a device 1405 that supports linked or otherwise associated PDCCH candidate rules in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to linked PDCCH candidate rules, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may identify, for a UE, a set of PDCCH candidates that are associated with each other and used to convey DCI, the set of PDCCH candidates including at least a first PDCCH candidate in a first transmission time period of the set of PDCCH candidates and a last PDCCH candidate in a second transmission time period of the set of PDCCH candidates, identify, for the UE, a reference timing rule based on the association between the set of PDCCH candidates, the reference timing rule indicating that a reference time is to be determined based on either the first transmission time period or the second transmission time period, transmit, to the UE, one or more instances of the DCI among the set of PDCCH candidates, and communicate with the UE based on the reference time, the reference time being based on the reference timing rule. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
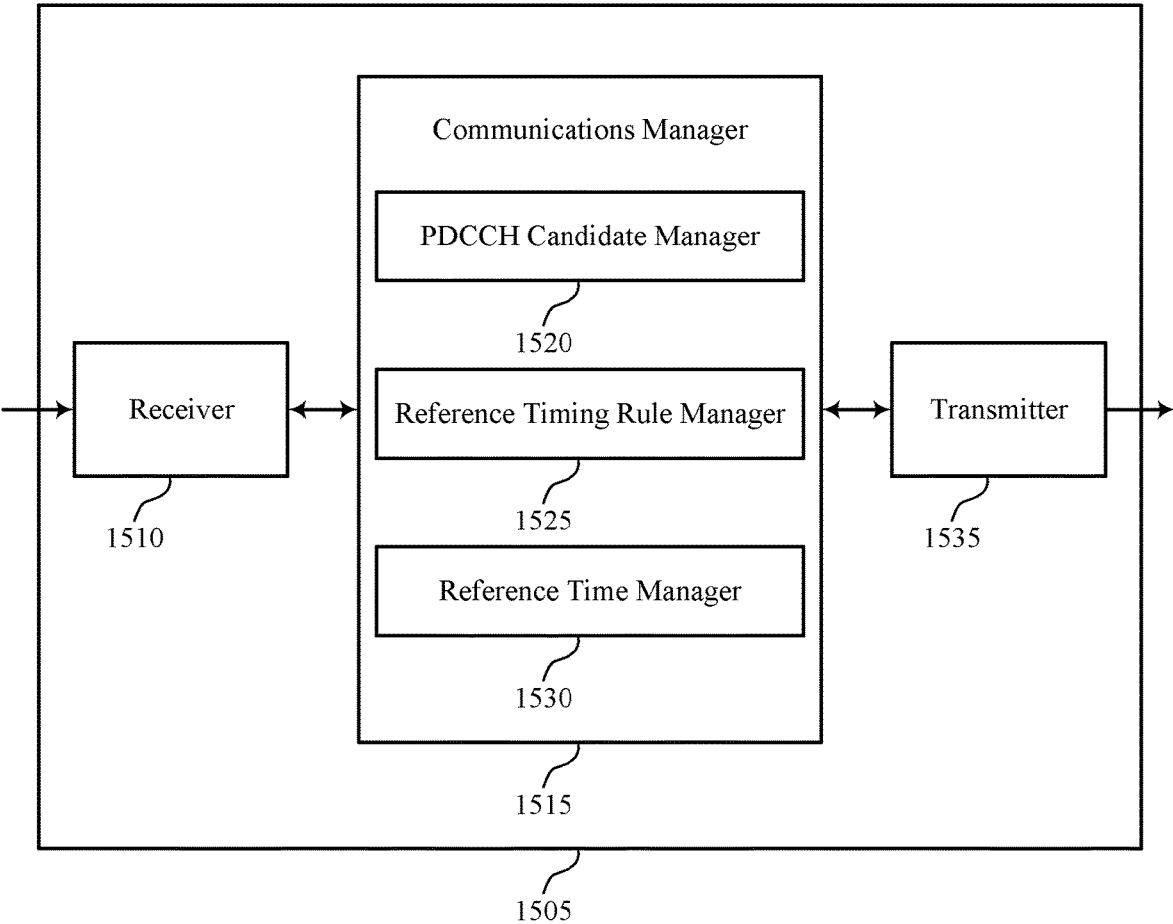

FIG. 15 shows a block diagram 1500 of a device 1505 that supports linked or otherwise associated PDCCH candidate rules in accordance with aspects of the present disclosure. The device 1505 may be an example of aspects of a device 1405, or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to linked PDCCH candidate rules, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a PDCCH candidate manager 1520, a reference timing rule manager 1525, and a reference time manager 1530. The communications manager 1515 may be an example of aspects of the communications manager 1710 described herein.

The PDCCH candidate manager 1520 may identify, for a UE, a set of PDCCH candidates that are associated with each other and used to convey DCI, the set of PDCCH candidates including at least a first PDCCH candidate in a first transmission time period of the set of PDCCH candidates and a last PDCCH candidate in a second transmission time period of the set of PDCCH candidates.

The reference timing rule manager 1525 may identify, for the UE, a reference timing rule based on the association between the set of PDCCH candidates, the reference timing rule indicating that a reference time is to be determined based on either the first transmission time period or the second transmission time period.

The reference time manager 1530 may transmit, to the UE, one or more instances of the DCI among the set of PDCCH candidates and communicate with the UE based on the reference time, the reference time being based on the reference timing rule.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
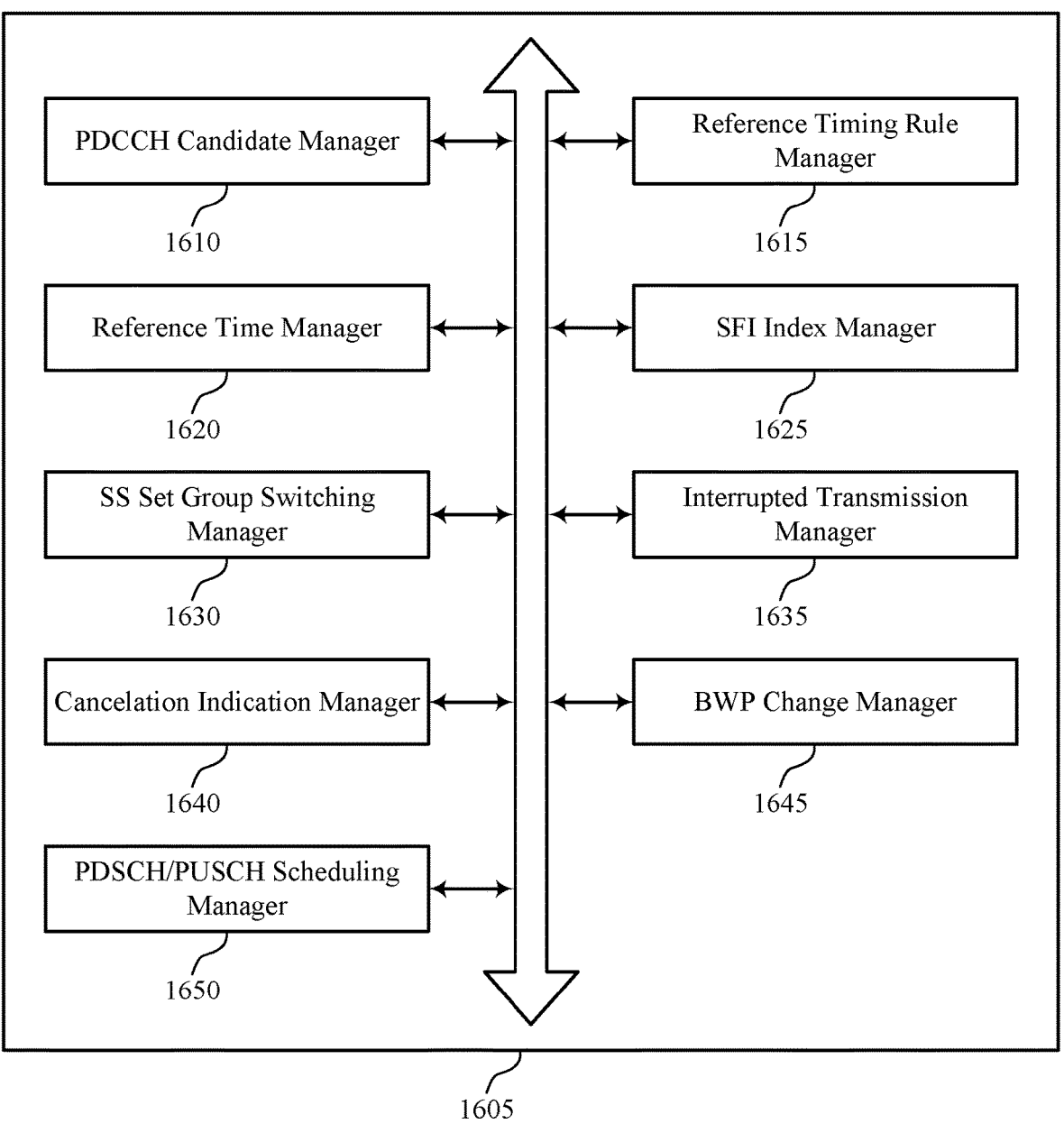
FIG. 16 shows a block diagram of a communications manager that supports linked PDCCH candidate rules in accordance with aspects of the present disclosure.

FIG. 16 shows a block diagram 1600 of a communications manager 1605 that supports linked otherwise associated PDCCH candidate rules in accordance with aspects of the present disclosure. The communications manager 1605 may be an example of aspects of a communications manager 1415, a communications manager 1515, or a communications manager 1710 described herein. The communications manager 1605 may include a PDCCH candidate manager 1610, a reference timing rule manager 1615, a reference time manager 1620, a SFI index manager 1625, a SS set group switching manager 1630, an interrupted transmission manager 1635, a cancelation indication manager 1640, a BWP change manager 1645, and a PDSCH/PUSCH scheduling manager 1650. Each of these modules may communicate, directly or indirectly, with one another (e.g., via one or more buses).

The PDCCH candidate manager 1610 may identify, for a UE, a set of PDCCH candidates that are associated with each other and used to convey DCI, the set of PDCCH candidates including at least a first PDCCH candidate in a first transmission time period of the set of PDCCH candidates and a last PDCCH candidate in a second transmission time period of the set of PDCCH candidates.

The reference timing rule manager 1615 may identify, for the UE, a reference timing rule based on the association between the set of PDCCH candidates, the reference timing rule indicating that a reference time is to be determined based on either the first transmission time period or the second transmission time period.

The reference time manager 1620 may transmit, to the UE, one or more instances of the DCI among the set of PDCCH candidates. In some examples, the reference time manager 1620 may communicate with the UE based on the reference time, the reference time being based on the reference timing rule.

The SFI index manager 1625 may identify, for the UE, a slot format indicator index identifying one or more communication directions for each slot in a set of upcoming slots, where the reference timing rule indicates the reference time to be used by the UE for application of the slot format indicator index. In some examples, the SFI index manager 1625 may transmit one or more repetitions of the DCI indicating the slot format indicator index among the set of PDCCH candidates. In some examples, the SFI index manager 1625 may communicate with the UE in the set of upcoming slots according to the one or more communication directions of each slot. In some cases, the reference time is specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

The SS set group switching manager 1630 may identify, for the UE, a SS set group switching flag identifying an updated SS set group that the UE is to use in a set of upcoming slots, where the reference timing rule indicates the reference time to be used by the UE for application of the SS set group switching flag. In some examples, the SS set group switching manager 1630 may transmit one or more repetitions of the DCI indicating the SS set group switching flag among the set of PDCCH candidates. In some examples, the SS set group switching manager 1630 may communicate in the set of upcoming slots according to the updated SS set group. In some examples, the SS set group switching manager 1630 may transmit, to the UE, a configuration signal indicating a switching delay between the DCI indicating the SS set group switching flag and the set of upcoming slots, where the set of upcoming slots are identified by the UE based on the switching delay.

In some cases, the reference timing rule indicates that application of the SS set group switching flag is to occur in a first slot that is at least a first number of symbols after a last symbol of the reference time. In some cases, the reference time is specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

The interrupted transmission manager 1635 may identify, for the UE, an interrupted transmission identifying a set of physical resource blocks and symbols in a set of previous symbols in which a transmission scheduled for the UE has been interrupted, where the reference timing rule indicates the reference time to be used by the UE for application of the interrupted transmission. In some examples, the interrupted transmission manager 1635 may transmit one or more repetitions of the DCI indicating the interrupted transmission among the set of PDCCH candidates. In some examples, the interrupted transmission manager 1635 may refrain from communicating with the UE in the set of previous symbols according to the interrupted transmission.

In some cases, the reference timing rule indicates that application of the interrupted transmission is to occur in a number of symbols that are prior to a first symbol of the reference time. In some cases, the reference time is specified by the reference timing rule as one of first transmission time period associated with the first PDCCH candidate, the second transmission time period associated with the last PDCCH candidate, or additionally a PDCCH candidate index among the set of PDCCH candidates, a SS set identifier associated with the set of PDCCH candidates, or a control resource set identifier associated with the set of PDCCH candidates.

The cancelation indication manager 1640 may identify, for the UE, a cancelation indication identifying a set of physical resource blocks and symbols in a set of upcoming symbols in which the UE is to cancel an uplink transmission, where the reference timing rule indicates the reference time to be used by the UE for application of the cancelation indication. In some examples, the cancelation indication manager 1640 may transmit one or more repetitions of the DCI indicating the cancelation indication among the set of PDCCH candidates. In some examples, the cancelation indication manager 1640 may refrain from receiving uplink transmissions from the UE in the set of upcoming symbols according to the cancelation indication.

In some cases, the reference timing rule indicates that application of the cancelation indication is to occur in a number of symbols that are after a first symbol of the reference time. In some cases, the reference time is specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

The BWP change manager 1645 may identify, for the UE, a bandwidth part change identifying a change in a bandwidth part configured for the UE in a set of upcoming slots, where the reference timing rule indicates the reference time to be used by the UE for application of the bandwidth part change. In some examples, the BWP change manager 1645 may transmit one or more repetitions of the DCI indicating the bandwidth part change among the set of PDCCH candidates, the bandwidth part change. In some examples, the BWP change manager 1645 may refrain from communicating with the UE during a time period between the first transmission time period or the second transmission time period in which the DCI indicating the bandwidth part change is receive and the set of upcoming slots. In some examples, the BWP change manager 1645 may communicate with the UE in the set of upcoming slots according to the bandwidth part change.

In some cases, the reference time is specified by the reference timing rule as one of the second transmission time period associated with the last PDCCH candidate, the first transmission time period associated with the first PDCCH candidate, or additionally a PDCCH candidate index among the set of PDCCH candidates, a SS set identifier associated with the set of PDCCH candidates, or a control resource set identifier associated with the set of PDCCH candidates.

The PDSCH/PUSCH scheduling manager 1650 may identify at least two DCI scheduling at least one of uplink communications, downlink communications, or both, for the UE, where the reference timing rule indicates the reference time to be used by the UE for application of an in-sequence delivery rule for the at least two DCI. In some examples, the PDSCH/PUSCH scheduling manager 1650 may transmit the at least two DCI scheduling corresponding communications with the UE. In some examples, the PDSCH/PUSCH scheduling manager 1650 may perform the communications with the UE according to the at least two DCI.

In some cases, the reference time is specified by the reference timing rule as one of the second transmission time period associated with a last received instance of the at least two DCI, the first transmission time period associated with a first received instance of the at least two DCI, or a last symbol associated with either of the at least two DCI, the last symbol associated with any received instance of the at least two DCI, or a first symbol associated with the first received instance of a first DCI of the at least two DCI and the last symbol associated with the last received instance of a last DCI of the at least two DCI, or the last symbol associated with the first received instance of the first DCI of the at least two DCI and the first symbol associated with the last received instance of the last DCI of the at least two DCI.

Figure 17:
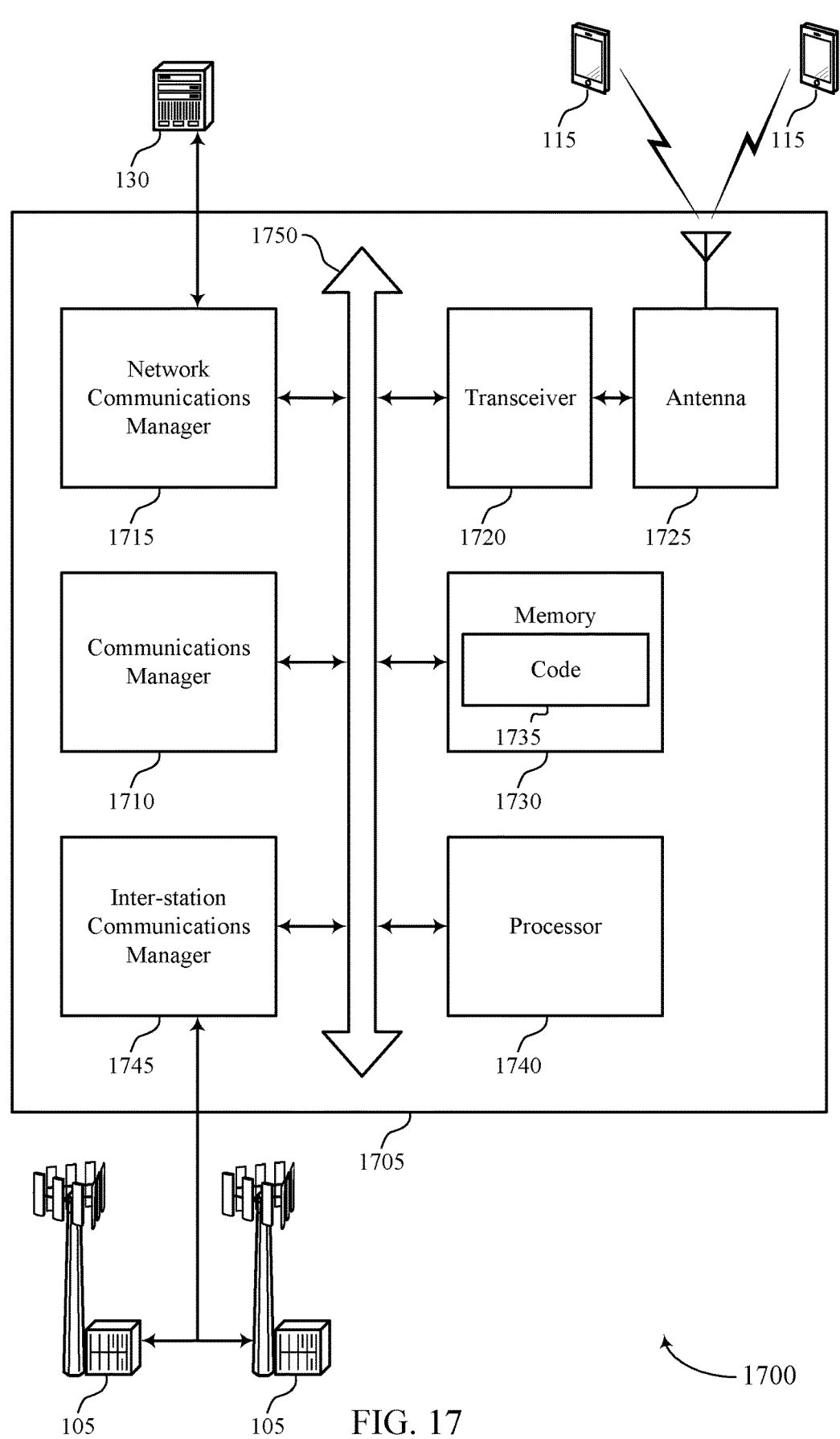
FIG. 17 shows a diagram of a system including a device that supports linked PDCCH candidate rules in accordance with aspects of the present disclosure.

FIG. 17 shows a diagram of a system 1700 including a device 1705 that supports linked otherwise associated PDCCH candidate rules in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may identify, for a UE, a set of PDCCH candidates that are associated with each other and used to convey DCI, the set of PDCCH candidates including at least a first PDCCH candidate in a first transmission time period of the set of PDCCH candidates and a last PDCCH candidate in a second transmission time period of the set of PDCCH candidates, identify, for the UE, a reference timing rule based on the association between the set of PDCCH candidates, the reference timing rule indicating that a reference time is to be determined based on either the first transmission time period or the second transmission time period, transmit, to the UE, one or more instances of the DCI among the set of PDCCH candidates, and communicate with the UE based on the reference time, the reference time being based on the reference timing rule.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting linked PDCCH candidate rules).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

FIG. 18 shows a flowchart illustrating a method 1800 that supports linked otherwise associated PDCCH candidate rules in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally, or alternatively, a UE may perform aspects of the functions described below using special-purpose hardware.

At 1805, the UE may monitor for DCI among a set of PDCCH candidates that are associated with each other, the set of PDCCH candidates including at least a first PDCCH candidate in a first transmission time period of the set of PDCCH candidates and a last PDCCH candidate in a second transmission time period of the set of PDCCH candidates. The operations of 1805 may be performed according to the methods described herein. In some examples, aspects of the operations of 1805 may be performed by a PDCCH candidate manager as described with reference to FIGS. 10 through 13.

At 1810, the UE may identify a reference timing rule based on the association between the set of PDCCH candidates, the reference timing rule indicating that a reference time is to be determined based on either the first transmission time period or the second transmission time period. The operations of 1810 may be performed according to the methods described herein. In some examples, aspects of the operations of 1810 may be performed by a reference timing rule manager as described with reference to FIGS. 10 through 13.

At 1815, the UE may determine the reference time based on the reference timing rule. The operations of 1815 may be performed according to the methods described herein. In some examples, aspects of the operations of 1815 may be performed by a reference time manager as described with reference to FIGS. 10 through 13.

At 1820, the UE may communicate based on the reference time. The operations of 1820 may be performed according to the methods described herein. In some examples, aspects of the operations of 1820 may be performed by a reference time manager as described with reference to FIGS. 10 through 13.

FIG. 19 shows a flowchart illustrating a method 1900 that supports linked otherwise associated PDCCH candidate rules in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally, or alternatively, a UE may perform aspects of the functions described below using special-purpose hardware.

At 1905, the UE may monitor for DCI among a set of PDCCH candidates that are associated with each other, the set of PDCCH candidates including at least a first PDCCH candidate in a first transmission time period of the set of PDCCH candidates and a last PDCCH candidate in a second transmission time period of the set of PDCCH candidates. The operations of 1905 may be performed according to the methods described herein. In some examples, aspects of the operations of 1905 may be performed by a PDCCH candidate manager as described with reference to FIGS. 10 through 13.

At 1910, the UE may monitor for one or more repetitions of the DCI indicating a slot format indicator index among the set of PDCCH candidates, the slot format indicator index identifying one or more communication directions for each slot in a set of upcoming slots, where the reference timing rule indicates the reference time to be used by the UE for application of the slot format indicator index. The operations of 1910 may be performed according to the methods described herein. In some examples, aspects of the operations of 1910 may be performed by a SFI index manager as described with reference to FIGS. 10 through 13.

At 1915, the UE may identify a reference timing rule based on the association between the set of PDCCH candidates, the reference timing rule indicating that a reference time is to be determined based on either the first transmission time period or the second transmission time period. The operations of 1915 may be performed according to the methods described herein. In some examples, aspects of the operations of 1915 may be performed by a reference timing rule manager as described with reference to FIGS. 10 through 13.

At 1920, the UE may determine the reference time based on the reference timing rule. The operations of 1920 may be performed according to the methods described herein. In some examples, aspects of the operations of 1920 may be performed by a reference time manager as described with reference to FIGS. 10 through 13.

At 1925, the UE may identify the set of upcoming slots based on the reference time and the slot format indicator index. The operations of 1925 may be performed according to the methods described herein. In some examples, aspects of the operations of 1925 may be performed by a SFI index manager as described with reference to FIGS. 10 through 13.

At 1930, the UE may communicate in the set of upcoming slots according to the one or more communication directions of each slot. The operations of 1930 may be performed according to the methods described herein. In some examples, aspects of the operations of 1930 may be performed by a SFI index manager as described with reference to FIGS. 10 through 13.

At 1935, the UE may communicate based on the reference time. The operations of 1935 may be performed according to the methods described herein. In some examples, aspects of the operations of 1935 may be performed by a reference time manager as described with reference to FIGS. 10 through 13.

FIG. 20 shows a flowchart illustrating a method 2000 that supports linked otherwise associated PDCCH candidate rules in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described below. Additionally, or alternatively, a UE may perform aspects of the functions described below using special-purpose hardware.

At 2005, the UE may monitor for DCI among a set of PDCCH candidates that are associated with each other, the set of PDCCH candidates including at least a first PDCCH candidate in a first transmission time period of the set of PDCCH candidates and a last PDCCH candidate in a second transmission time period of the set of PDCCH candidates. The operations of 2005 may be performed according to the methods described herein. In some examples, aspects of the operations of 2005 may be performed by a PDCCH candidate manager as described with reference to FIGS. 10 through 13.

At 2010, the UE may monitor for one or more repetitions of the DCI indicating a SS set group switching flag among the set of PDCCH candidates, the SS set group switching flag identifying an updated SS set group that the UE is to use in a set of upcoming slots, where the reference timing rule indicates the reference time to be used by the UE for application of the SS set group switching flag. The operations of 2010 may be performed according to the methods described herein. In some examples, aspects of the operations of 2010 may be performed by a SS set group switching manager as described with reference to FIGS. 10 through 13.

At 2015, the UE may identify a reference timing rule based on the association between the set of PDCCH candidates, the reference timing rule indicating that a reference time is to be determined based on either the first transmission time period or the second transmission time period. The operations of 2015 may be performed according to the methods described herein. In some examples, aspects of the operations of 2015 may be performed by a reference timing rule manager as described with reference to FIGS. 10 through 13.

At 2020, the UE may determine the reference time based on the reference timing rule. The operations of 2020 may be performed according to the methods described herein. In some examples, aspects of the operations of 2020 may be performed by a reference time manager as described with reference to FIGS. 10 through 13. The operations of 2020 may be combined with the operations of 2015, and may be performed by either a reference timing rule manager or a reference time manager.

At 2025, the UE may identify the set of upcoming slots based on the reference time and the SS set group switching flag. The operations of 2025 may be performed according to the methods described herein. In some examples, aspects of the operations of 2025 may be performed by a SS set group switching manager as described with reference to FIGS. 10 through 13.

At 2030, the UE may communicate in the set of upcoming slots according to the updated SS set group. The operations of 2030 may be performed according to the methods described herein. In some examples, aspects of the operations of 2030 may be performed by a SS set group switching manager as described with reference to FIGS. 10 through 13.

At 2035, the UE may communicate based on the reference time. The operations of 2035 may be performed according to the methods described herein. In some examples, aspects of the operations of 2035 may be performed by a reference time manager as described with reference to FIGS. 10 through 13.

FIG. 21 shows a flowchart illustrating a method 2100 that supports linked otherwise associated PDCCH candidate rules in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally, or alternatively, a base station may perform aspects of the functions described below using special-purpose hardware.

At 2105, the base station may identify, for a UE, a set of PDCCH candidates that are associated with each other and used to convey DCI, the set of PDCCH candidates including at least a first PDCCH candidate in a first transmission time period of the set of PDCCH candidates and a last PDCCH candidate in a second transmission time period of the set of PDCCH candidates. The operations of 2105 may be performed according to the methods described herein. In some examples, aspects of the operations of 2105 may be performed by a PDCCH candidate manager as described with reference to FIGS. 14 through 17.

At 2110, the base station may identify, for the UE, a reference timing rule based on the association between the set of PDCCH candidates, the reference timing rule indicating that a reference time is to be determined based on either the first transmission time period or the second transmission time period. The operations of 2110 may be performed according to the methods described herein. In some examples, aspects of the operations of 2110 may be performed by a reference timing rule manager as described with reference to FIGS. 14 through 17.

At 2115, the base station may transmit, to the UE, one or more instances of the DCI among the set of PDCCH candidates. The operations of 2115 may be performed according to the methods described herein. In some examples, aspects of the operations of 2115 may be performed by a reference time manager as described with reference to FIGS. 14 through 17.

At 2120, the base station may communicate with the UE based on the reference time, the reference time being based on the reference timing rule. The operations of 2120 may be performed according to the methods described herein. In some examples, aspects of the operations of 2120 may be performed by a reference time manager as described with reference to FIGS. 14 through 17.

FIG. 22 shows a flowchart illustrating a method 2200 that supports linked otherwise associated PDCCH candidate rules in accordance with aspects of the present disclosure. The operations of method 2200 may be implemented by a base station 105 or its components as described herein. For example, the operations of method 2200 may be performed by a communications manager as described with reference to FIGS. 14 through 17. In some examples, a base station may execute a set of instructions to control the functional elements of the base station to perform the functions described below. Additionally, or alternatively, a base station may perform aspects of the functions described below using special-purpose hardware.

At 2205, the base station may identify, for a UE, a set of PDCCH candidates that are associated with each other and used to convey DCI, the set of PDCCH candidates including at least a first PDCCH candidate in a first transmission time period of the set of PDCCH candidates and a last PDCCH candidate in a second transmission time period of the set of PDCCH candidates. The operations of 2205 may be performed according to the methods described herein. In some examples, aspects of the operations of 2205 may be performed by a PDCCH candidate manager as described with reference to FIGS. 14 through 17.

At 2210, the base station may identify, for the UE, a reference timing rule based on the association between the set of PDCCH candidates, the reference timing rule indicating that a reference time is to be determined based on either the first transmission time period or the second transmission time period. The operations of 2210 may be performed according to the methods described herein. In some examples, aspects of the operations of 2210 may be performed by a reference timing rule manager as described with reference to FIGS. 14 through 17.

At 2215, the base station may transmit, to the UE, one or more instances of the DCI among the set of PDCCH candidates. The operations of 2215 may be performed according to the methods described herein. In some examples, aspects of the operations of 2215 may be performed by a reference time manager as described with reference to FIGS. 14 through 17.

At 2220, the base station may communicate with the UE based on the reference time, the reference time being based on the reference timing rule. The operations of 2220 may be performed according to the methods described herein. In some examples, aspects of the operations of 2220 may be performed by a reference time manager as described with reference to FIGS. 14 through 17.

At 2225, the base station may identify, for the UE, an interrupted transmission identifying a set of physical resource blocks and symbols in a set of previous symbols in which a transmission scheduled for the UE has been interrupted, where the reference timing rule indicates the reference time to be used by the UE for application of the interrupted transmission. The operations of 2225 may be performed according to the methods described herein. In some examples, aspects of the operations of 2225 may be performed by an interrupted transmission manager as described with reference to FIGS. 14 through 17.

At 2230, the base station may transmit one or more repetitions of the DCI indicating the interrupted transmission among the set of PDCCH candidates. The operations of 2230 may be performed according to the methods described herein. In some examples, aspects of the operations of 2230 may be performed by an interrupted transmission manager as described with reference to FIGS. 14 through 17.

At 2235, the base station may refrain from communicating with the UE in the set of previous symbols according to the interrupted transmission. The operations of 2235 may be performed according to the methods described herein. In some examples, aspects of the operations of 2235 may be performed by an interrupted transmission manager as described with reference to FIGS. 14 through 17.

FIG. 23 shows a flowchart illustrating a method 2300 that supports linked otherwise associated PDCCH candidate rules in accordance with aspects of the present disclosure. The operations of method 2300 may be implemented by a UE 115 or its components as described herein. For example, the operations of method 2300 may be performed by a communications manager as described with reference to FIGS. 10 through 13. In some examples, a UE may execute a set of instructions to control the functional elements of the UE to perform the functions described below. Additionally, or alternatively, a UE may perform aspects of the functions described below using special-purpose hardware.

At 2305, the UE may monitor for first DCI among a first plurality of PDCCH candidates that are associated with each other, the first DCI scheduling a first communication for the UE. The operations of 2305 may be performed according to the methods described herein. In some examples, aspects of the operations of 2305 may be performed by a PDCCH candidate manager as described with reference to FIGS. 10 through 13.

At 2310, the UE may monitor for second DCI among a second plurality of PDCCH candidates that are associated with each other, the second DCI scheduling a second communication for the UE. The operations of 2310 may be performed according to the methods described herein. In some examples, aspects of the operations of 2310 may be performed by a reference timing rule manager as described with reference to FIGS. 10 through 13.

At 2315, the UE may determine that the first DCI and the second DCI are received in-sequence based at least in part on a reference time defined by a reference timing rule, the reference timing rule being based at least in part on at least one of the first plurality of PDCCH candidates being associated with each other or the second plurality of PDCCH candidates being associated with each other. The operations of 2315 may be performed according to the methods described herein. In some examples, aspects of the operations of 2315 may be performed by a reference time manager as described with reference to FIGS. 10 through 13.

At 2320, the UE may communicate based at least in part on the reference time and according to the first DCI and the second DCI. The operations of 2320 may be performed according to the methods described herein. In some examples, aspects of the operations of 2320 may be performed by a reference time manager as described with reference to FIGS. 10 through 13.

The following provides an overview of aspects of the present disclosure:

Aspect 1: A method for wireless communication at a UE, comprising: monitoring for first DCI among a first plurality of PDCCH candidates that are associated with each other, the first DCI scheduling a first communication for the UE; monitoring for second DCI among a second plurality of PDCCH candidates that are associated with each other, the second DCI scheduling a second communication for the UE; determining that the first DCI and the second DCI are received in-sequence based at least in part on a reference time defined by a reference timing rule, the reference timing rule being based at least in part on at least one of the first plurality of PDCCH candidates being associated with each other or the second plurality of PDCCH candidates being associated with each other; and communicating based at least in part on the reference time and according to the first DCI and the second DCI.

Aspect 2: The method of aspect 1, further comprising: identifying that the reference timing rule defines the reference time as a PDCCH ending symbol that is a last symbol of a last PDCCH candidate of a set of associated PDCCH candidates, the set of associated PDCCH candidates corresponding to the first plurality of PDCCH candidates, the second plurality of PDCCH candidates, or both.

Aspect 3: The method of aspect 2, wherein determining that the first DCI and the second DCI are received in-sequence further comprises: applying the reference timing rule to the first plurality of PDCCH candidates to determine the reference time, wherein the first plurality of PDCCH candidates are associated with a first feedback process identifier and the second plurality of PDCCH candidates are associated with a second feedback process identifier; and verifying that the second plurality of PDCCH candidates end after the reference time but that the second communication starts after an end of the first communication.

Aspect 4: The method of any of aspects 1 through 3, further comprising: identifying that the reference timing rule defines the reference time as a PDCCH ending symbol that is either a last symbol of an earliest PDCCH candidate of a set of associated PDCCH candidates or the last symbol of any PDCCH candidate of the set of associated PDCCH candidates, the set of associated PDCCH candidates corresponding to the first plurality of PDCCH candidates, the second plurality of PDCCH candidates, or both.

Aspect 5: The method of any of aspects 1 through 4, further comprising: identifying that the reference timing rule defines a first reference time as a first PDCCH ending symbol for a first set of associated PDCCH candidates and a second reference time as a second PDCCH ending symbol for a second set of associated PDCCH candidates, wherein when the first communication corresponds to the first set of associated PDCCH candidates and occurs before the second communication which corresponds with the second set of associated PDCCH candidates, the first reference time is a last symbol of an earliest PDCCH candidate of the first set of associated PDCCH candidates and the second reference time is the last symbol of a last PDCCH candidate of the second set of associated PDCCH candidates, or the first reference time is a last symbol of the last PDCCH candidate of the first set of associated PDCCH candidates and the second reference time is the last symbol of the earliest PDCCH candidate of the second set of associated PDCCH candidates.

Aspect 6: The method of any of aspects 1 through 5, wherein the reference time is specified by the reference timing rule as one of a second transmission time period associated with a last received instance of the second DCI, a first transmission time period associated with a first received instance of the first DCI, or a last symbol associated with the first DCI or second DCI, the last symbol associated with any received instance of the first DCI or second DCI, or a first symbol associated with the first received instance of the first DCI and the last symbol associated with the last received instance of the second DCI, or the last symbol associated with the first received instance of the first DCI and the first symbol associated with the last received instance of the second DCI.

Aspect 7: The method of any of aspects 1 through 6, wherein the first plurality of PDCCH candidates are associated with a first set of transmission time periods and the second plurality of PDCCH candidates are associated with a second set of transmission time periods.

Aspect 8: The method of any of aspects 1 through 7, wherein the first communication and the second communication comprise uplink communications (e.g., PUCCH communications and/or PUSCH communications), downlink communications (e.g., PDCCH communications and/or PDSCH communications), or both.

Aspect 9: The method of any of aspects 1 through 8, wherein the first plurality of PDCCH candidates are associated with a first set of repetitions of the first DCI and the second plurality of PDCCH candidates are associated with a second set of repetitions of the second DCI.

Aspect 10: A method for wireless communication at a base station, comprising: identifying, for a UE, a first plurality of PDCCH candidates that are associated with each other and used to convey DCI; identifying, for the UE, a second plurality of PDCCH candidates that are associated with each other and used to convey DCI; identifying, for the UE, a reference timing rule that is based at least in part on at least one of the first plurality of PDCCH candidates being associated with each other or the second plurality of PDCCH candidates being associated with each other; transmitting, to the UE, first DCI among the first plurality of PDCCH candidates, the first DCI scheduling a first communication for the UE; transmitting, to the UE, second DCI among the second plurality of PDCCH candidates, the second DCI scheduling a second communication for the UE; and communicating with the UE based at least in part on a reference time and according to the first DCI and the second DCI, wherein the reference timing rule defines the reference time based at least in part on the first DCI and the second DCI being received in-sequence.

Aspect 11: The method of aspect 10, further comprising: identifying that the reference timing rule defines the reference time as a PDCCH ending symbol that is a last symbol of a last PDCCH candidate of a set of associated PDCCH candidates, the set of associated PDCCH candidates corresponding to the first plurality of PDCCH candidates, the second plurality of PDCCH candidates, or both.

Aspect 12: The method of any of aspects 10 through 11, wherein the reference timing rule defining that the first DCI and the second DCI are received in-sequence further comprises: applying the reference timing rule to the first plurality of PDCCH candidates to determine the reference time, wherein the first plurality of PDCCH candidates are associated with a first feedback process identifier and the second plurality of PDCCH candidates are associated with a second feedback process identifier; and verifying that the second plurality of PDCCH candidates end after the reference time but that the second communication starts after an end of the first communication.

Aspect 13: The method of any of aspects 10 through 12, further comprising: identifying that the reference timing rule defines the reference time as a PDCCH ending symbol that is either a last symbol of an earliest PDCCH candidate of a set of associated PDCCH candidates or the last symbol of any PDCCH candidate of the set of associated PDCCH candidates, the set of associated PDCCH candidates corresponding to the first plurality of PDCCH candidates, the second plurality of PDCCH candidates, or both.

Aspect 14: The method of any of aspects 10 through 13, further comprising: identifying that the reference timing rule defines a first reference time as a first PDCCH ending symbol for a first set of associated PDCCH candidates and a second reference time as a second PDCCH ending symbol for a second set of associated PDCCH candidates, wherein when the first communication corresponds to the first set of associated PDCCH candidates and occurs before the second communication which corresponds with the second set of associated PDCCH candidates, the first reference time is a last symbol of an earliest PDCCH candidate of the first set of associated PDCCH candidates and the second reference time is the last symbol of a last PDCCH candidate of the second set of associated PDCCH candidates, or the first reference time is a last symbol of the last PDCCH candidate of the first set of associated PDCCH candidates and the second reference time is the last symbol of the earliest PDCCH candidate of the second set of associated PDCCH candidates.

Aspect 15: The method of any of aspects 10 through 14, wherein the reference time is specified by the reference timing rule as one of a second transmission time period associated with a last received instance of the second DCI, a first transmission time period associated with a first received instance of the first DCI, or a last symbol associated with the first DCI or second DCI, the last symbol associated with any received instance of the first DCI or second DCI, or a first symbol associated with the first received instance of the first DCI and the last symbol associated with the last received instance of the second DCI, or the last symbol associated with the first received instance of the first DCI and the first symbol associated with the last received instance of the second DCI.

Aspect 16: The method of any of aspects 10 through 15, wherein the first plurality of PDCCH candidates are associated with a first set of transmission time periods and the second plurality of PDCCH candidates are associated with a second set of transmission time periods.

Aspect 17: The method of any of aspects 10 through 16, wherein the first communication and the second communication comprise uplink communications, downlink communications, or both.

Aspect 18: The method of any of aspects 10 through 17, wherein the first plurality of PDCCH candidates are associated with a first set of repetitions of the first DCI and the second plurality of PDCCH candidates are associated with a second set of repetitions of the second DCI.

Aspect 19: A method for wireless communication at a UE, comprising: monitoring for DCI among a plurality of PDCCH candidates that are associated with each other, the plurality of PDCCH candidates including at least a first PDCCH candidate in a first transmission time period of the plurality of PDCCH candidates and a last PDCCH candidate in a second transmission time period of the plurality of PDCCH candidates; determining a reference time based at least in part on a reference timing rule, wherein the reference timing rule is based at least in part on the association between the plurality of PDCCH candidates and indicates that the reference time is to be determined based at least in part on either the first transmission time period or the second transmission time period; and communicating based at least in part on the reference time.

Aspect 20: The method of aspect 19, further comprising: monitoring for one or more repetitions of the DCI indicating a slot format indicator index among the plurality of PDCCH candidates, the slot format indicator index identifying one or more communication directions for each slot in a set of upcoming slots, wherein the reference timing rule indicates the reference time to be used by the UE for application of the slot format indicator index; identifying the set of upcoming slots based at least in part on the reference time and the slot format indicator index; and communicating in the set of upcoming slots according to the one or more communication directions of each slot.

Aspect 21: The method of aspect 20, wherein the reference time is specified by the reference timing rule as one of the second transmission time period associated with the last PDCCH candidate, the first transmission time period associated with the first PDCCH candidate, or additionally a PDCCH candidate index among the plurality of PDCCH candidates, a search space set identifier associated with the plurality of PDCCH candidates, or a control resource set identifier associated with the plurality of PDCCH candidates.

Aspect 22: The method of any of aspects 19 through 21, further comprising: monitoring for one or more repetitions of the DCI indicating a search space set group switching flag among the plurality of PDCCH candidates, the search space set group switching flag identifying an updated search space set group that the UE is to use in a set of upcoming slots, wherein the reference timing rule indicates the reference time to be used by the UE for application of the search space set group switching flag; identifying the set of upcoming slots based at least in part on the reference time and the search space set group switching flag; and communicating in the set of upcoming slots according to the updated search space set group.

Aspect 23: The method of aspect 22, wherein the reference timing rule indicates that application of the updated search space set group switching flag is to occur in a first slot that is at least a first number of symbols after a last symbol of the reference time.

Aspect 24: The method of aspect 23, wherein the reference time is specified by the reference timing rule as one of the second transmission time period associated with the last PDCCH candidate, the first transmission time period associated with the first PDCCH candidate, or additionally a PDCCH candidate index among the plurality of PDCCH candidates, a search space set identifier associated with the plurality of PDCCH candidates, or a control resource set identifier associated with the plurality of PDCCH candidates.

Aspect 25: The method of any of aspects 23 through 24, further comprising: initiating a timer at a start of the set of upcoming slots based at least in part on the reference time and the search space set group switching flag.

Aspect 26: The method of any of aspects 22 through 25, further comprising: receiving a configuration signal indicating a switching delay between the DCI indicating the search space set group switching flag and the set of upcoming slots, wherein the set of upcoming slots are identified based at least in part on the switching delay.

Aspect 27: The method of any of aspects 19 through 26, further comprising: monitoring for one or more repetitions of the DCI indicating an interrupted transmission among the plurality of PDCCH candidates, the interrupted transmission identifying a set of physical resource blocks and symbols in a set of previous symbols in which a transmission scheduled for the UE has been interrupted, wherein the reference timing rule indicates the reference time to be used by the UE for application of the interrupted transmission; identifying the set of previous symbols based at least in part on the reference time and the interrupted transmission; and refraining from communicating in the set of previous symbols according to the interrupted transmission.

Aspect 28: The method of aspect 27, wherein the reference timing rule indicates that application of the interrupted transmission is to occur in a number of symbols that are prior to a first symbol of the reference time.

Aspect 29: The method of aspect 28, wherein the reference time is specified by the reference timing rule as one of the first transmission time period associated with the first PDCCH candidate, the second transmission time period associated with the last PDCCH candidate, or additionally a PDCCH candidate index among the plurality of PDCCH candidates, a search space set identifier associated with the plurality of PDCCH candidates, or a control resource set identifier associated with the plurality of PDCCH candidates.

Aspect 30: The method of any of aspects 19 through 29, further comprising: monitoring for one or more repetitions of the DCI indicating a cancelation indication among the plurality of PDCCH candidates, the cancelation indication identifying a set of physical resource blocks and symbols in a set of upcoming symbols in which the UE is to cancel uplink transmission, wherein the reference timing rule indicates the reference time to be used by the UE for application of the cancelation indication; identifying the set of upcoming symbols based at least in part on the reference time and the cancelation indication; and refraining from performing uplink transmissions in the set of upcoming symbols according to the cancelation indication.

Aspect 31: The method of aspect 30, wherein the reference timing rule indicates that application of the cancelation indication is to occur in a first symbol after a processing time that follows the reference time.

Aspect 32: The method of aspect 31, wherein the reference time is specified by the reference timing rule as one of the second transmission time period associated with the last PDCCH candidate, the first transmission time period associated with the first PDCCH candidate, or additionally a PDCCH candidate index among the plurality of PDCCH candidates, a search space set identifier associated with the plurality of PDCCH candidates, or a control resource set identifier associated with the plurality of PDCCH candidates.

Aspect 33: The method of any of aspects 19 through 32, further comprising: monitoring for one or more repetitions of the DCI indicating a bandwidth part change among the plurality of PDCCH candidates, the bandwidth part change identifying a change in a bandwidth part configured for the UE in a set of upcoming slots, wherein the reference timing rule indicates the reference time to be used by the UE for application of the bandwidth part change; identifying the set of upcoming slots based at least in part on the reference time and the bandwidth part change; refraining from communicating during a time period between the first transmission time period or the second transmission time period in which the DCI indicating the bandwidth part change is received and the set of upcoming slots; and communicating in the set of upcoming slots according to the bandwidth part change.

Aspect 34: The method of aspect 33, wherein the reference time is specified by the reference timing rule as one of the second transmission time period associated with the last PDCCH candidate, the first transmission time period associated with the first PDCCH candidate, or additionally a PDCCH candidate index among the plurality of PDCCH candidates, a search space set identifier associated with the plurality of PDCCH candidates, or a control resource set identifier associated with the plurality of PDCCH candidates.

Aspect 35: A method for wireless communication at a base station, comprising: identifying, for a UE, a plurality of PDCCH candidates that are associated with each other and used to convey DCI, the plurality of PDCCH candidates including at least a first PDCCH candidate in a first transmission time period of the plurality of PDCCH candidates and a last PDCCH candidate in a second transmission time period of the plurality of PDCCH candidates; identifying, for the UE, a reference timing rule based at least in part on the association between the plurality of PDCCH candidates, the reference timing rule indicating that a reference time is to be determined based at least in part on either the first transmission time period or the second transmission time period; transmitting, to the UE, one or more instances of the DCI among the plurality of PDCCH candidates; and communicating with the UE based at least in part on the reference time, the reference time being based at least in part on the reference timing rule.

Aspect 36: The method of aspect 35, further comprising: identifying, for the UE, a slot format indicator index identifying one or more communication directions for each slot in a set of upcoming slots, wherein the reference timing rule indicates the reference time to be used by the UE for application of the slot format indicator index; transmitting one or more repetitions of the DCI indicating the slot format indicator index among the plurality of PDCCH candidates; and communicating with the UE in the set of upcoming slots according to the one or more communication directions of each slot.

Aspect 37: The method of aspect 36, wherein the reference time is specified by the reference timing rule as one of the second transmission time period associated with the last PDCCH candidate, the first transmission time period associated with the first PDCCH candidate, or additionally a PDCCH candidate index among the plurality of PDCCH candidates, a search space set identifier associated with the plurality of PDCCH candidates, or a control resource set identifier associated with the plurality of PDCCH candidates.

Aspect 38: The method of any of aspects 35 through 37, further comprising: identifying, for the UE, a search space set group switching flag identifying an updated search space set group that the UE is to use in a set of upcoming slots, wherein the reference timing rule indicates the reference time to be used by the UE for application of the search space set group switching flag; transmitting one or more repetitions of the DCI indicating the search space set group switching flag among the plurality of PDCCH candidates; and communicating in the set of upcoming slots according to the updated search space set group.

Aspect 39: The method of aspect 38, wherein the reference timing rule indicates that application of the search space set group switching flag is to occur in a first slot that is at least a first number of symbols after a last symbol of the reference time.

Aspect 40: The method of aspect 39, wherein the reference time is specified by the reference timing rule as one of the second transmission time period associated with the last PDCCH candidate, the first transmission time period associated with the first PDCCH candidate, or additionally a PDCCH candidate index among the plurality of PDCCH candidates, a search space set identifier associated with the plurality of PDCCH candidates, or a control resource set identifier associated with the plurality of PDCCH candidates.

Aspect 41: The method of any of aspects 38 through 40, further comprising: transmitting, to the UE, a configuration signal indicating a switching delay between the DCI indicating the search space set group switching flag and the set of upcoming slots, wherein the set of upcoming slots are identified by the UE based at least in part on the switching delay.

Aspect 42: The method of any of aspects 35 through 41, further comprising: identifying, for the UE, an interrupted transmission identifying a set of physical resource blocks and symbols in a set of previous symbols in which a transmission scheduled for the UE has been interrupted, wherein the reference timing rule indicates the reference time to be used by the UE for application of the interrupted transmission; transmitting one or more repetitions of the DCI indicating the interrupted transmission among the plurality of PDCCH candidates; and refraining from communicating with the UE in the set of previous symbols according to the interrupted transmission.

Aspect 43: The method of aspect 42, wherein the reference timing rule indicates that application of the interrupted transmission is to occur in a number of symbols that are prior to a first symbol of the reference time.

Aspect 44: The method of aspect 43, wherein the reference time is specified by the reference timing rule as one of first transmission time period associated with the first PDCCH candidate, the second transmission time period associated with the last PDCCH candidate, or additionally a PDCCH candidate index among the plurality of PDCCH candidates, a search space set identifier associated with the plurality of PDCCH candidates, or a control resource set identifier associated with the plurality of PDCCH candidates.

Aspect 45: The method of any of aspects 35 through 44, further comprising: identifying, for the UE, a cancelation indication identifying a set of physical resource blocks and symbols in a set of upcoming symbols in which the UE is to cancel an uplink transmission, wherein the reference timing rule indicates the reference time to be used by the UE for application of the cancelation indication; transmitting one or more repetitions of the DCI indicating the cancelation indication among the plurality of PDCCH candidates; and refraining from receiving uplink transmissions from the UE in the set of upcoming symbols according to the cancelation indication.

Aspect 46: The method of aspect 45, wherein the reference timing rule indicates that application of the cancelation indication is to occur in a number of symbols that are after a first symbol of the reference time.

Aspect 47: The method of aspect 46, wherein the reference time is specified by the reference timing rule as one of the second transmission time period associated with the last PDCCH candidate, the first transmission time period associated with the first PDCCH candidate, or additionally a PDCCH candidate index among the plurality of PDCCH candidates, a search space set identifier associated with the plurality of PDCCH candidates, or a control resource set identifier associated with the plurality of PDCCH candidates.

Aspect 48: The method of any of aspects 35 through 47, further comprising: identifying, for the UE, a bandwidth part change identifying a change in a bandwidth part configured for the UE in a set of upcoming slots, wherein the reference timing rule indicates the reference time to be used by the UE for application of the bandwidth part change; transmitting one or more repetitions of the DCI indicating the bandwidth part change among the plurality of PDCCH candidates, the bandwidth part change; refraining from communicating with the UE during a time period between the first transmission time period or the second transmission time period in which the DCI indicating the bandwidth part change is receive and the set of upcoming slots; and communicating with the UE in the set of upcoming slots according to the bandwidth part change.

Aspect 49: The method of aspect 48, wherein the reference time is specified by the reference timing rule as one of the second transmission time period associated with the last PDCCH candidate, the first transmission time period associated with the first PDCCH candidate, or additionally a PDCCH candidate index among the plurality of PDCCH candidates, a search space set identifier associated with the plurality of PDCCH candidates, or a control resource set identifier associated with the plurality of PDCCH candidates.

Aspect 50: An apparatus for wireless communication at a UE, comprising a processor; memory coupled with the processor; and instructions stored in the memory and executable by the processor to cause the apparatus to perform a method of any of aspects 1 through 8.

Aspect 51: An apparatus for wireless communication at a UE, comprising at least one means for performing a method of any of aspects 1 through 8.

Aspect 52: A non-transitory computer-readable medium storing code for wireless communication at a UE, the code comprising instructions executable by a processor to perform a method of any of aspects 1 through 8.

Aspect 53: An apparatus for wireless communication at a base station, comprising a processor; memory coupled with the processor; and instructions stored in the memory and executable by the processor to cause the apparatus to perform a method of any of aspects 10 through 17.

Aspect 54: An apparatus for wireless communication at a base station, comprising at least one means for performing a method of any of aspects 10 through 17.

Aspect 55: A non-transitory computer-readable medium storing code for wireless communication at a base station, the code comprising instructions executable by a processor to perform a method of any of aspects 10 through 17.

Aspect 56: An apparatus for wireless communication at a UE, comprising a processor; memory coupled with the processor; and instructions stored in the memory and executable by the processor to cause the apparatus to perform a method of any of aspects 19 through 34.

Aspect 57: An apparatus for wireless communication at a UE, comprising at least one means for performing a method of any of aspects 19 through 34.

Aspect 58: A non-transitory computer-readable medium storing code for wireless communication at a UE, the code comprising instructions executable by a processor to perform a method of any of aspects 19 through 34.

Aspect 59: An apparatus for wireless communication at a base station, comprising a processor; memory coupled with the processor; and instructions stored in the memory and executable by the processor to cause the apparatus to perform a method of any of aspects 35 through 49.

Aspect 60: An apparatus for wireless communication at a base station, comprising at least one means for performing a method of any of aspects 35 through 49.

Aspect 61: A non-transitory computer-readable medium storing code for wireless communication at a base station, the code comprising instructions executable by a processor to perform a method of any of aspects 35 through 49.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
monitoring for first downlink control information among a first plurality of physical downlink control channel candidates that are associated with each other, the first downlink control information scheduling a first shared channel communication for the UE;
monitoring for second downlink control information among a second plurality of physical downlink control channel candidates that are associated with each other, the second downlink control information scheduling a second shared channel communication for the UE;
determining a first reference time corresponding to the first shared channel communication, wherein the first reference time is a physical downlink control channel ending symbol that is the last symbol of a last physical downlink control channel candidate of the first plurality of physical downlink control channel candidates;
determining a second reference time corresponding to the second shared channel communication, wherein the second reference time is a physical downlink control channel ending symbol that is the last symbol of a last physical downlink control channel candidate of the second plurality of physical downlink control channel candidates; and
communicating based at least in part on the first reference time and the second reference time according to the first downlink control information and the second downlink control information.

2. The method of claim 1, wherein:
the first plurality of physical downlink control channel candidates are associated with a first feedback process identifier and the second plurality of physical downlink control channel candidates are associated with a second feedback process identifier.

3. The method of claim 1, wherein the first reference time and the second reference time determine an in-order sequence rule for scheduled communications such that:
responsive to the first reference time being earlier than the second reference time, the first shared channel communication scheduled by the first downlink control information is communicated before the second shared channel communication scheduled by the second downlink control information is communicated; or
responsive to the second reference time being earlier than the first reference time, the second shared channel communication scheduled by the second downlink control information is communicated before the first shared channel communication scheduled by the first downlink control information is communicated.

4. The method of claim 1, wherein the first plurality of physical downlink control channel candidates are associated with a first set of transmission time periods and the second plurality of physical downlink control channel candidates are associated with a second set of transmission time periods.

5. The method of claim 1, wherein the first shared channel communication and the second shared channel communication comprise uplink communications, downlink communications, or both.

6. The method of claim 1, wherein the first plurality of physical downlink control channel candidates are associated with a first set of repetitions of the first downlink control information and the second plurality of physical downlink control channel candidates are associated with a second set of repetitions of the second downlink control information.

7. A method for wireless communication at a network device, comprising:
transmitting, to a user equipment (UE), first downlink control information among a first plurality of physical downlink control channel candidates that are associated with each other, the first downlink control information scheduling a first shared channel communication for the UE;
transmitting, to the UE, second downlink control information among a second plurality of physical downlink control channel candidates that are associated with each other, the second downlink control information scheduling a second shared channel communication for the UE;

determining a first reference time corresponding to the first shared channel communication, wherein the first reference time is a physical downlink control channel ending symbol that is the last symbol of a last physical downlink control channel candidate of the first plurality of physical downlink control channel candidates;

determining a second reference time corresponding to the second shared channel communication, wherein the second reference time is a physical downlink control channel ending symbol that is the last symbol of a last physical downlink control channel candidate of the second plurality of physical downlink control channel candidates; and communicating with the UE based at least in part on the first reference time and the second reference time according to the first downlink control information and the second downlink control information.

8. The method of claim 7, wherein the first plurality of physical downlink control channel candidates are associated with a first feedback process identifier and the second plurality of physical downlink control channel candidates are associated with a second feedback process identifier.

9. The method of claim 7, wherein the first reference time and the second reference time determine an in-order sequence rule for scheduled communications such that:

responsive to the first reference time being earlier than the second reference time, the first shared channel communication scheduled by the first downlink control information is communicated before the second shared channel communication scheduled by the second downlink control information is communicated; or responsive to the second reference time being earlier than the first reference time, the second shared channel communication scheduled by the second downlink control information is communicated before the first shared channel communication scheduled by the first downlink control information is communicated.

10. The method of claim 7, wherein the first plurality of physical downlink control channel candidates are associated with a first set of transmission time periods and the second plurality of physical downlink control channel candidates are associated with a second set of transmission time periods.

11. The method of claim 7, wherein the first shared channel communication and the second shared channel communication comprise uplink communications, downlink communications, or both.

12. The method of claim 7, wherein the first plurality of physical downlink control channel candidates are associated with a first set of repetitions of the first downlink control information and the second plurality of physical downlink control channel candidates are associated with a second set of repetitions of the second downlink control information.

13. An apparatus for wireless communication at a user equipment (UE), comprising:

one or more processors;

one or more memories coupled with the one or more processors; and instructions stored in the one or more memories and executable by the one or more processors to:

monitor for first downlink control information among a first plurality of physical downlink control channel candidates that are associated with each other, the first downlink control information scheduling a first shared channel communication for the UE;

monitor for second downlink control information among a second plurality of physical downlink control channel candidates that are associated with each other, the second downlink control information scheduling a second shared channel communication for the UE;

determine a first reference time corresponding to the first shared channel communication, wherein the first reference time is a physical downlink control channel ending symbol that is the last symbol of a last physical downlink control channel candidate of the first plurality of physical downlink control channel candidates;

determine a second reference time corresponding to the second shared channel communication, wherein the second reference time is a physical downlink control channel ending symbol that is the last symbol of a last physical downlink control channel candidate of the second plurality of physical downlink control channel candidates; and communicate based at least in part on the first reference time and the second reference time according to the first downlink control information and the second downlink control information.

14. The apparatus of claim 13, wherein:

the first plurality of physical downlink control channel candidates are associated with a first feedback process identifier and the second plurality of physical downlink control channel candidates are associated with a second feedback process identifier.

15. The apparatus of claim 13, wherein the first reference time and the second reference time determine an in-order sequence rule for scheduled communications such that:

responsive to the first reference time being earlier than the second reference time, the first shared channel communication scheduled by the first downlink control information is communicated before the second shared channel communication scheduled by the second downlink control information is communicated; or responsive to the second reference time being earlier than the first reference time, the second shared channel communication scheduled by the second downlink control information is communicated before the first shared channel communication scheduled by the first downlink control information is communicated.

16. The apparatus of claim 13, wherein the first plurality of physical downlink control channel candidates are associated with a first set of transmission time periods and the second plurality of physical downlink control channel candidates are associated with a second set of transmission time periods.

17. The apparatus of claim 13, wherein the first shared channel communication and the second shared channel communication comprise uplink communications, downlink communications, or both.

18. An apparatus for wireless communication at a network device, comprising:

one or more processors;

one or more memories coupled with the one or more processors; and instructions stored in the one or more memories and executable by the one or more processors to:

transmit, to a user equipment (UE), first downlink control information among a first plurality of physical downlink control channel candidates that are associated with each other, the first downlink control information scheduling a first shared channel communication for the UE;

transmit, to the UE, second downlink control information among a second plurality of physical downlink control channel candidates that are associated with each other, the second downlink control information scheduling a second shared channel communication for the UE;

determine a first reference time corresponding to the first shared channel communication, wherein the first reference time is a physical downlink control channel ending symbol that is the last symbol of a last physical downlink control channel candidate of the first plurality of physical downlink control channel candidates;

determine a second reference time corresponding to the first shared channel communication, wherein the second reference time is a physical downlink control channel ending symbol that is the last symbol of a last physical downlink control channel candidate of the second plurality of physical downlink control channel candidates; and communicate with the UE based at least in part on the first reference time and the second reference time according to the first downlink control information and the second downlink control information.

19. The apparatus of claim 18, wherein the first plurality of physical downlink control channel candidates are associated with a first feedback process identifier and the second plurality of physical downlink control channel candidates are associated with a second feedback process identifier.

20. The apparatus of claim 18, wherein the first reference time and the second reference time determine an in-order sequence rule for scheduled communications such that:

responsive to the first reference time being earlier than the second reference time, the first shared channel communication scheduled by the first downlink control information is communicated before the second shared channel communication scheduled by the second downlink control information is communicated; or responsive to the second reference time being earlier than the first reference time, the second shared channel communication scheduled by the second downlink control information is communicated before the first shared channel communication scheduled by the first downlink control information is communicated.

21. The apparatus of claim 18, wherein the first plurality of physical downlink control channel candidates are associated with a first set of transmission time periods and the second plurality of physical downlink control channel candidates are associated with a second set of transmission time periods.

22. The apparatus of claim 18, wherein the first shared channel communication and the second shared channel communication comprise uplink communications, downlink communications, or both.

* * * * *